(12) United States Patent
Takashima

(10) Patent No.: US 8,346,062 B2
(45) Date of Patent: Jan. 1, 2013

(54) INFORMATION PROCESSING DEVICE, INFORMATION RECORDING MEDIUM MANUFACTURING DEVICE, INFORMATION RECORDING MEDIUM, METHODS THEREOF, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1748 days.

(21) Appl. No.: 11/512,376

(22) Filed: Aug. 30, 2006

(65) Prior Publication Data

US 2007/0047645 A1 Mar. 1, 2007

Related U.S. Application Data

(60) Provisional application No. 60/712,389, filed on Aug. 31, 2005.

(30) Foreign Application Priority Data

Aug. 31, 2005 (JP) ................................. 2005-252860
Jun. 2, 2006 (JP) ................................. 2006-154792

(51) Int. Cl.
*H04N 9/80* (2006.01)
(52) U.S. Cl. ...................................................... 386/254
(58) Field of Classification Search .................. 386/248, 386/252, 254
See application file for complete search history.

(56) References Cited

U.S. PATENT DOCUMENTS

| 6,023,553 | A  | * | 2/2000  | Boyce et al. ................... 386/329 |
| 6,208,598 | B1 | * | 3/2001  | Sinquin et al. ............. 369/47.12 |
| 6,859,789 | B1 | * | 2/2005  | Hayashi et al. .................. 705/50 |
| 7,336,712 | B1 | * | 2/2008  | Linnartz et al. .......... 375/240.26 |
| 2002/0197061 | A1 | * | 12/2002 | Kawamura et al. ............. 386/69 |
| 2003/0112973 | A1 | * | 6/2003  | Tsutsui et al. ................... 380/46 |
| 2003/0235404 | A1 |   | 12/2003 | Seo et al. |
| 2005/0100229 | A1 | * | 5/2005  | Becker et al. ................. 382/232 |
| 2005/0111558 | A1 | * | 5/2005  | Lecomte ................... 375/240.29 |
| 2005/0198115 | A1 | * | 9/2005  | Sugimoto et al. ............. 709/203 |

FOREIGN PATENT DOCUMENTS

| JP | 11-45508 | 2/1999 |
| JP | 11-355736 | 12/1999 |
| JP | 2002-244926 | 8/2002 |
| JP | 2004-46957 | 2/2004 |
| JP | 2004-221950 | 8/2004 |
| JP | 2005-190319 | 7/2005 |
| JP | 2005-531192 | 10/2005 |
| WO | WO 2004/001753 A1 | 12/2003 |

* cited by examiner

*Primary Examiner* — Thai Tran
*Assistant Examiner* — William Tran
(74) *Attorney, Agent, or Firm* — Oblon, Spivak, McClelland, Maier & Neustadt, L.L.P.

(57) ABSTRACT

An information processing device includes: a modified data generating unit for generating modified data obtained by modifying content configuration data; a fix-up table generating unit for generating a fix-up table in which transformation data serving as an object to be replaced with the modified data is registered; and a data recording unit for recording content including the modified data and the fix-up table in an information recording medium; wherein the modified data generating unit is configured so as to execute data modification processing with the configuration units of MPEG encoded data included in a TS packet making up content as data modification processing units.

42 Claims, 45 Drawing Sheets

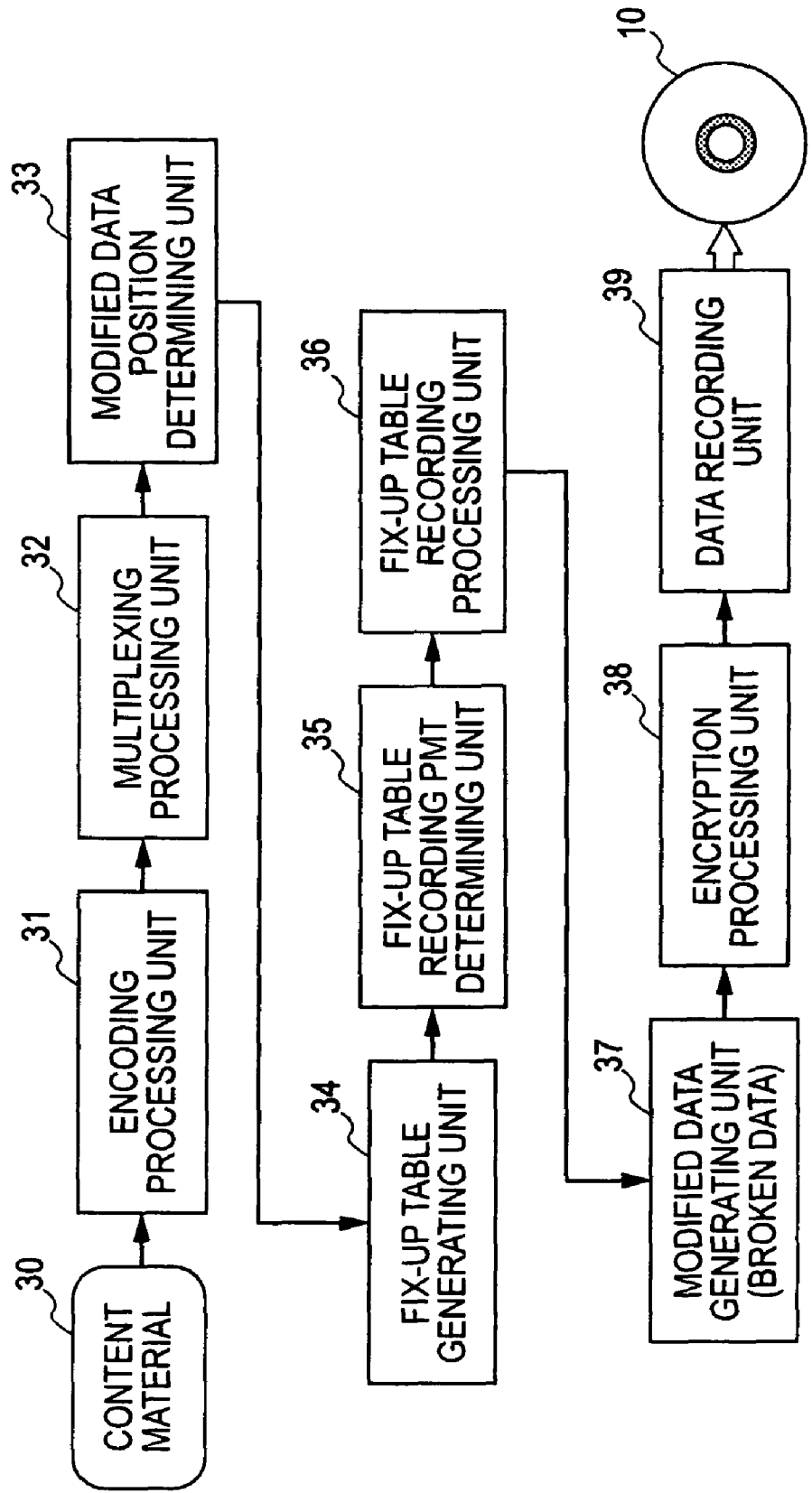

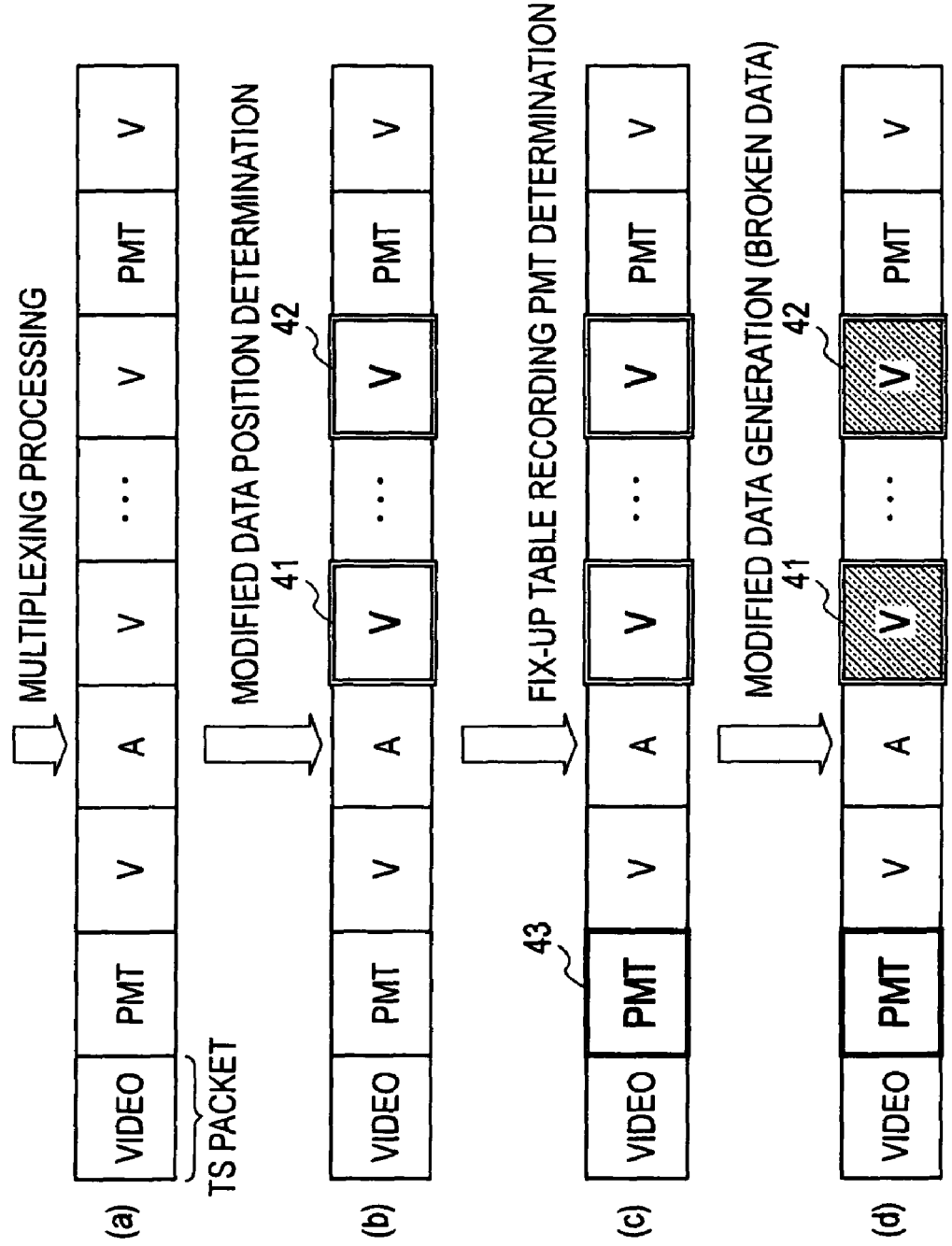

FIG. 5

| FixUpTable() { | BITS | DESCRIPTION |
|---|---|---|
| NUMBER OF FixUpEntry | 32 | NUMBER OF TRANSFORMATION DATA ENTRIES (NUMBER OF FixUpEntry) |
| FixUpEntry LENGTH | 8 | NUMBER OF BYTES OF ONE TRANSFORMATION DATA ENTRY (BYTE LENGTH OF ONE FixUpEntry()  =(N+6)) |
| RESERVED | 8 | RESERVED |
| FixUpEntry(){ | | |
| SPN | 32 | SOURCE PACKET NUMBER: PACKET NUMBER FROM THE START POSITION OF THE AV STREAM FILE OF A TRANSFORMATION DATA WRITING PACKET (ABSOLUTE TRANSFORMED PACKET NUMBER FROM THE BEGINNING OF AV STREAM FILE) |
| BYTE OFFSET | 8 | A BYTE OFFSET INDICATING THE TRANSFORMATION DATA WRITING START POSITION WITHIN THE PACKET (START BYTE POSITION OF TRANSFORMED DATA IN THE PACKET) |
| player_id_bit_position | 8 | BIT POSITION OF IDENTIFICATION MARK (PLAYER ID) (INDICATE BIT POSITION OF PLAYER ID FOR FORENSIC) |
| FixUp DATA | 8×N | TRANSFORMATION OVERWRITE DATA (VALUE TO BE OVERWRITTEN (N BYTE IS TRANSFORMED IN ONE TS PACKET)) |
| } | | |

FIG. 6

| FixUpTable() { | BITS | DESCRIPTION |
|---|---|---|
| NUMBER OF FUT BLOCKS | 16 | NUMBER OF FIX-UP TABLE BLOCKS NUMBER OF FUT BLOCK (=N$_{FUT}$) |
| LENGTH OF FUT BLOCK | 16 | BYTE LENGTH OF FIX-UP TABLE BLOCK BYTE LENGTH OF ONE FUT BLOCK (=N$_b$): MAY BE FIXED BY THE FORMAT |
| FOR (I=1; I<N$_{FUT}$; I++){ | | |
| SP_NO | 8 | SECRET PARAMETER (SP) NUMBER (ASSOCIATED WITH THE SP GENERATED BY THE VM) INDICATES THE SP_NO WHICH IS ASSOCIATED WITH SP VALUE GENERATED BY VM |
| RESERVED | 8 | |
| FIRST SPN FOR FUT BLOCK | 32 | PACKET POSITION TO WHICH A FIX-UP TABLE BLOCK IS ASSIGNED ABSOLUTE TRANSFORMED PACKET NUMBER OF 1st FUT ENTRY IN EACH FUT BLOCK |
| } | | |
| RESERVED | | |
| FOR (I=1; I<N$_{FUT}$; I++){ | | |
| FUT BLOCK() | N$_b$×N$_{FUT}$ | FIX-UP TABLE BLOCK (EACH BLOCK IS PROCESSED (OBFUSCATED) WITH A DIFFERENT PARAMETER) EACH BLOCK IS OBFUSCATED SEPARATELY |
| } | | |

FIG. 7

| FUT BLOCK () { | BITS | DESCRIPTION |
|---|---|---|
| NUMBER OF FixUpEntry IN THIS BLOCK | 32 | NUMBER OF TRANSFORMATION DATA NUMBER OF FixUpEntry IN THIS BLOCK (=N$_{Fixups}$) |
| FOR (I=1; I<N$_{Fixups}$; I++){ | | |
| BASE SPN FOR FixUpEntry | 32 | POSITION OF THE BASE PACKET SERVING AS THE INDEX OF TRANSFORMATION DATA RECORDING POSITION (PACKET NUMBER) ABSOLUTE TRANSFORMED PACKET NUMBER FROM WHICH RELATIVE FixUpEntry VALUES WILL BE COMPUTED |
| } | | |
| RESERVED | | |
| FOR (I=1; I<N$_{Fixups}$; I++){ | | |
| FixUpEntry() | 128×N$_{Fixups}$ | TRANSFORMATION DATA ENTRY (PROCESSED (OBFUSCATED) WITH SECRET PARAMETERS) EACH BLOCK IS OBFUSCATED SEPARATELY USING THE SAME SP XOR PROCESS AS OPTION (A) AND HAS THE SAME FORMAT AS FUTS IN OPTION (A) |
| } | | |

FIG. 8

| FixUpEntry() { | BITS | DESCRIPTION |
|---|---|---|
| type_indicator | 2 | TYPE IDENTIFIER [00: NO TRANSFORMATION, 01b: PROCESSING WITH TRANSFORMATION DATA, 10b, 11b: PROCESSING WITH TRANSFORMATION DATA INCLUDING IDENTIFICATION MARK] 00b: NO TRANSFORM, 01b: TRANSFORM, 10b AND 11b: FORENSIC |
| FM_ID_bit_position | 6 | IDENTIFICATION BIT POSITION OF PLAYER ID CORRESPONDING TO TRANSFORMATION DATA WITH IDENTIFICATION MARK INDICATE BIT POSITION OF PLAYER ID FOR FORENSIC (MSB IS SECOND BIT OF type_indicator) |
| relative_SPN | 12 | PACKET POSITION WHERE TRANSFORMATION DATA IS APPLIED (NUMBER OF PACKETS FROM THE PMT PACKET) RELATIVE PACKET NUMBER FROM PMT TO TRANSFORMED PACKET |
| byte_position | 8 | TRANSFORMATION DATA RECORDING POSITION WITHIN THE PACKET START BYTE POSITION OF TRANSFORMED DATA IN THE PACKET (MORE THAN 5) |
| overwrite_value | 5×8 | TRANSFORMATION DATA VALUE TO BE OVERWRITTEN |
| relative_SPN_2 | 12 | PACKET POSITION WHERE THE SECOND TRANSFORMATION DATA IS APPLIED (NUMBER OF PACKETS FROM THE PMT PACKET) RELATIVE PACKED NUMBER FROM PMT TO SECOND TRANSFORMED PACKET |
| byte_position_2 | 8 | TRANSFORMATION DATA RECORDING POSITION WITHIN THE PACKET (CORRESPONDING TO THE SECOND TRANSFORMATION DATA) START BYTE POSITION OF TRANSFORMED DATA IN THE SECOND PACKET |
| overwrite_value_2 | 5×8 | SECOND TRANSFORMATION DATA SECOND VALUE TO BE OVERWRITTEN |
| } | | |

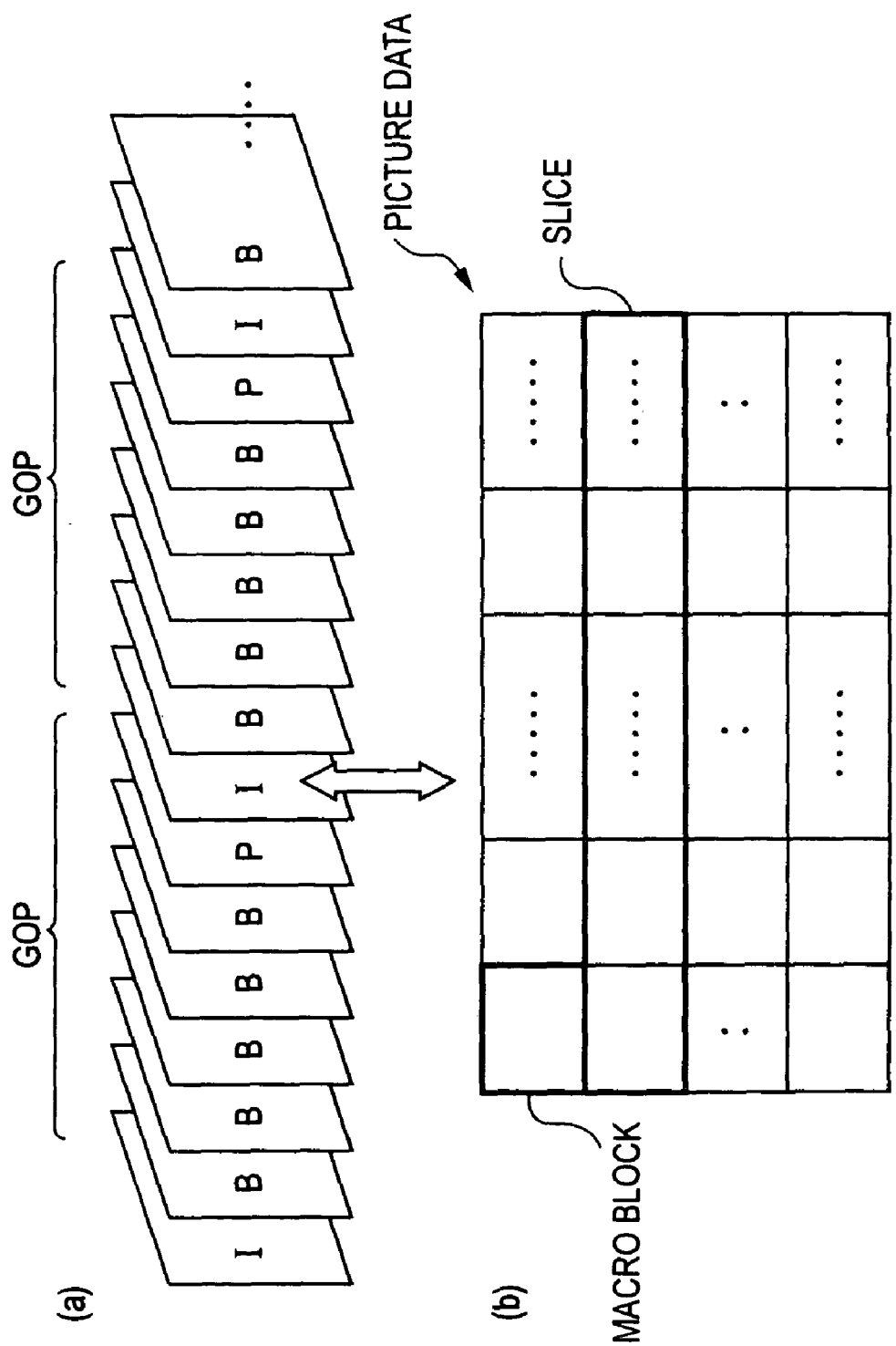

| | | |
|---|---|---|
| Num_of_I_nonMT | UInt32 | NUMBER OF I PICTURES WITHOUT MT |
| For(I=0; I<Num_of_I_nonMT; I++) { | | |
|     SPN_I_nonMT | UInt32 | HEADMOST PACKET NUMBER OF I PICTURE WITHOUT MT |
| } | | |

(b)

| | | |
|---|---|---|
| Num_of_I_nonMT | UInt32 | NUMBER OF I PICTURES WITHOUT MT |
| For(I=0; I<Num_of_I_nonMT; I++) { | | |
|     SPN_I_nonMT | UInt32 | HEADMOST PACKET NUMBER OF I PICTURE WITHOUT MT |
|     PTS_I_nonMT | UInt32 | PTS OF I PICTURE WITHOUT MT |
| } | | |

FIG. 28

| | | |
|---|---|---|
| Num_of_I_nonMT | UInt32 | NUMBER OF I PICTURES WITHOUT MT |
| For(I=0; I<Num_of_I_nonMT; I++) { | | |
|     EP_Map_id | UInt32 | INDIRECTLY SPECIFY INFORMATION WITHIN EP_map CORRESPONDING TO THE HEADMOST PACKET OF I PICTURE WITHOUT MT |
| } | | |

FIG. 31

| | | |
|---|---|---|
| Num_of_EP_Entry | Uint32 | NUMBER OF EP_maps (THROUGH NUMBER OF GOPS) |
| For(I=0; I<Num_of_EP_Entry; I++) { | | |
| SPN | Uint32 | HEADMOST PACKET NUMBER OF I-PICTURE |
| PTS | Uint32 | PTS VALUE OF I-PICTURE |
| MT_flag | 1 bit | FLAG INDICATING WHETHER OR NOT THERE IS MT (E.G., 0=NO MT, 1=WITH MT) |
| } | | |

| | | |
|---|---|---|
| Num_of_EP_Entry | Uint32 | NUMBER OF EP_maps (THROUGH NUMBER OF GOPS) |
| For(I=0; I<Num_of_EP_Entry; I++) { | | |
|     SPN | Uint32 | HEADMOST PACKET NUMBER OF I-PICTURE |
|     PTS | Uint32 | PTS NUMBER OF I-PICTURE |
| } | | |

(b)

| I (TABLE NUMBER) | SPN | PTS |
|---|---|---|
| 0 | 0x00001234 | 0x0000ABC0 |
| 1 | 0x00010001 | 0x0001ABC1 |
| 2 | 0x00020002 | 0x0002ABC2 |
| 3 | 0x00030003 | 0x0003ABC3 |
| 4 | 0x00040004 | 0x0004ABC4 |
| 5 | 0x00050005 | 0x0005ABC5 |
| .. | .. | .. |
| 10 | 0x000A1234 | 0x000AABCA |
| .. | .. | .. |

(c)

| I (TABLE NUMBER) | SPN | PTS |
|---|---|---|
| 0 | 0x00001234 | 0x0000ABC0 |
| 1 | 0x00010001 | 0x0001ABC1 |
| 2 | 0x00020002 | 0x0002ABC2 |
| 3 | 0x00030003 | 0x0003ABC3 |
| 4 | 0x00040004 | 0x0004ABC4 |
| 5 | 0x00050005 | 0x0005ABC5 |
| .. | .. | .. |
| 10 | 0x000A1234 | 0x000AABCA |
| .. | .. | .. |

US 8,346,062 B2

INFORMATION PROCESSING DEVICE, INFORMATION RECORDING MEDIUM MANUFACTURING DEVICE, INFORMATION RECORDING MEDIUM, METHODS THEREOF, AND COMPUTER PROGRAM

CROSS REFERENCES TO RELATED APPLICATIONS

This application claims the benefit to U.S. Provisional Patent Application US60/712389, filed on Aug. 31, 2005.

The present invention contains subject matter related to Japanese Patent Application JP 2005-252860 filed in the Japanese Patent Office on Aug. 31, 2005, and Japanese Patent Application JP 2006-154792 filed in the Japanese Patent Office on Jun. 2, 2006, the entire contents of which are incorporated herein by reference.

BACKGROUND OF THE INVENTION

1. Field of the Invention

The present invention relates to an information processing device, an information recording medium manufacturing device, an information recording medium, methods thereof, and a computer program. Further in detail, the present invention relates to an information processing device, an information recording medium manufacturing device, an information recording medium, and methods thereof, and also a computer program, wherein unauthorized content usage is eliminated by subjecting various types of content which require content usage management to data transformation processing, thereby realizing strict content usage management.

2. Description of the Related Art

Various types of software data, such as audio data like music and so forth, image data like movies and so forth, game programs, various types of application programs and so forth (hereafter referred to as "content") can be stored as digital data in recording media, for example, a Blu-ray disc (registered trademark) which employs blue laser, or DVD (Digital Versatile Disc), MD (Mini Disc), and CD (Compact Disc). In particular, Blu-ray discs (registered trademark) which employ blue laser are high-density recording-capable disks, and can record massive amounts of picture contents and the like as high-image-quality data.

Digital content is stored in such various types of information recording mediums (recording media) so as to be provided to users. Users reproduce and use the content on a reproduction device such as a PC (Personal Computer), disk player, etc., owned by the user.

Generally, the distribution right and so forth of many contents such as music data, image data, and so forth, is held by the creator or vendor thereof. Accordingly, at the time of distribution of content, an arrangement is normally implemented wherein certain restrictions on usage are laid down, i.e., usage of content is permitted only for authorized users, and unauthorized reproduction and the like is prevented.

With digital recording devices and recording media, recording and reproduction can be repeated without deterioration in image or audio for example, and problems are occurring such as distribution of illegally copied contents over the Internet, distribution of so-called bootleg edition disks of contents copied onto CD-Rs or the like, usage of copied contents stored on hard disks of PCs and the like, in proliferation.

Large-capacity recording media such as DVDs, recording media using blue laser which have been developed in recent years, and so forth, are capable of recording great amounts of data, e.g., one to several movies, as digital information on a single disk. The ability to record picture information and the like as digital information makes preventing unauthorized copies to protect copyright holders an even more important issue. Various techniques have been implemented as of recent for preventing unauthorized copying to digital recording devices and recording media, in order to prevent such unauthorized copying of digital data.

SUMMARY OF THE INVENTION

One technique to prevent unauthorized copying of content and protect the copyright holder is encryption processing of the content. However, even with encrypted content, there is the problem that if the secret key is leaked, unauthorized decrypted content leaks out. The arrangement described in Japanese Unexamined Patent Application Publication No. 11-45508 is a related art wherein an arrangement is disclosed of solving such problems, i.e., an arrangement wherein unauthorized reproduction of content is prevented by rewriting a part of the content with dummy data is disclosed therein.

However, even if content is replaced with dummy data, the setting position or configuration of the dummy data sometimes enables the contents of a content to be recognized without affecting the content greatly. That is to say, reproduction of content can be effectively prevented by performing processing which takes the setting position of the dummy data, modification mode as to the content, and the like into consideration. Also, in the event of subjecting content to modification by inserting dummy data or the like, the modified content needs to be replaced with normal content data when reproducing the content. For example, in the event of performing high-speed reproduction, it is difficult to execute such data replacement, resulting in a problem in which high-speed reproduction cannot be performed.

The present invention has been made in light of such a situation. It has been found to be desirable to realize an arrangement wherein content can be effectively destroyed with data modification, realize an arrangement wherein content can be effectively prevented from unauthorized usage, and further, provide an information processing device, an information recording medium manufacturing device, an information recording medium, and methods thereof, and also a computer program, wherein with special reproduction such as high-speed reproduction for example, high quality reproduction can be realized by enabling reproduction without using modified data portions.

An information processing device according to an embodiment of the present invention includes: a modified data generating unit for generating modified data obtained by modifying content configuration data; a fix-up table generating unit for generating a fix-up table in which transformation data serving as an object to be replaced with the modified data is registered; and a data recording unit for recording content including the modified data, and the fix-up table in an information recording medium; wherein the modified data generating unit is configured so as to execute data modification processing with the configuration units of MPEG encoded data included in a TS packet making up content as data modification processing units.

Further, the modified data generating unit may be configured so as to execute data modification processing in which a slice within a DCT block included in MPEG encoded data is set as data modification processing units to generate broken data serving as broken content, and the data recording unit may be configured so as to execute processing for recording content including the broken data in an information recording medium.

The modified data generating unit may be configured so as to execute data modification processing in which an arithmetic code block set in a picture of MPEG encoded data is set as data modification processing units to generate broken data serving as broken content, and the data recording unit may be configured so as to execute processing for recording content including the broken data in an information recording medium.

Further, the modified data generating unit may be configured so as to execute data modification processing in which an I picture included in MPEG encoded data is selected as a picture to be subjected to data modification processing to generate broken data serving as broken content, and the data recording unit may be configured so as to execute processing for recording content including the broken data in an information recording medium.

Further, the fix-up table generating unit may be configured so as to generate a fix-up table in which identifier-set transformation data enabling the identification information of a content reproducing device or content reproducing application to be analyzed is registered.

Further, the fix-up table generating unit may be configured so as to execute data modification processing in which identifier-set transformation data enabling the identification information of a content reproducing device or content reproducing application to be analyzed is set with a macro block within a DCT block included in MPEG encoded data as data modification processing units to generate the identifier-set transformation data.

Further, the fix-up table generating unit may be configured so as to execute data modification processing in which identifier-set transformation data enabling the identification information of a content reproducing device or content reproducing application to be analyzed is set with a B picture included in MPEG encoded data as data modification processing units to generate the identifier-set transformation data.

Further, the modified data generating unit may be configured so as to select from multiple I pictures included in MPEG encoded data: an I picture serving as modified data; and an I picture serving as non-modified data respectively, and subject only the I picture selected as modified data to data modification processing to generate broken data.

Further, the information processing device may further include a reproduction management information generating unit for executing generating processing of a table or EP map enabling the positional information of a non-modified I picture to be acquired, with the data recording unit being configured so as to execute processing for recording a table or EP map enabling the positional information of a non-modified I picture generated by the reproduction management information generating unit to be acquired in an information recording medium.

Further, the modified data generating unit may be configured so as to execute processing for generating broken data by setting an I picture serving as non-modified data for each predetermined cycle (N), of multiple I pictures included in MPEG encoded data.

Further, the modified data generating unit may be configured so as to execute data modification processing in which all I pictures included in MPEG encoded data are selected as non-modified data, and only a B picture or P picture is selected as a picture to be subjected to modification processing to generate broken data.

An information recording medium according to another embodiment of the present invention, in which is recorded content, stores: a content in which partial configuration data of the content is set as modified data; a fix-up table recording setting position information regarding transformation data serving as an object to be replaced with the modified data, and the content of the transformation data; wherein the modified data is data generated by executing the data modification processing as to one or more picture data other than the specified non-modified I picture of the multiple I pictures included in the MPEG encoded data.

Further, the modified data may include broken data preventing normal reproduction, with the broken data being modified data generated with data modification processing in which the configuration units of MPEG encoded data included in a TS packet making up content is set as data modification processing units.

Further, the modified data may include broken data preventing normal reproduction, with the broken data being modified data generated with data modification processing in which a slice within a DCT block included in MPEG encoded data is set as processing units.

Further, the modified data may include broken data preventing normal reproduction, with the broken data being modified data generated with data modification processing in which an arithmetic code block set in a picture of MPEG encoded data is set as processing units.

Further, the modified data may include broken data preventing normal reproduction, with the broken data being modified data generated with data modification processing in which an I picture included in MPEG encoded data is selected as a picture to be subjected to data modification processing.

Further, the fix-up table may be a fix-up table in which identifier-set transformation data enabling the identification information of a content reproducing device or content reproducing application to be analyzed is registered.

Further, the identifier-set transformation data may be data generated with data modification processing in which a macro block within a DCT block included in MPEG encoded data is set as a processing unit.

Further, the identifier-set transformation data is data generated with data modification processing in which a B picture included in MPEG encoded data is set as a processing unit.

Further, the information recording medium may further include a table or EP map enabling the positional information of the non-modified I picture to be acquired as recorded information.

Further, the stored content of the information recording medium may be a content in which a non-modified I picture is set for each predetermined cycle (N), of multiple I pictures included in MPEG encoded data.

Further, the information recording medium may have an EP map with multiple entries corresponding to a packet number as address information and a presentation time stamp (PTS), with the stored content being content wherein a non-modified I picture is set as to the entry for each predetermined cycle of the entries registered in the EP map.

Further, the content stored in the information recording medium is a content in which all I pictures included in MPEG encoded data are selected as non-modified I pictures.

A data structure according to another embodiment of the present invention includes: a content in which partial configuration data of a content is set as modified data; a fix-up table recording setting position information regarding transformation data serving as an object to be replaced with modified data, and the content of the transformation data; wherein the modified data is data generated by executing the data modification processing as to one or more picture data other than the specified non-modified I picture of the multiple I pictures included in the MPEG encoded data.

Further, the modified data may be modified data generated with data modification processing in which the configuration units of MPEG encoded data included in a TS packet making up content is set as data modification processing units.

Further, the modified data may be modified data generated with data modification processing in which a slice within a DCT block included in MPEG encoded data is set as a processing unit.

Further, the modified data may be modified data generated with data modification processing in which an arithmetic code block set in a picture of MPEG encoded data is set as a processing unit.

Further, the modified data may be modified data generated with data modification processing in which an I picture included in MPEG encoded data is selected as a picture to be subjected to data modification processing.

Further, the fix-up table may be a fix-up table in which identifier-set transformation data enabling the identification information of a content reproducing device or content reproducing application to be analyzed is registered.

Further, the identifier-set transformation data may be data generated with data modification processing in which a macro block within a DCT block included in MPEG encoded data is set as a processing unit.

Further, the identifier-set transformation data may be data generated with data modification processing in which a B picture included in MPEG encoded data is set as a processing unit.

Further, a table or EP map enabling the positional information of the non-modified I picture to be acquired may be included.

Further, the content may be a content in which a non-modified I picture is set for each predetermined cycle (N), of multiple I pictures included in MPEG encoded data.

Further, the data structure may have an EP map with multiple entries corresponding to a packet number as address information and a presentation time stamp (PTS), and the stored content is content wherein a non-modified I picture is set as to the entry for each predetermined cycle of the entries registered in the EP map.

Further, the content may be a content in which all I pictures included in MPEG encoded data are selected as non-modified I pictures.

An information recording medium manufacturing device according to another embodiment of the present invention includes: a modified data generating unit for generating modified data obtained by modifying content configuration data; a fix-up table generating unit for generating a fix-up table in which transformation data serving as an object to be replaced with the modified data is registered; and a data recording unit for recording content including the modified data, and the fix-up table in an information recording medium; wherein the modified data generating unit is configured so as to execute data modification processing with the configuration units of MPEG encoded data included in a TS packet making up content as data modification processing units.

An information processing device, according to another embodiment of the present invention, for executing reproducing processing of content subjected to MPEG encoding processing of which part of content configuration data is set as modified data, includes: a non-modified I-picture selecting unit for selecting an I picture serving as non-modified data from the content; and a decoding output processing unit for executing decoding processing and output processing of the non-modified I picture selected by the non-modified I-picture selecting unit.

Further, the non-modified I-picture selecting unit may be configured so as to execute processing for obtaining the position of an I picture serving as non-modified data by applying at least one of a table and EP map which is set corresponding to a content to be reproduced.

Further, the non-modified I-picture selecting unit may be configured so as to execute processing for selecting an I picture for each predetermined cycle, and then selecting an I picture serving as non-modified data.

Further, the non-modified I-picture selecting unit may be configured so as to obtain cycle information equivalent to the interval of GOPs or I pictures made up of non-modified data as the cycle information of an EP map registration table, and obtain the information of the I picture set as the non-modified data from an EP map based on the cycle information.

Further, the non-modified I-picture selecting unit may be configured so as to execute processing for selecting an I picture serving as non-modified data based on fixed cycle information unchangeable for each content, which is information equivalent to the interval of GOPs or I pictures made up of non-modified data.

Further, the non-modified I-picture selecting unit may be configured so as to execute processing for selecting an I picture serving as non-modified data based on cycle information corresponding to a content, which is set according to a content, and is cycle information equivalent to the interval of GOPs or I pictures made up of non-modified data.

An information processing method according to another embodiment of the present invention may include the steps of: modified data generating for generating modified data obtained by modifying content configuration data; fix-up table generating for generating a fix-up table in which transformation data serving as an object to be replaced with the modified data is registered; and data recording for recording content including the modified data, and the fix-up table in an information recording medium; wherein the modified data generating executes data modification processing with the configuration units of MPEG encoded data included in a TS packet making up content as data modification processing units.

Further, the modified data generating may be a step for executing data modification processing in which a slice within a DCT block included in MPEG encoded data is set as data modification processing units to generate broken data serving as broken content, and the data recording is a step for executing processing for recording content including the broken data in an information recording medium.

Further, the modified data generating may be a step for executing data modification processing in which an arithmetic code block set in a picture of MPEG encoded data is set as data modification processing units to generate broken data serving as broken content, and the data recording is a step for executing processing for recording content including the broken data in an information recording medium.

Further, the modified data generating may be a step for executing data modification processing in which an I picture included in MPEG encoded data is selected as a picture to be subjected to data modification processing to generate broken data serving as broken content, and the data recording is a step for executing processing for recording content including the broken data in an information recording medium.

Further, the fix-up table generating may be a step for generating a fix-up table in which identifier-set transformation data enabling the identification information of a content reproducing device or content reproducing application to be analyzed is registered.

Further, the fix-up table generating may be a step for executing data modification processing in which identifier-set transformation data enabling the identification information of a content reproducing device or content reproducing application to be analyzed is set with a macro block within a DCT block included in MPEG encoded data as data modification processing units to generate the identifier-set transformation data.

Further, the fix-up table generating may be a step for executing data modification processing in which identifier-set transformation data enabling the identification information of a content reproducing device or content reproducing application to be analyzed is set with a B picture included in MPEG encoded data as data modification processing units to generate the identifier-set transformation data.

Further, the modified data generating may be a step for selecting from multiple I pictures included in MPEG encoded data: an I picture serving as modified data; and an I picture serving as non-modified data respectively, and subjecting only the I picture selected as modified data to data modification processing to generate broken data.

Further, the information processing method may further include the step of reproduction management information generating for executing generating processing of a table or EP map enabling the positional information of a non-modified I picture to be acquired; wherein the data recording executes processing for recording a table or EP map enabling the positional information of a non-modified I picture generated in the reproduction management information generating to be acquired in an information recording medium.

Further, the modified data generating may execute processing for generating broken data by setting an I picture serving as non-modified data for each predetermined cycle (N), of multiple I pictures included in MPEG encoded data.

Further, the modified data generating may execute data modification processing in which all I pictures included in MPEG encoded data are selected as non-modified data, and only a B picture or P picture is selected as a picture to be subjected to modification processing to generate modified data.

Further, the selection process of the non-modified I picture may acquire an EP map with multiple entries corresponding to the packet number as address information and a presentation time stamp (PTS), and includes processing for selecting an entry for each predetermined cycle of the entries registered in the EP map.

An information recording medium manufacturing method according to another embodiment of the present invention may include the steps of: modified data generating for generating modified data obtained by modifying content configuration data; fix-up table generating for generating a fix-up table in which transformation data serving as an object to be replaced with the modified data is registered; and data recording for recording of content including the modified data, and the fix-up table in an information recording medium; wherein the modified data generating is a step for executing data modification processing with the configuration units of MPEG encoded data included in a TS packet making up content as data modification processing units.

An information processing method, according to another embodiment of the present invention, for executing reproducing processing of content subjected to MPEG encoding processing of which part of content configuration data is set as modified data, includes the steps of: non-modified I picture selecting for selecting of an I picture serving as non-modified data from the content; and decoding output processing for executing of decoding processing and output processing of the non-modified I picture selected by the non-modified I-picture selecting unit.

Further, the non-modified I picture selecting may be a step for executing processing for obtaining the position of an I picture serving as non-modified data by applying at least one of a table and EP map which is set corresponding to a content to be reproduced.

Further, the non-modified I picture selecting may be a step for executing processing for selecting an I picture for each predetermined cycle, and then selecting an I picture serving as non-modified data.

Further, the non-modified I picture selecting may be processing for obtaining cycle information equivalent to the interval of GOPs or I pictures made up of non-modified data, and obtaining the information of the I picture set as the non-modified data from an EP map based on the cycle information.

Further, the non-modified I picture selecting may be processing for selecting an I picture serving as non-modified data based on fixed cycle information unchangeable for each content, which is cycle information equivalent to the interval of GOPs or I pictures made up of non-modified data.

Further, the non-modified I picture selecting may be processing for selecting an I picture serving as non-modified data based on cycle information corresponding to a content, which is set according to a content, and is cycle information equivalent to the interval of GOPs or I pictures made up of non-modified data.

A computer program, which causes an information processing device to execute processing for recording content in an information recording medium, according to another embodiment of the present invention, includes code for the steps of: modified data generating for generating of modified data obtained by modifying content configuration data; fix-up table generating for generating of a fix-up table in which transformation data serving as an object to be replaced with the modified data is registered; and data recording for recording of content including the modified data, and the fix-up table in an information recording medium; wherein the modified data generating is set as a step for executing data modification processing with the configuration units of MPEG encoded data included in a TS packet making up content as data modification processing units.

A computer program, which causes an information processing device to execute reproducing processing of content subjected to MPEG encoding processing of which part of content configuration data is set as modified data, according to another embodiment of the present invention, includes code for the steps of: non-modified I picture selecting for selecting an I picture serving as non-modified data from the content; and decoding output processing for executing decoding processing and output processing of the non-modified I picture selected by the non-modified I-picture selecting unit.

Note that the computer program according to the present invention may be, for example, a computer program capable of providing a computer system capable of executing various types of program codes, through storage media or communication media capable of providing in a computer-readable format, e.g., recording mediums such as CDs, FDs, MOs, and so forth, or communication mediums such as a network or the like. Providing such a program in a computer-readable format realizes processing corresponding to the program on the computer system.

Other objects, features, and advantages of the present invention will become apparent from further detailed description by way of later-described arrangements of the present invention and attached drawings. Note that the term "system" as used in the present specification means a logical assembly arrangement of multiple devices, and is not restricted to an arrangement wherein all of the component devices are in the same housing.

According to the configuration of an example of the present invention, an arrangement may be made wherein content including modified data different from authorized content configuration data is recorded in an information recording medium, and further a fix-up table recording transformation data which is authorized content configuration data serving as an object to be replaced with the modified data, and the setting positional information as to the transformation data content is stored in the information recoding medium, and also an arrangement may be made wherein when performing content reproducing processing, the content configuration data is subjected to replacement processing with transformation data in accordance with the fix-up table recorded in the information recording medium, so even in the event that encryption key leaking as to the encrypted content recorded in the information recording medium occurs, the device which cannot obtain the transformation data cannot execute reproduction of the content, thereby preventing the content from unauthorized usage.

Also, according to the configuration of an example of the present invention, transformation data including data enabling the configuration bits of identification information which enables a content reproducing device or content reproducing application to be identified to be analyzed is applied, so even in the event that unauthorized content should flow out, transformation data analysis enables the outflow source of the unauthorized content to be pinpointed.

Also, according to the configuration of an example of the present invention, as for the setting position of modified data, more effective setting for realizing destruction of data, e.g., effective data destruction may be realized by an arrangement wherein the identification data region of MPEG data is set as an object to be modified, or the like, and also data modification for enabling the configuration bits of identification information which enables a content reproducing device or content reproducing application to be identified to be analyzed is set so as to reduce affect as to the original data content as least as possible.

Also, according to the configuration of an example of the present invention, an arrangement may be made wherein content is generated so as to allow special reproduction such as high-speed reproduction regarding a content in which modified data is set to reproduce the portion other than the modified data portion, and is recorded in an information recording medium. With special reproduction such as high-speed reproduction, a reproducing processing device can perform special reproduction which requires no execution of data transformation.

BRIEF DESCRIPTION OF THE DRAWINGS

FIG. 3 is a diagram describing a device configuration for executing creating and recording processing of content including modified data, and manufacturing processing of an information recording medium storing a content;

FIG. 4 is a diagram describing generating processing steps of a content including modified data;

FIG. 5 is a diagram describing the data configuration of a data fix-up table to be recorded in an information recording medium;

FIG. 6 is a diagram illustrating the entire data configuration of a fix-up table;

FIG. 7 is a diagram illustrating the data configuration of one fix-up table block (FUT block) of multiple fix-up table blocks (FUT blocks) included within a fix-up table;

FIG. 8 is a diagram illustrating the data configuration of a transformation data entry within a fix-up table block (FUT);

FIG. 9 is a diagram describing processing for generating modified data in an encoding method to which a DCT block configuration is applied;

FIG. 27 is a diagram describing an example of a table (special reproduction management information table) in which the positions of the I pictures which are not set as modified data are recorded;

FIG. 28 is a diagram describing an example of a table (special reproduction management information table) in which the positions of the I pictures which are not set as modified data are recorded;

FIG. 31 is a diagram illustrating an EP map configuration for enabling special reproduction such as high-speed reproduction made up of only the pictures without data modification by applying modification to the EP map itself, and referring to the EP map alone;

FIG. 39 is a diagram describing a reproducing processing example applying an EP map to a content in which GOP or picture data serving as non-modified data is set in a predetermined cycle;

DESCRIPTION OF THE PREFERRED EMBODIMENTS

Figure 1:
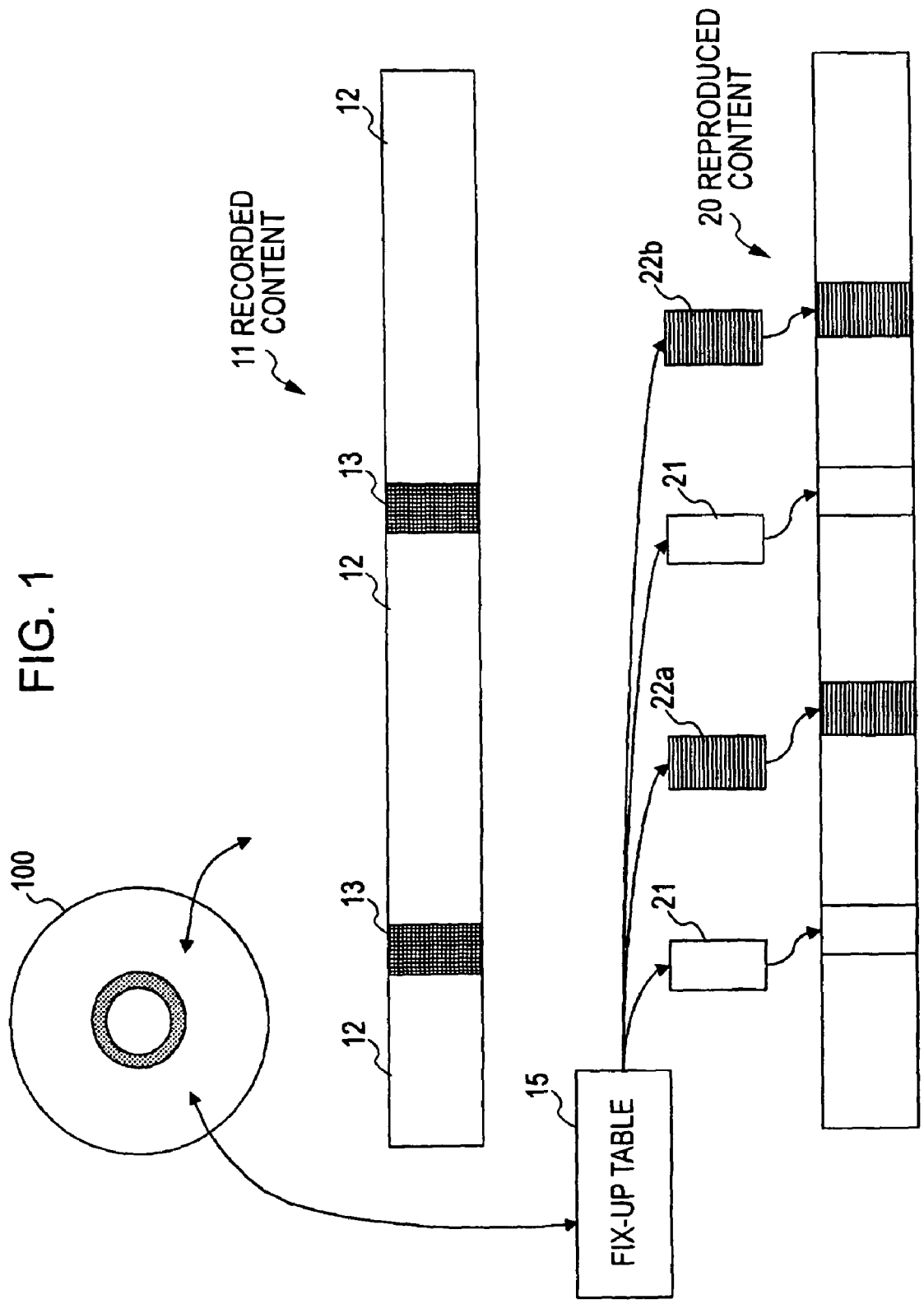
FIG. 1 is a diagram describing a content to be recorded in an information recording medium, and data transformation processing necessary for content reproduction.

The information processing device, information recording medium manufacturing device, information recording medium, methods thereof, and computer program, according to the present invention, will be described in detail with reference to the drawings. Note that the description will be made according to the following items.

1. Generating and recording processing of content, and manufacturing processing of an information recording medium 2. Generating processing of modified data 2-1. Generating processing of broken data 2-2. Generating processing of identifier-set transformation data 2-3. Transformation data generating processing in the parallel-usage method of a DCT block configuration and arithmetic encoding 3. Stored data in an information recording medium, and overview of processing in the drive and host 4. About the content management unit (CPS unit)

5. Content reproducing processing (5.1) Content reproducing processing example 1

(5.2) Content reproducing processing example 2

(5.3) Content reproducing processing example 3

6. Generating and reproducing processing example 1 of a content including modified data corresponding to special reproduction 7. Generating and reproducing processing example 2 of a content including modified data corresponding to special reproduction 8. Configuration of the information processing device 1. Generating and Recording Processing of Content, and Manufacturing Processing of an Information Recording Medium First, description will be made regarding generating and recording processing of content, and manufacturing processing of an information recording medium.

Description will be made regarding the configuration of a content to be stored in an information recording medium, and overview of reproducing processing with reference to FIG. 1. An information recording medium 10 is an information recording medium such as, for example, a Blu-ray disc (registered trademark), DVD, or the like, and is an information recording medium storing authorized content (ROM disc or the like), manufactured at the disc manufacturing plant under the permission of the so-called content right holder, having proper content rights or distribution rights, or an information recording medium capable of recording data (RE disk or the like). Note that with the following embodiment, a disk-type medium will be used as an example for describing the information recording medium, the present invention is capable of being applied to configurations using various types of information recording media.

For example, AV (Audio Visual) content such as a movie is stored in the information recording medium 10. These contents are subjected to encryption, and content reproduction is possible following decryption by processing applying an encryption key obtainable only by a reproduction and device having a certain license. Specific content reproducing processing will be described later. The content stored in the information recording medium 10 is not only encrypted, but also has a configuration wherein the content configuration data has been replaced with modified data.

FIG. 1 illustrates the configuration example of a recording content 11 stored in the information recording medium 10.

The recording content 11 is configured of normal content data 12 which has not been modified, and modified data 13 which is content that has been added by being modified. The modified data 13 includes data embedded into a stream, the broken data, and identifier-set modification data. The broken data is data which has been destroyed by the original content having been subjected to data processing, and is data formed from random numbers. Accordingly, proper content reproduction cannot be performed of this content 11 including the broken data. The identifier-set modification data is data for embedding a player ID, and the identifier-set modification data can reproduce without influencing the viewing or listening of a user.

In order to perform content reproduction, processing for replacing the broken data within the modification data 13 included in the recorded content 11 with a proper content data, to generate a reproduction content 20, is necessary. Transformation data serving as content data corresponding to the respective modification data regions is registered in a fix-up table 15 recorded in the information recording medium 10. The information processing device (reproducing device) for executing content reproduction obtains transformation data 21 registered in the fix-up table 15 recorded in the information recording medium 10, executes processing for replacing the data in the broken data regions with this to generate a reproduction content 20, and executes reproduction. Specific examples of the fix-up table, and the detail of reproducing processing using the fix-up table will be described later.

Now, at the time of generating the reproduction content 20, in addition to the processing for replacing the modification data 13 with transformation data 21 which is normal content data, processing is performed for replacing a partial region of the recorded content 10 with identifier-set transformation data 22 including data enabling analysis of the configuration bits of identification information making a content reproducing device or content reproducing application identifiable (e.g., a player ID). For example, in a case of unauthorized copied content leaking out, analyzing the identifier-set transformation data 22 within the leaked content can enable the source of leakage of the unauthorized content to be determined.

Figure 2:
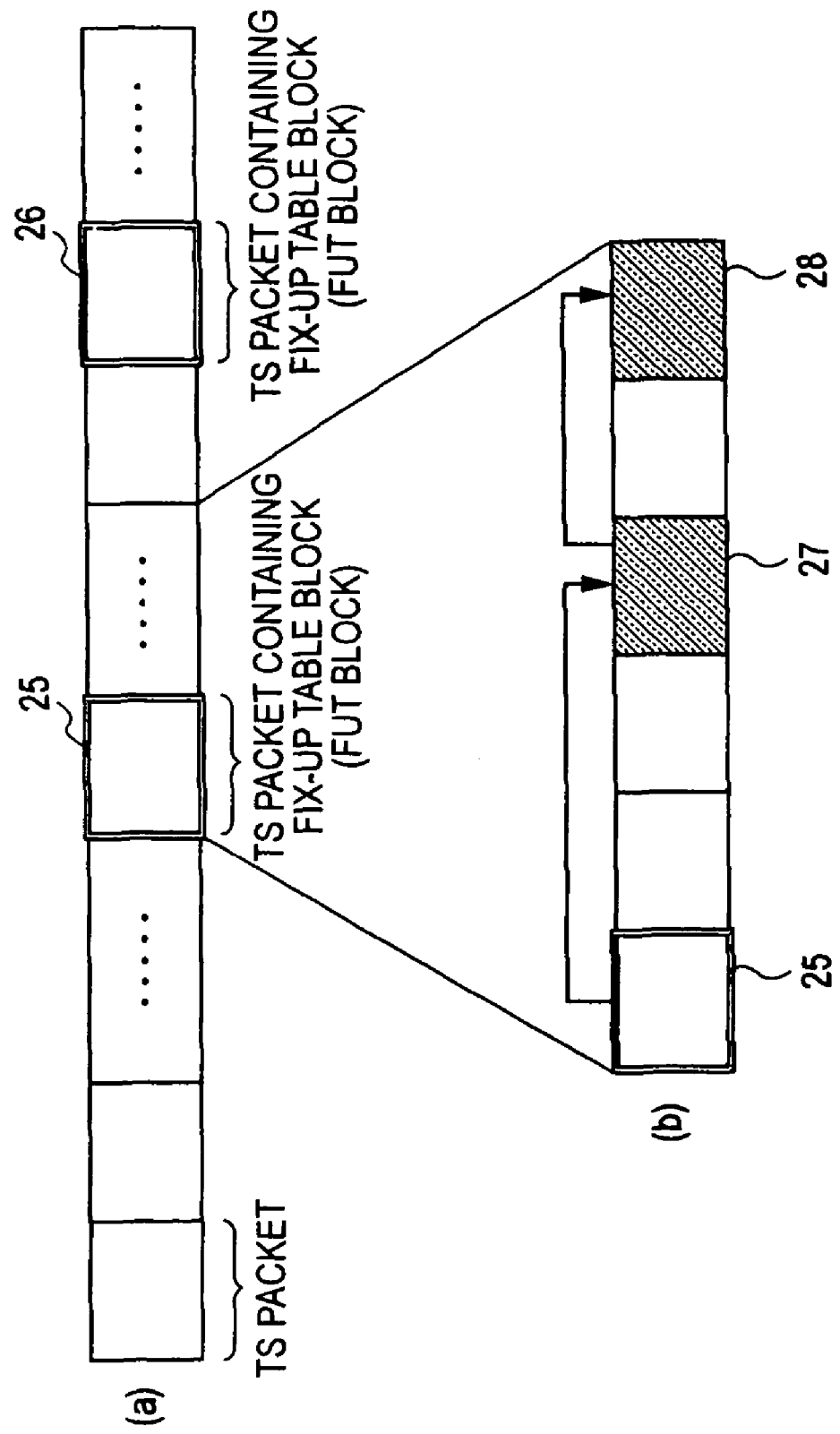
FIG. 2 is a diagram describing data configuration in a case wherein a fix-up table is stored within transport stream packets including a content.

Note that an arrangement may be made wherein the fix-up table is recorded in the information recording medium by setting as a file separate from the content, or is recorded in a manner scattered throughout certain packets within the configuration data of the content. In the event of employing an arrangement wherein the fix-up table is recorded in a manner scattered throughout certain packets within the configuration data of the content, for example, as shown FIG. 2, the fix-up table is stored in the transport stream packets including a content. FIG. 2A illustrates the configuration of content data. This content configuration illustrates content data made up of decrypted transport stream (TS) packets. The transport stream is made up of TS (transport stream) packets of a predetermined number of bytes. The fix-up table is divided and recorded in the multiple packets which are a part of these TS packets. For example, the fix-up table is recorded in TS packets 25, 26, and so on shown in the drawing. Examples of TS packets used for storing a fix-up table include TS packets including a PMT (programmable map table) set in a scattered manner throughout a content, and so forth.

Recorded in a fix-up table is transformation data (or identifier-set transformation data) for performing a replacement processing with regard to the decrypted content, and the recorded position of the transformation data.

The transformation data recorded in each of the fix-up tables, has the recorded position set nearby the TS packets including each of the fix-up tables, as shown in FIG. 2B, for example. For example, with the example shown in FIG. 2B, the packets 27 and 28 having transformation data recording regions are set nearby the packet 25 including the fix-up table. Setting thus enables data replacement processing using transformation data as continuous processing following decryption in the case of decrypting and reproducing a content in real-time, and detection and analysis processing of TS packets recording the fix-up table allows processing for obtaining the transformation data and writing (overwriting) the transformation data to the position recorded in the table to be carried out effectively.

Note that an arrangement is preferably made wherein in the event of generating the modified data 13 included in the recorded content 11 shown in FIG. 1, the content needs to be broken using data processing as to the original content, and processing on the data region as least as possible generates great influence upon the reproduction data of the content effectively.

That is to say, the modified data 13 included in the recorded content 11 shown in FIG. 1 is preferably set in the position where normal content image cannot be recognized by the processing as to the small data region.

On the other hand, the identifier-set transformation data 22 shown in FIG. 1 is transformation data including an identifier in normal content, but this is transformation data to be applied for content reproduction, so the device which does not cause a great alteration to normal content is required. Hereinafter, description will be made regarding generation of content, and manufacturing processing of an information recording medium storing the content.

FIG. 3 is a diagram describing generation of a content including modified data, an information processing device for subjecting an information recording medium storing the content to data recording processing, and processing in an information recording medium manufacturing device for executing manufacturing processing of an information recording medium. These devices first input content material 30 such as a movie to be recorded in an information recording medium, and execute encoding processing such as MPEG encoding or the like at an encoding processing unit 31, for example. Next, these devices execute multiplexing processing of TS packets such as video data and audio data, and in addition, a PMT (programmable map table) or the like at a multiplexing processing unit 32. FIG. 4A illustrates an AV stream data configuration following the multiplexing processing. The PMT indicates programmable map table data, V indicates video data, and A indicates audio data, respectively. The PMT, as described with reference to FIG. 2, is used as a recorded region of the fix-up table in which transformation data is registered. With this time point, a fix-up table has not been generated, so dummy FUT information is recorded in the PMT.

A modified data position determining unit 33 determines the data position of a content for executing data replacement with transformation data. That is to say, the modified data position determining unit 33 determines the setting position of broken data, and the setting position of content data to be replaced with identifier-set transformation data. Note that as described above, the setting position of broken data is configured such that processing as to a data region as small as possible causes great influence upon the reproduction data of a content effectively, and the setting position of identifier-set modified data is a position which does not greatly affect the normal content. Specific examples regarding these will be made later. For example, video data 41 and 42 shown in FIG. 4B are determined as modified data positions.

Next, a fix-up table generating unit 34 generates a fix-up table in which transformation data is registered. That is to say, the fix-up table generating unit 34 generates a fix-up table in which transformation data serving as an object to be replaced with transformation data set as content configuration data is registered. Note that the fix-up table also stores identifier-set transformation data enabling the identification information of a content reproducing device or content reproducing application to be analyzed, and the fix-up table generating unit 34 also executes processing for generating this identifier-set transformation data.

Description will be made regarding the data configuration of the fix-up table to be recorded in an information recording medium with reference to FIG. 5. The data transformation table to be recorded in an information recording medium has the data configuration shown in FIG. 5, for example. That is to say, this table has the following data:

Number of Fix-Up Entry: Number of transformation data entries (Number of Fix-Up Entry)

Fix-Up Entry Length: Byte length of one transformation data entry (Byte Length of one Fix-Up Entry ( )=(N+6))

SPN (Source Packet Number): Packet number of the start position of an AV stream file of transformation data writing packets (Absolute Transformed Packet Number from the beginning of AV Stream File)

Byte Offset: Byte offset indicating the transformation data writing start position within the packet specified by the SPN (Start byte position of transformed data in the packet)

player_id_bit_position: Bit position of an identification mark (such as player ID) (Indicate bit position of Player ID for forensic)

Fix-Up Data: Transformation overwriting data (value to be overwritten (N bytes are transformed into one TS Packet))

A great number of broken data are disposed within one content in a scattered manner, these positions of broken data are overwritten with transformation data recorded in the fix-up table. Also, even with identifier-set transformation data including data enabling the configuration bits of identification information (e.g., player ID) which enables a content reproducing device or content reproducing application to be analyzed to be identified, a great number of writing positions are set within one content data. The fix-up table is set as a table in which "transformation overwriting data" serving as entity data of these (a) transformation data for transforming the broken data into authorized content data, and (b) identifier-set transformation data, and specification information of the writing positions of these data are recorded.

Note that the fix-up table (FUT) can be divided into multiple PMT positions within a content, and recorded. The fix-up table to be recorded in an information recording medium may be divided into fix-up table blocks serving as partial configuration data of the fix-up table, and recorded within a content in a scattered manner. These fix-up table blocks are subjected to obfuscation processing for each block using computation such as AES encryption, exclusive-OR computation, or the like.

The information processing device for executing content reproduction causes the secure VM set on the information processing device side to execute decryption processing or predetermined computation processing for each fix-up table block (FUT block) to obtain the fix-up table for each block serving as plaintext data, and then obtains the transformation data. The secure VM executes these processing intermittingly before and during content reproduction or output processing. The details of this processing will be described later.

Description will be made with reference to FIGS. 6 through 8 regarding a data configuration example of the fix-up table in the case in which the fix-up table is divided into fix-up table blocks serving as partial configuration data of the fix-up table, and recorded within a content in a scattered manner.

FIG. 6 illustrates the entire data configuration of the fix-up table, FIG. 7 illustrates the data configuration of one fix-up table block (FUT block) of multiple fix-up table blocks (FUT blocks) included within the fix-up table, and FIG. 8 illustrates the data configuration of a transformation data entry within a fix-up table block (FUT).

As shown in FIG. 6, the fix-up table includes the following data:

Number of FUT blocks: Number of fix-up table blocks

Length of FUT block: Byte length of a fix-up table block

SP_No: Secret parameter (SP) number (associated with the SP generated by the VM)

First SPN for FUT block: Packet position assigned to a fix-up table block

FUT block ( ): Fix-up table block (each block is processed (obfuscated) with a different parameter)

The fix-up table includes multiple fix-up table blocks (FUT), and these multiple fix-up table blocks (FUT) are each subjected to exclusive-OR computation processing using a different secret parameter (SP1, SP2, SP3, and so on).

FIG. 7 illustrates one data configuration example of multiple fix-up table blocks (FUT blocks) included within the fix-up table shown in FIG. 6. Each of these fix-up table blocks (FUT blocks) is recorded in the TS packet 25 described with reference to FIG. 2, for example. As shown in FIG. 7, a fix-up table block includes the following data:

Number of FixUpEntry in this block: Number of transformation data (including identifier-set transformation data)

Base SPN for FixUpEntry: Position of a base packet serving as an index of the recording position of transformation data (Packet No.)

FixUpEntry ( ): Transformation data entry (processed (obfuscated) with a secret parameter)

FIG. 8 illustrates one data configuration example of a transformation data entry (FixUpEntry) included in the fix-up table block shown in FIG. 7. As shown in FIG. 8, the transformation data entry (FixUpEntry) includes the following data:

type_indicator: Type identifier [00: no transformation, 01b: processing with transformation data, 10b, 11b: processing with identifier-set transformation data]

FM_ID_bit_position: Identification bit position of the player ID corresponding to identifier-set transformation data relative_SPN: Packet position applying transformation data (number of packets from a programmable map table (PMT) storing packet)

byte_position: Transformation data recording position within a packet overwrite_value: Transformation data (including identifier-set transformation data)

relative_SPN_2: Packet position applying second transformation data (number of packets from a PMT packet)

byte_position_2: Transformation data recording position within a packet (corresponding to the second transformation data)

overwrite_value_2: Second transformation data (including identifier-set transformation data)

A transformation data entry includes these data.

The fix-up table is set as a fix-up table recording setting position information regarding transformation data serving as an object to be replaced with a part of the content data, and the content of the transformation data, and data transformation is performed by executing a data transformation processing program including a command for executing replacement processing of content configuration data using this fix-up table.

The information [type_indicator] included in the transformation data entry (Fix Up Entry) included in the fix-up table block shown in FIG. 8 is a type identifier for identifying whether the registration information of the fix-up table is (a) the registration information according to the transformation data for transforming broken data into authorized content data, or (b) the registration information according to the identifier-set transformation data for embedding the identification information of a reproducing device or content reproducing application.

In the event that the registration information region of the fix-up table is a registration information region according to the identifier-set transformation data for embedding the identification information of a reproducing device or content reproducing application, the transformation data which is selectively applied based on the identification information of the content reproducing device or content reproducing application, i.e., the identifier-set transformation data is registered as table registration information.

The registration information [FM_ID_bit_position] is positional information of bits to be referenced for determining processing mode, of the identification information of a reproducing device or reproducing application made up of multiple bits. For example, processing mode is determined wherein of the identification information of a reproducing device or reproducing application made up of multiple bits, in the event that the bits to be referenced for determining processing mode have a bit value of 1, replacement of identifier-set modification data within the content configuration data with the identifier-set transformation data registered in the fix-up table is executed, but in the event that the bits to be referenced have a bit value of 0, replacement is not executed, thereby executing data transformation.

Note that an arrangement may be made wherein in the event that the reference bits are 0, transformation is executed, but in the event of 1, transformation is not executed. Also, an arrangement may be made wherein the transformation data in the case in which the reference bits are 0, and the transformation data in the case of 1 are set as separate transformation data respectively, and the transformation data is selectively set depending on the bit values of the reference bits as appropriate.

Note that the fix-up table according to the present processing example includes multiple fix-up table blocks (FUT), and these multiple fix-up table blocks (FUT) are each subjected to exclusive-OR computation processing or encryption processing using a different secret parameter (SP1, SP2, SP3, and so on), and stored. That is to say, with the present processing example, the fix-up table is stored in an information recording medium as one independent file data, but as described with reference to FIGS. 6 through 8, includes multiple fix-up table blocks (FUT), and each of these multiple fix-up table blocks (FUT) is subjected to exclusive-OR computation processing individually applying a different secret parameter (SP1, SP2, SP3, and so on), and stored. The secret parameters are made up of 128 bit data, for example. The processing applying these parameters will be described later.

Following the fix-up table generating unit 34 generating a fix-up table in which transformation data is registered, a fix-up table recorded PMT determining unit 35 determines the position of a PMT (Programmable Map Table) where the fix-up table (FUT) is registered. As described above, the fix-up table (FUT) can be divided into multiple PMT positions within a content, and recorded. For example, as shown in FIG. 4(c), a PMT 43 is selected as the recording position of the fix-up table in which the transformation data corresponding to video data 41 and 42 is recorded.

A fix-up table recording processing unit 36 records the fix-up table in the PMT determined at the fix-up table recorded PMT determining unit 35. Next, a modified data generating unit 37 executes data destruction processing of content data at the broken data setting position included in the content data positions where the data replacement determined by the modified data position determining unit 33 is executed. For example, as shown in FIG. 4D, data destruction processing of the video contents of video data 41 and 42 is executed. Subsequently, a encryption processing unit 38 executes encryption processing in accordance with a predetermined sequence, and a data recording unit 39 executes recording processing to a disk, thereby generating a disc 10 in which the content is recorded. Note that the processing at the data recording unit 39 includes processing such as original disc fabrication, stamper manufacturing, and disc production by stamping.

2. Generating Processing of Modified Data

According to the above process, a disc serving as an information recording medium in which a content including modified data is recorded is manufactured. Next, modified data, i.e., a specific example of processing for generating broken data and identifier-set transformation data will be described with reference to FIG. 9 and so on. As described with reference to FIG. 3, the modified data position determining unit 33 determines the data position of a content for executing data replacement with transformation data, and the fix-up table generating unit 34 generates transformation data to be replaced with broken data, and identifier-set transformation data (overwrite value 1 and overwrite value 2 in FIG. 8), and then generates the fix-up table in which these are registered. Also, the modified data generating unit 37 destroys a partial region within a content to generate broken data and identifier-set modified data. Note that the identifier-set "modified" data is data to be replaced by (or which cannot be replaced by) identifier-set "transformation" data, according to the bit value of the player ID, and both the identifier-set modified data and the identifier-set transformation data are data sufficient for viewing and listening by the user (data capable of normal reproduction).

(2-1. Generating Processing of Broken Data)

As described above, broken data for destruction of an image is preferably configured such that processing as to a data region as small as possible causes great influence upon the reproduction data of a content effectively. That is to say, the broken data 13 included in the recorded content 11 shown in FIG. 1 is preferably set in a position such that normal content images cannot be recognized due to the processing performed on the small data region. For example, with the example of FIG. 8, a setting is desirable for the transformation data to be 5 bytes (40 bits), and for the modification to be made to be capable of sufficiently destroying the image information. The modified data generating unit 37 destroys a partial region within a content to generate broken data in light of such. The modified data generating unit 37 generates modified data using modification processing in which the configuration units of MPEG encoded data included in a TS packet making up content is set as data modification processing units.

The recorded content as to the information recording medium is the content subjected to MPEG encoding, for example. Hereinafter, description will be made regarding a processing example for generating broken data using each of the MPEG2 encoding method, for example, accompanying generation of a DCT block, and the MPEG4-AVC encoding method, for example, for performing arithmetic encoding in picture units.

(a) Processing for Generating Broken Data Using an Encoding Method to which a DCT Block Configuration is Applied.

The encoding method to which a DCT block configuration is applied is, for example, MPEG2 compression image data which is known as a technique for realizing high-definition image-compression processing. The MPEG2 compression method is data compression method realized by generating a DCT [Discrete Cosine Transformation] block which is compression using correlation within a screen. This is a compression method which combines movement compensation serving as compression based on correlation between screens and Huffman encoding serving as compression based on correlation of coding strings. With the MPEG2, predictive encoding is performed using movement compensation, so as shown in FIG. 9A, the image frames making up the moving image are classified into three elements called I picture, P picture, and B picture, and a GOP (Group of Pictures) configuration is employed as a group made up of predetermined units of I picture, P picture, and B picture frames.

The I pictures (Intra encoded images) are created using intra-field encoding, so are image frame data without performing predictive encoding based on the previous image. Upon a screen displaying only images created using predictive encoding, the screen cannot be displayed in an instant in response to random access. To this end, random access can be handled by periodically creating an image on the basis of access. In other words, the I pictures are present for maintaining independency of the GOPs.

The amount of data of one I picture is equivalent to double through triple of one P picture, and five times through six times of one B picture. The GOP means a group of pictures from one I picture to the next I picture. Accordingly, image prediction is performed between the pictures within this group. The P pictures (Predictive encoded images) are images created by performing predictive encoding from the last image, and are created based on the I pictures. The P pictures are defined as "intra-frame semi-directional predictive encoded images" as to the I pictures serving as "intra-frame encoded images". The B pictures (Bi-directional predictive encoded images) are "bi-directional predictive encoded images". The B pictures are created by performing prediction from the previous and following two I pictures or P pictures.

With the data compression method for generating a DCT [Discrete Cosine Transform] block which is applied in the MPEG2, each picture data is configured of multiple slices such as shown in FIG. 9B, and each slice is further configured of multiple macro blocks. The data destruction processing for generating broken data can be performed by setting, for example, any one of: macro block units, slice units, picture units, and GOP units.

Figure 10:
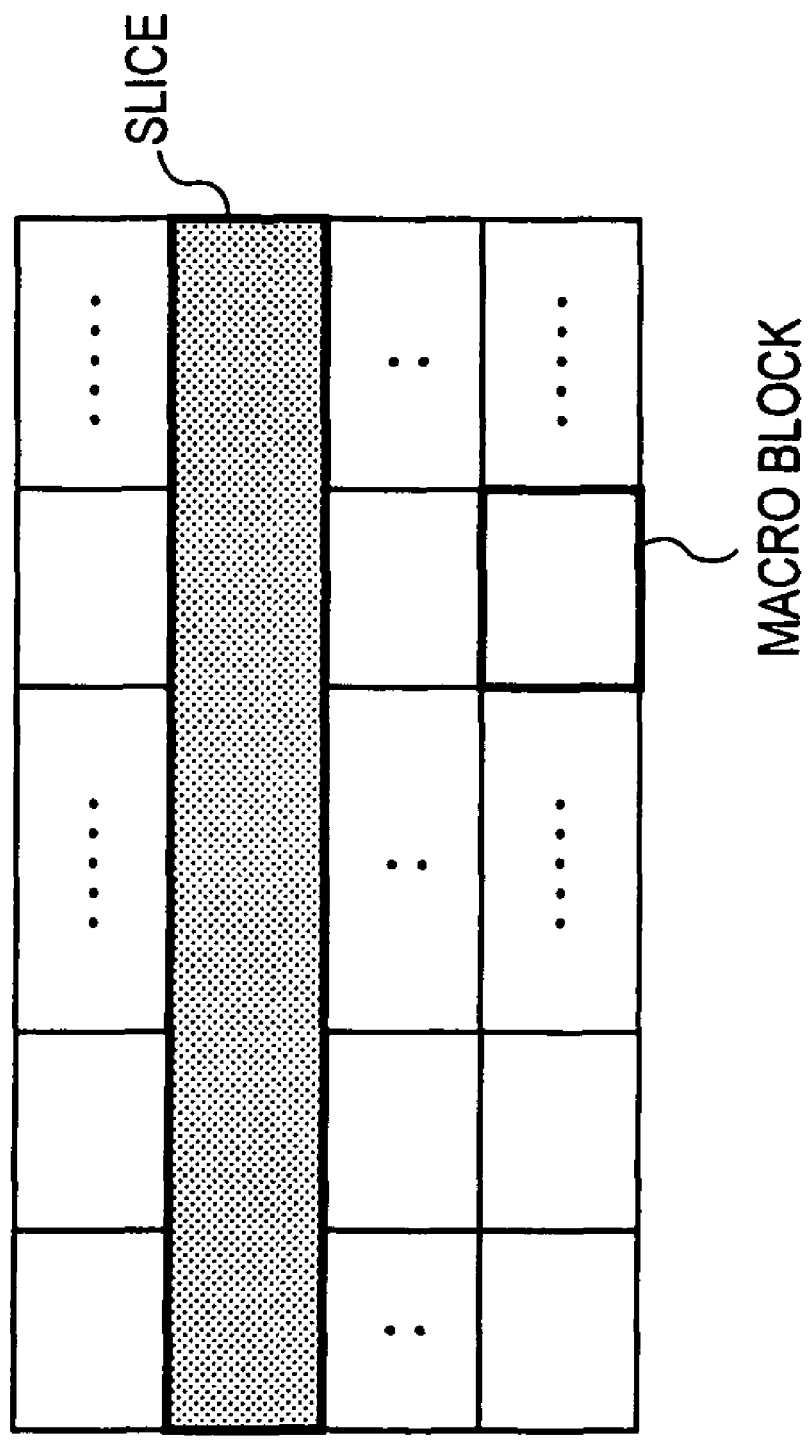
FIG. 10 is a diagram describing processing for generating modified data in an encoding method to which a DCT block configuration is applied.

Of these respective processing units, as shown in FIG. 10, generation of broken data by destroying data in slice units is effective. Specifically, restoration and reproduction of image data included in at least one slice becomes impossible by destroying (data processing) a region including a header included in a slice (slice information), and thus effective destruction of image data can be realized. Specifically, generation of broken data is performed by executing data processing with several bytes through several tens of bytes including a header included in a slice (slice information) as units.

Figure 11:
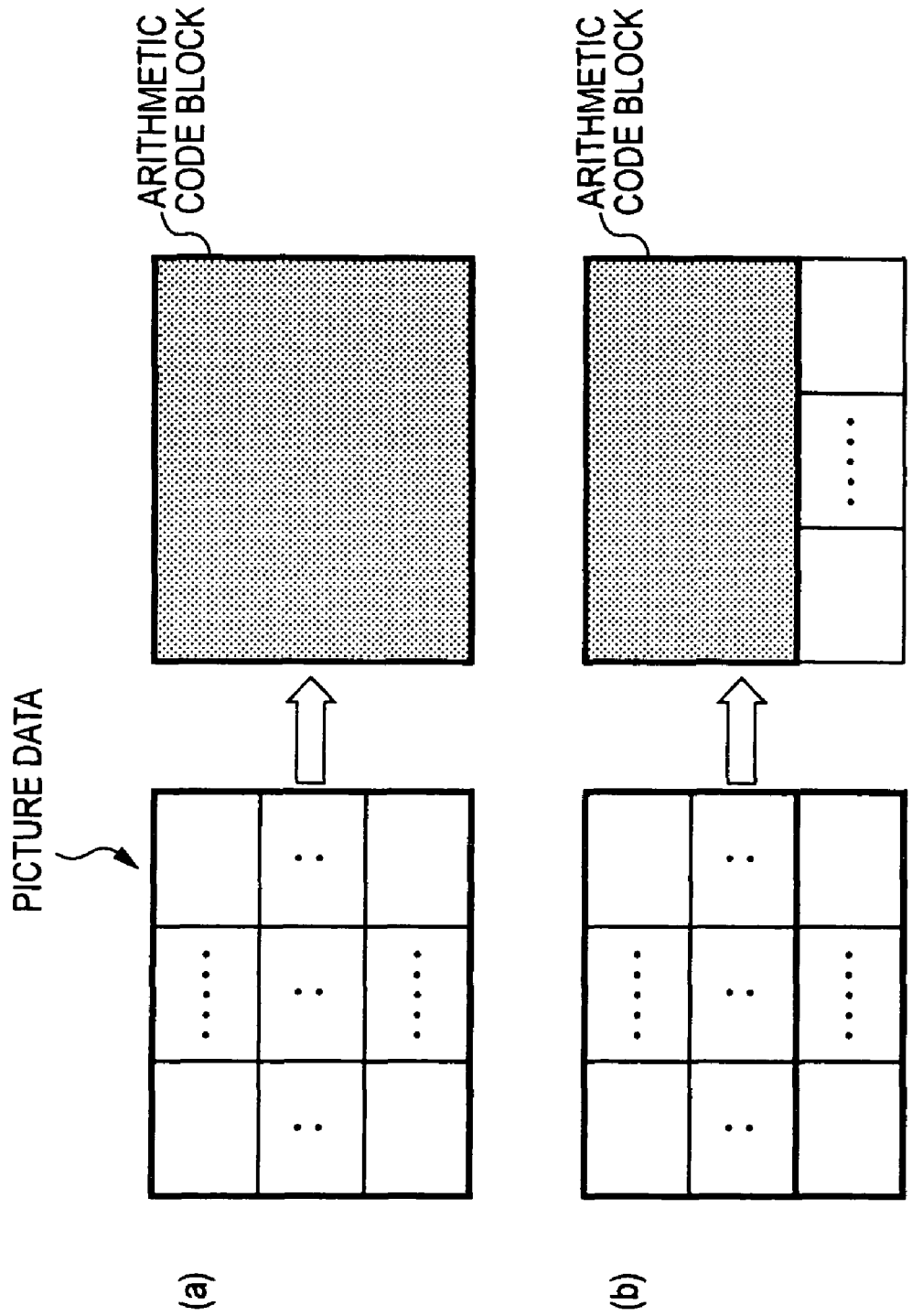
FIG. 11 is a diagram describing processing for generating modified data in an encoding method to which arithmetic encoding is applied.

(b) Processing for Generating Broken Data Using an Encoding Method to which Arithmetic Encoding is Applied Next, description will be made with reference to FIG. 11 regarding a processing example for generating broken data in the event of executing arithmetic encoding in picture units, e.g., applying the MPEG4-AVC encoding. Even in the event of arithmetic encoding (such as MPEG4-AVC), as with the previous MPEG2 encoding, image frames are classified into the I pictures, P pictures, and B pictures, the GOP (Group of Pictures) configuration as a group made up of predetermined units of the I picture, P picture, and B picture frames is similarly employed, but in the event of applying MPEG4-AVC encoding, one video frame is recorded as the encoded data of the I picture.

For example, as shown in FIG. 11A, let us say that an encoding processing configuration in which the entire I pictures are taken as one arithmetic code block is employed. Or as shown in FIG. 11B, an encoding processing configuration in which the I pictures are classified into multiple arithmetic code blocks may be set.

In the event of subjecting encoded data to data destruction processing using such arithmetic encoding, generation of broken data is performed by destroying data in arithmetic encoding block units. Specifically, generation of broken data is performed by executing data processing with several bytes through several tens bytes selected from a arithmetic code block as units, and thus, restoration of one arithmetic code block can be impossible. In the case of arithmetic encoding, the selection range of data to be broken is wide, which facilitates determination of a data destroying position.

(c) Picture Selecting Processing in Generation of Broken Data

Note that even in any case of the encoding using a DCT block configuration described with reference to FIGS. 9 and 10, or the encoding processing using arithmetic encoding described with reference to FIG. 11, pictures to be selected as broken data are preferably the I pictures included in each GOP.

Figure 12:
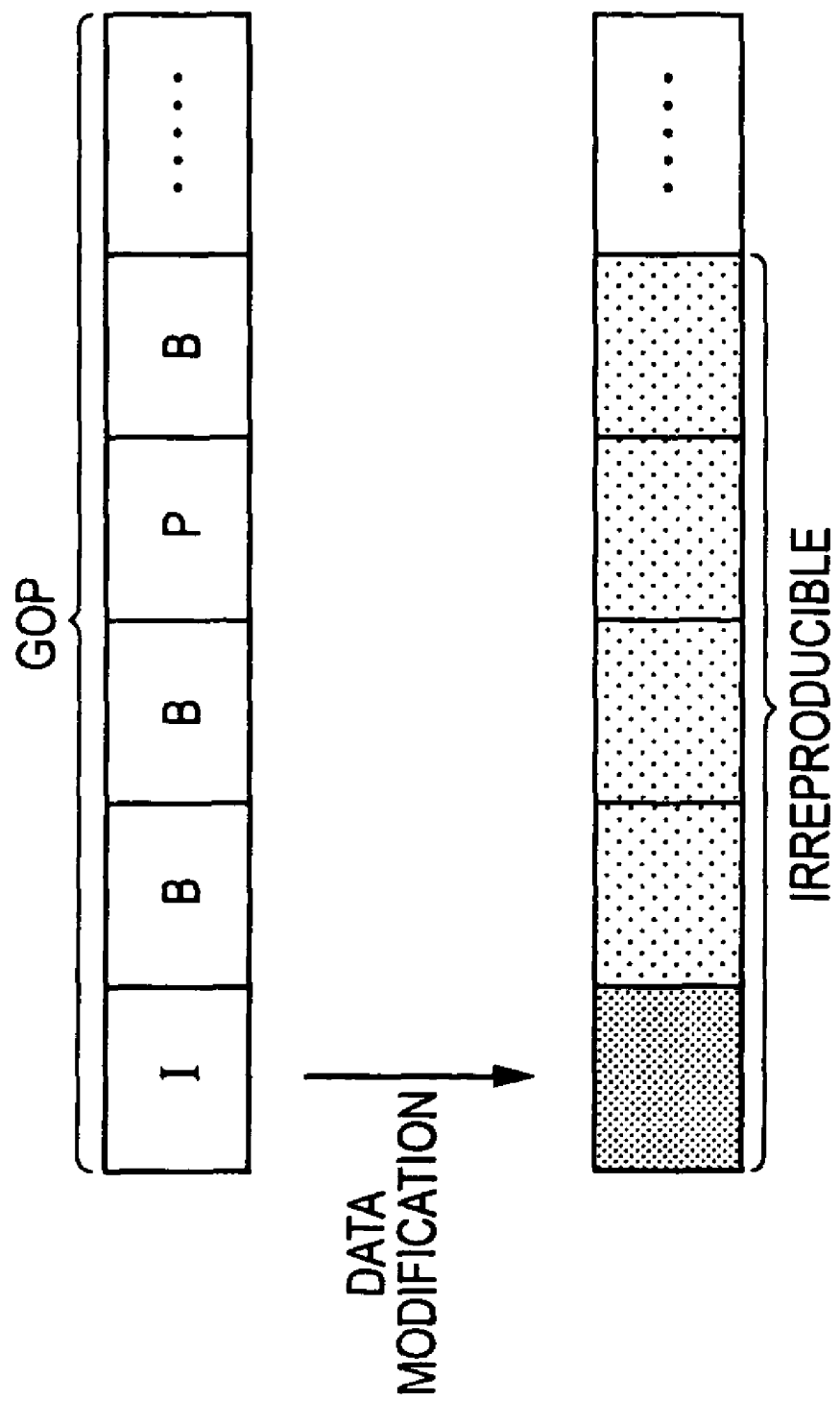
FIG. 12 is a diagram describing picture selecting processing in modified data generation.

As shown in FIG. 12, the I pictures included in the GOP made up of the I, P, and B pictures generated with the MPEG encoding are, as described with reference to the above FIG. 9, created by the intra-field encoding, and are data including the reference data in GOP units, and also are data including information to be referenced by the P pictures or B pictures within the same GOP. Accordingly, restoration of the P, and B pictures included in the GOP becomes impossible by modifying (destroying) the I pictures, and thus, a greater image frame range can be set as restoration-impossible regions.

(2-2. Generating Processing of Identifier-Set Transformation Data)

Figure 13:
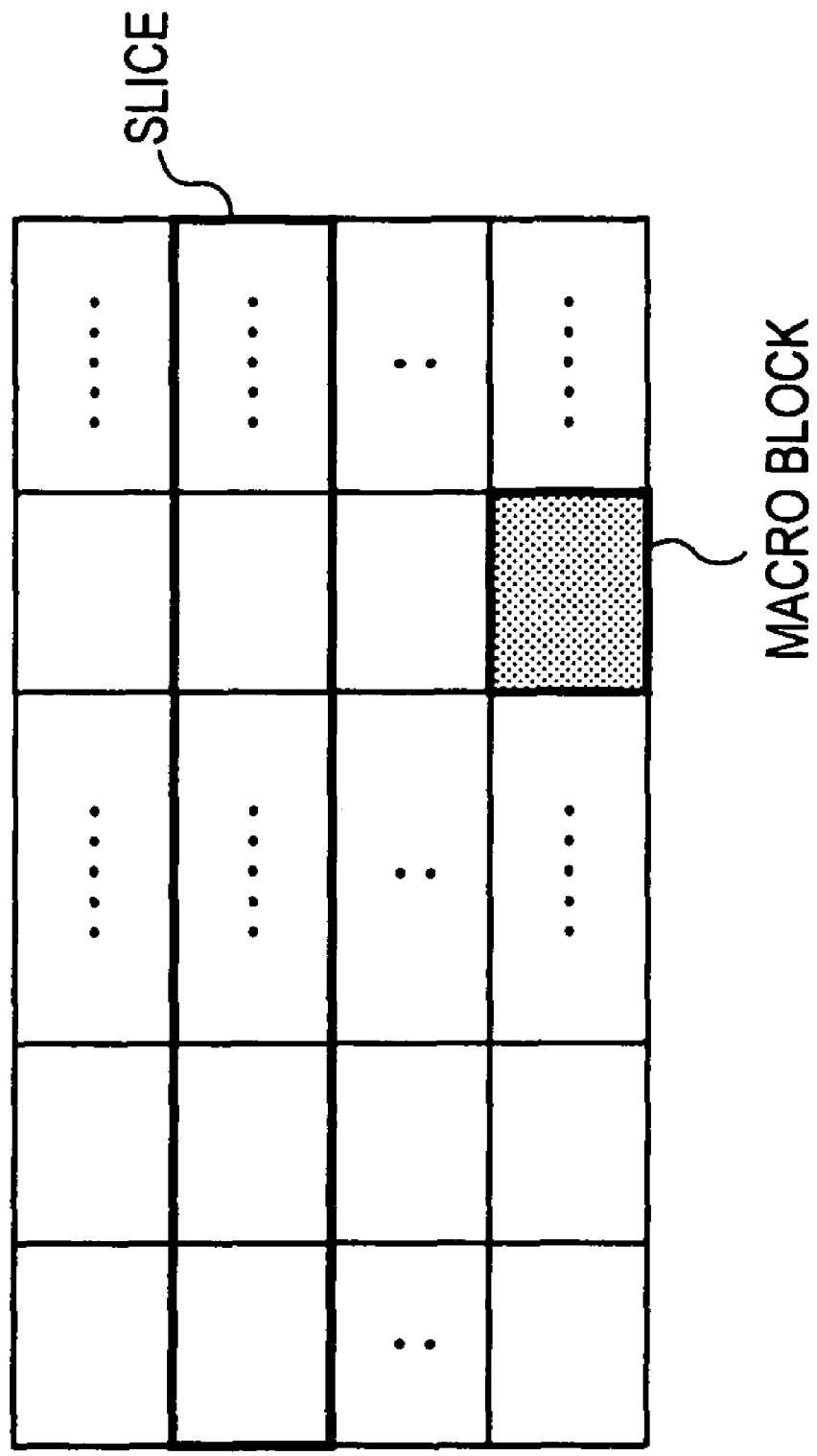
FIG. 13 is a diagram describing processing for generating identifier-set transformation data in an encoding method to which a DCT block configuration is applied.

Next, description will be made regarding generating processing of identifier-set transformation data with reference to FIG. 13 and so on. That is to say, this processing is generating processing of the identifier-set transformation data 22 to be registered in the fix-up table 15 shown in FIG. 1. As described above, the fix-up table generating unit 34 shown in FIG. 3 generates a fix-up table in which identifier-set transformation data enabling the identification information of a content reproducing device or content reproducing application to be analyzed is registered. The identifier-set transformation data is preferably configured so as not to greatly affect normal content. This is because the identifier-set transformation data is applied to content reproduction by replacing a partial data of a content therewith serving as transformation data, and occurrence of visually recognizable alternation upon the content data by adding the identifier is not preferable.

(A) Processing for Generating Identifier-Set Transformation Data Using an Encoding Method to which a DCT Block Configuration is Applied.

Description will be made regarding a processing example for generating identifier-set transformation data using an encoding method to which a DCT block configuration is applied with reference to FIG. 13. As described above, with the MPEG2 method, i.e., data compression by generating a DCT [Discrete Cosine Transform] block, each picture of the I, P, and B pictures is configured of multiple slices such as shown in FIG. 13, and each slice is further configured of multiple macro blocks.

Such encoding data is subjected to data modification based on an identifier (e.g., player ID). In order to perform data modification processing which does not affect great alternation to a content, modification processing in a level which slightly changes the high-frequency components of DCT coefficients is executed within a macro block configuration, for example. For example, data processing is executed with several bytes through several tens bytes as units, thereby executing modification processing which slightly changes the high-frequency components of DCT coefficients. Analyzing DCT coefficients enables whether to be a DCT block in which an identifier is embedded, or whether to be a DCT block in which an identifier is not embedded to be determined.

With content reproduction, even in the case of reproduction based on a DCT block in which an identifier is embedded, or even in the case of reproduction based on a DCT block in which an identifier is not embedded, modification processing is a level in which high-frequency components are slightly changed, so it is difficult to recognize this as visually great alternation, and accordingly, which causes no deterioration in image quality.

(2-3. Transformation Data Generating Processing in the Parallel-Usage Method of A DCT Block Configuration and Arithmetic Encoding)

Figure 14:
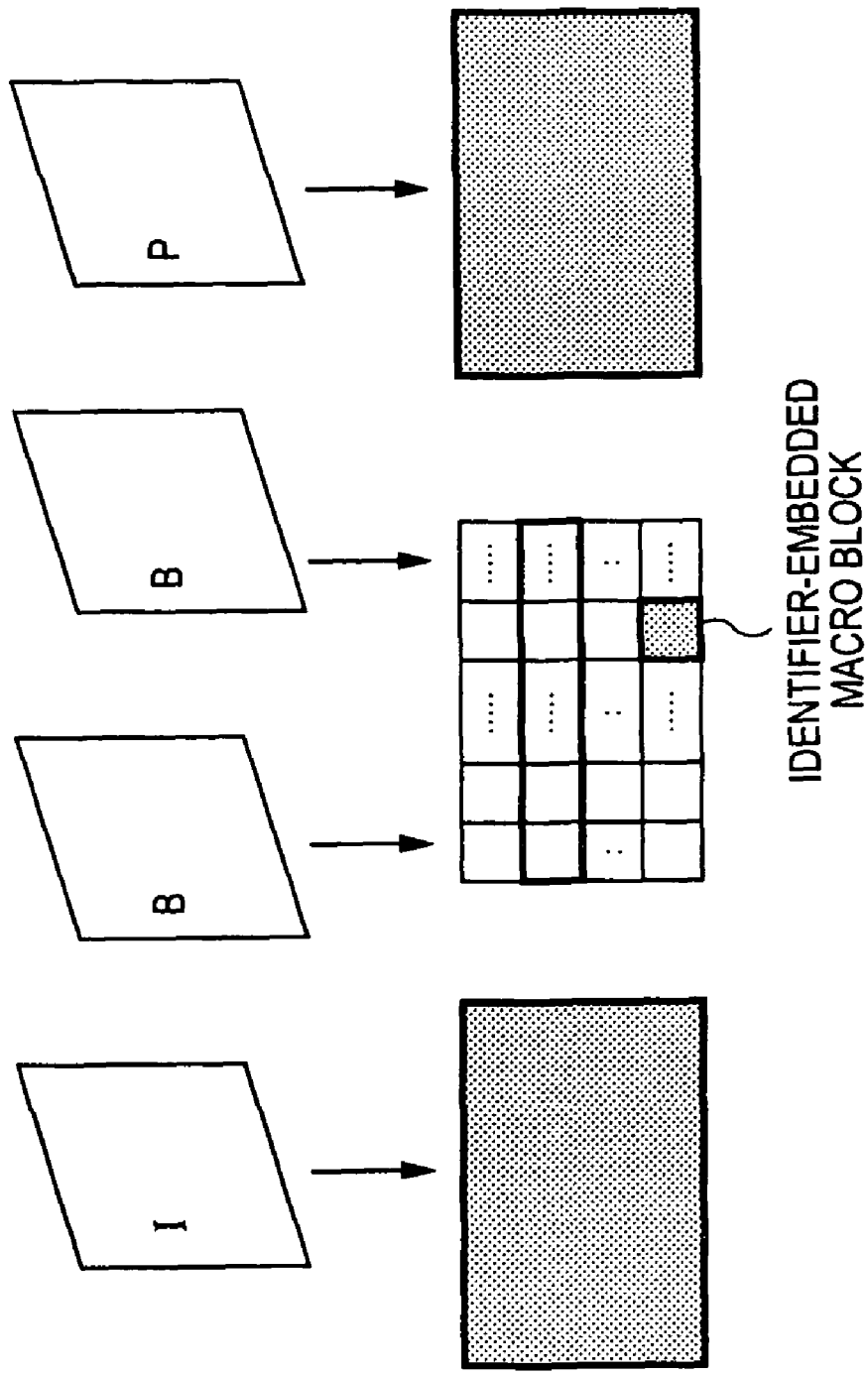
FIG. 14 is a diagram describing processing for generating transformation data in a parallel-usage method of a DCT block configuration and arithmetic encoding.

Next, description will be made regarding a generating processing example of transformation data using the parallel-usage method of a DCT block configuration and arithmetic encoding with reference to FIG. 14. In the event of arithmetic encoding (such as MPEG4-AVC), as described above, as with the MPEG2 encoding, image frames are classified into the I pictures, P pictures, and B pictures, the GOP (Group of Pictures) configuration as a group made up of predetermined units of the I picture, P picture, and B picture frames is similarly employed, but one video frame is recorded as the encoded data of one picture.

With such an arithmetic encoding processing configuration in picture units, data modification based on an identifier affects on the entire pictures, which is not preferable. In the case of arithmetic encoding, even with data replacement of one byte, reproduction image destruction occurs in arithmetic code block units, so this is not appropriate for embedding data. The size of an arithmetic code block can be reduced (minimum one slice), but this causes a problem wherein encoding efficiency is deteriorated.

Accordingly, a picture in which an identifier is embedded is preferably set to encoded data having a DCT block configuration. For example, as shown in FIG. 14, encoding is performed using the parallel-usage method of a DCT block configuration and arithmetic encoding. That is to say, the I and P pictures employ arithmetic encoding, and the B pictures employ a DCT block configuration. The macro block of the DCT block of the B picture is modified so as to embed an identifier. With such settings, embedding of an identifier does not affect other pictures, thereby preventing image quality from deterioration.

Figure 15:
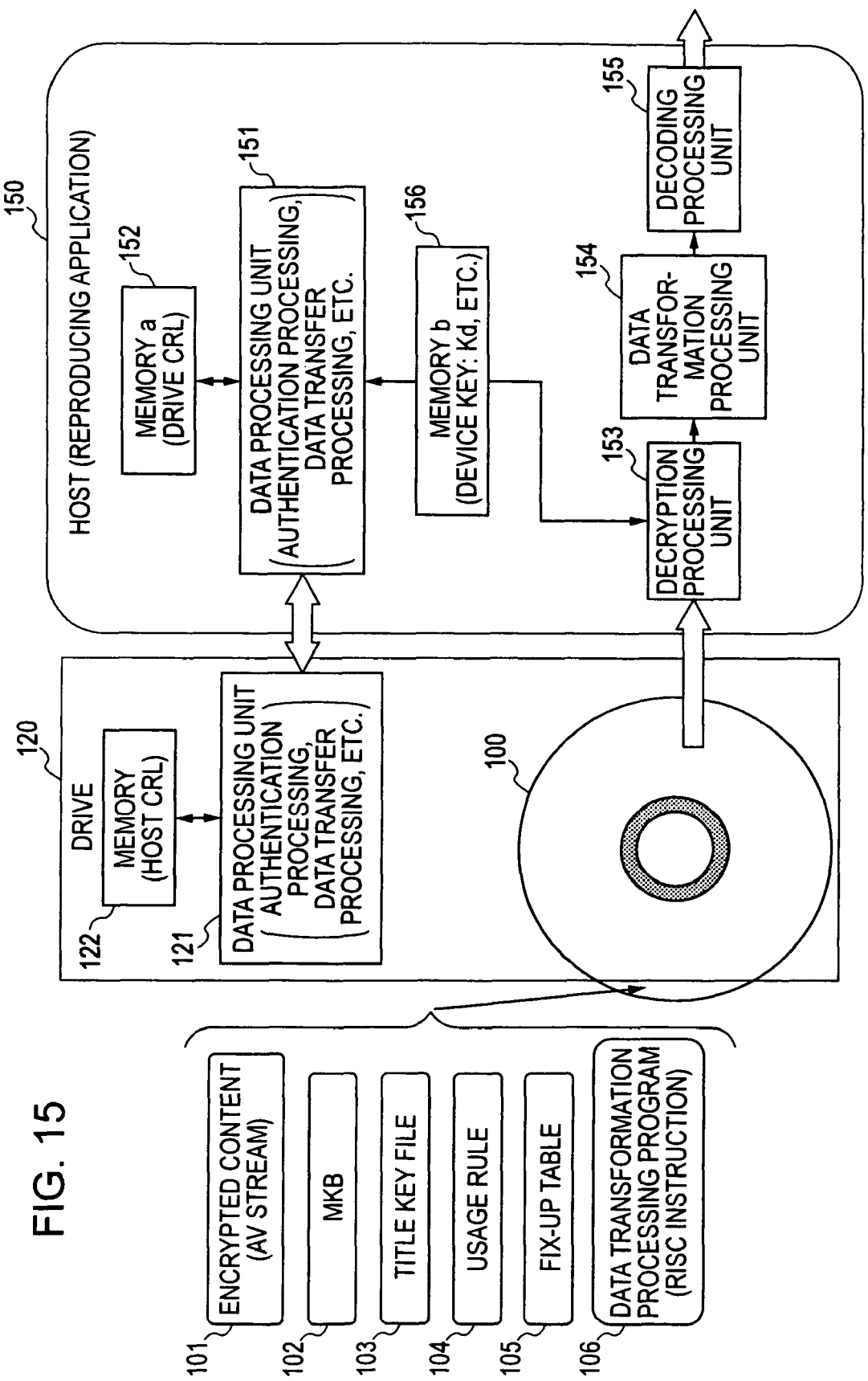
FIG. 15 is a diagram describing the configurations and processing of stored data of an information recording medium, a drive device, and an information processing device.

3. Stored Data in an Information Recording Medium, and Overview of Processing in the Drive and Host Next, description will be made regarding the stored data of an information recording medium storing a content including the above broken data, and overview of the processing in the drive and host which execute reproducing processing of the stored content of the information recording medium. FIG. 15 illustrates the configuration of an information recording medium 100, which stores a content, a drive 120, and a host 150. The host 150 is, for example, a data reproducing (or recording) application to be executed at an information processing device such as a PC or the like, and performs processing using the hardware of the information processing device such as a PC or the like in accordance with a predetermined data processing sequence.

The information recording medium 100 is an information recording medium such as a Blu-ray disc (registered trademark), DVD, or the like, and is an information recording medium in which a content including the above modified data is recorded. As shown in FIG. 15, the information recording medium 100 stores an encrypted content 101 subjected to encryption processing and partial data replacement processing, an MKB (Media Key Block) 102 serving as an encryption key block which is generated based on the tree structure key distribution method which is known as a type of broadcast encryption method, a title key file 103 made up of data in which a title key to be applied to content decryption processing is encrypted (Encrypted CPS Unit Key) or the like, usage rule 104 including CCI (Copy Control Information) serving as copy/reproduction control information of a content or the like, a fix-up table 105 in which transformation data corresponding to the replacement data of a predetermined region within a content is registered, and a data transformation processing program 106 including a processing command for executing data transformation processing using the registered data of the fix-up table 105. Note that the data example shown in the drawing is one example, the stored data differs more or less depending on the type of the disc or the like. Hereinafter, description will be made regarding the overview of these various types of information.

(1) Encrypted Content 101

Various types of contents are stored in the information recording medium 100. Examples of the contents include AV (Audio Visual) streams of moving picture contents such as HD (High-Definition) movie contents which is high-definition moving picture data, game programs of a format stipulated under a particular standard, image files, audio data, text data, and so forth. These contents are data stipulated under a particular AV format, and are stored according to the particular AV data format. Specifically, this is stored according to the Blu-ray disc (registered trademark) ROM standard format, as Blu-ray disc (registered trademark) ROM standard data, for example.

Further, there are cases wherein game programs, image files, audio data, text data, and so forth, are stored in a service data, for example. There are cases wherein these contents are stored as data having a data format not following the particular AV data format.

Types of contents include various contents such as music data, moving picture, still images, and like image data, as well as game programs, Web contents, and so forth, and information of various forms is included in these contents, such as content information usable only by the data from the information recording medium 100, content information usable by combining data from the information recording medium 100 and data provided from the server connected to a network, and so forth. Contents stored in the information recording medium are encrypted and stored, with a different key appropriated for each section content (CPS unit key or unit key (or also may be called a title key)), to realize different usage control for each section content. Each unit to which one unit key is appropriated is called a content managing unit (CPS unit). Further, the configuration data of the content is set as modified data wherein a part thereof is replaced with data different from the correct content data (broken data) or identifier-set modified data, so decryption processing alone does not reproduce the correct content, and processing for replacing the broken data with data registered in a fix-up table is necessary to perform reproduction.

(2) MKB

The MKB (Media Key Block) 102 is an encryption key block generated based on a tree structure key distribution method known as a type of broadcast encryption method. The MKB 102 is a key information block enabling acquiring of a media key [Km] necessary for decrypting contents, only for processing (decryption) based on a device key [Kd] stored on the information processing device of the user having a valid license. This is an application to which information distribution method following a so-called hierarchical tree structure is applied, enabling acquiring of the media key [Km] only in the event that the user device (Information processing device) has a valid license, and user devices which are invalidated (revoking processing) are incapable of acquiring a media key [Km].

An administration center serving as a license entity can generate an MKB having a structure which cannot be decrypted with the device key stored in a certain user device, i.e., wherein the media key necessary for content decryption cannot be acquired, by changing the device key used for encryption of key information stored in the MKB. Accordingly, unauthorized devices can be an revoked at an arbitrary timing, thereby providing encrypted contents capable of decryption only to devices having valid licenses. Content decryption processing will be described later.

(3) Title Key File

As described above, each content or group of multiple contents are subjected to encryption applying a individual encryption keys for each (title key (CPS unit key)) for managing usage of contents, and stored in the information recording medium 100. That is to say, AV (audio visual) streams, music data, moving pictures, still images, and like image data, game programs, Web content, and so forth, making up the contents, need to be sectioned into units of management of contents usage, with a different title key generated for each section unit, thereby carrying out decryption processing. Information for generating these title keys is title key data, and a title key is obtained by decrypting an encrypted title key with a key generated by a media key or the like, for example. Title keys corresponding to each unit are generated following a predetermined encryption key generating sequence using title key data, and decryption of contents is carried out.

(4) Usage Rule

Usage rule includes, for example, copy/reproduction control information (CCI). That is to say, this is copy restriction information and reproduction restriction information for usage control corresponding to the encrypted contents 101 stored in the information recording medium 100. There are various settings for the copy/reproduction control information (CCI), such as cases as information for individual CPS units set as content managing units, cases for being set corresponding to multiple CPS units, and so forth.

(5) Fix-Up Table

As described above, the encrypted content 101 stored in the information recording medium 100 has been subjected to predetermined encryption, and also, a part of the contents configuration data is configured of modified data (broken data or identifier-set modified data different from the proper data). In order to reproduce the content, data overwriting processing is necessary, wherein the modified data is replaced with the transformation data which is the proper content data. The table in which the transformation data is a registered is a fix-up table 105. A great number of modified data is set scattered throughout the content, and at the time of reproducing the content, processing is necessary for replacing (overwriting) the multiple pieces of modified data with the transformation data registered in the fix-up table. Applying this transformation data means that even in the event that unauthorized content decryption is performed due to an encryption key leaking, for example, reproduction of proper content is impossible by content decryption alone, due to the presence of the replaced data, thereby enabling unauthorized contact usage to be prevented.

In addition to normal transformation data, the fix-up table 105 includes transformation data including data enabling analyzing data identification information configuration bits for enabling the contents reproducing device or content reproducing application to be identified. Specifically, for example, this includes a player ID which is identification data of a player (a device for executing a host application), or identifier-set transformation data serving as "transformation data including identification marks" wherein is recorded identification information generated based on the player ID. The identifier-set transformation data is data wherein the bit values of the proper content data have been slightly changed as described above, at the level which does not affect the reproduction of content.

Note that while an example is shown in FIG. 15 wherein the fix-up table 105 is set as an independent data file, as described above, an arrangement may be made wherein the fix-up table is not set as an independent file, and is included in a scattered manner within the configuration packets of the encrypted content 101.

(6) Data Transformation Processing Program

The data transformation processing program 106 is a program including a processing command for executing data transformation processing using the registered data of the fix-up table 105, and is used by the host which executes content reproduction. This is executed by a data transformation processing unit 154 of the host 100 in FIG. 15.

The host sets a virtual machine (VM) for executing data transformation processing, and the virtual machine (VM) executes the data transformation processing program 106 read out from the information recording medium 100, and subjects a decrypted content, the partial configuration data thereof to data transformation processing applying the registered data of the fix-up table 105. Description will be made later regarding the details of these processing.

Next, the configurations of the host 150 and drive 120, and overview of processing, will be described with reference to FIG. 15. Reproduction processing of the content stored in the information recording medium 100 is executed upon data being transferred to the host 150 via the drive 120. Before usage of the content, mutual authentication processing is executed between the drive 120 and host 150, and following confirmation of the validity and of both parties by this authentication processing being established, encrypted content is transferred from the drive to the host, content decryption processing is performed at the host side, and further, the above-described data transformation processing by the fix-up table is executed, whereby content reproduction is performed.

For the mutual authentication executed between the host 150 and the drive 120, processing for determining the validity is executed by referencing a revocation (invalidation) list issued by an Administration Center whether or not each of the devices or applications are registered as an unauthorized device or application.

The drive 120 has memory 122 for storing a host CRL (Certificate Revocation List) storing revocation (invalidation) information of the host certificate (public key certificate). On the other hand, the host 150 has memory 152 for storing a drive CRL (Certificate Revocation List) storing revocation (invalidation) information of the drive certificate (public key certificate). The memory is nonvolatile memory (NVRAM), and in the event that the CRL read out from the information recording medium 100 is a newer version, for example, their respective data processing unit's 121 and 151 perform updating processing for storing the host CRL or the drive CRL of the new version in the memory 122 and 152.

A CRL, such as the host CRL or drive CRL is constantly updated by the administration center. That is to say, in the event that an unauthorized device has been newly discovered, an updated CRL wherein the certificate ID issued to the unauthorized device or the device ID or the like is added at as a new entry, is issued. Each CRL is provided with the version number, and has a configuration wherein the new and old versions can be compared. For example, in the event that a CRL read out from an information recording medium mounted to the drive is newer than the CRL stored in the memory 122 within the drive, the drive performs CRL updating processing. The host 150 also performs drive CRL updating in the same way.

Besides this CRL updating processing, the data processing unit 121 of the drive 120 performs authentication processing with the host that is executed at the time of using content, and further performs processing for reading data from the information recording medium and transferring the data to the host.

As described above, the host 150 is, for example, a data reproducing (or recording) application to be executed at an information processing device such as a PC or the like, and performs processing using the hardware of the information processing device such as a PC or the like in accordance with a predetermined data processing sequence.

The host 150 has a data processing unit 151 for performing mutual authentication processing with the drive 120, data transfer control, and so forth, a decryption processing unit 153 for performing decryption processing of encrypted content, a data transformation processing unit 154 for performing data transformation processing based on registered data in the aforementioned fix-up table 105 and a decoding processing unit 155 for performing decoding (e.g., MPEG decoding) processing.

The data processing unit 151 executes authentication processing between the host and drive, and within the authentication processing, references the drive CRL stored in memory a152 which is nonvolatile memory (NVRAM), to confirm that the drive is not a drive which has been revoked. The host also performs updating processing to store the drive CRL of a new version in the memory a152.

The decryption processing unit 153 generates the key to be applied to content decryption, using various types of information stored in the memory b156 and data read from the information recording medium 100, executing decryption processing of the encrypted content 101. The data transformation processing unit 154 performs replacement processing (overwriting) of contents configuration data applying the transformation data registered in the fix-up table obtained from the information recording medium 100, following the data transformation processing program obtained from the information recording medium 100. The decoding processing unit 155 performs decoding (e.g., MPEG decoding) processing.

The memory b156 of the information processing device 150 stores a device key: Kd, key information to be applied to mutual authentication processing, key information to be applied to decryption, and so forth. Details of content decryption processing will be described later. The device key: Kd is a key to be applied to the above-described MKB processing. The MKB is a key information block which enables obtaining of a media key [Km], which is a key necessary for deciphering content, to be obtainable only by processing (decrypting) based on a device key [Kd] stored in the information processing device of the user which has a valid license, and at the time of decrypting encrypted content, the information processing device 150 applies the device key: Kd stored in the memory b156 to execute the MKB processing. Details of content decryption processing will be described later.

4. About the Content Management Unit (CPS Unit)

As described above, the content stored in the information recording medium is subjected to decryption processing and is stored with different keys appropriated for each unit, in order to realize different usage control for each unit. That is to say, the content is sectioned into content managing unit (CPS units), individual decryption processing is performed, and individual usage management is made.

At the time of using contents, first, there is the need to obtain a CPS unit Key (also called a title key) appropriated to each unit, and further, reproduction is performed by executing data processing based on decryption processing sequences determined beforehand, applying other necessary keys, key generating information, and so forth. The settings of a content management unit (CPS unit) will be described with reference to FIG. 16.

Figure 16:
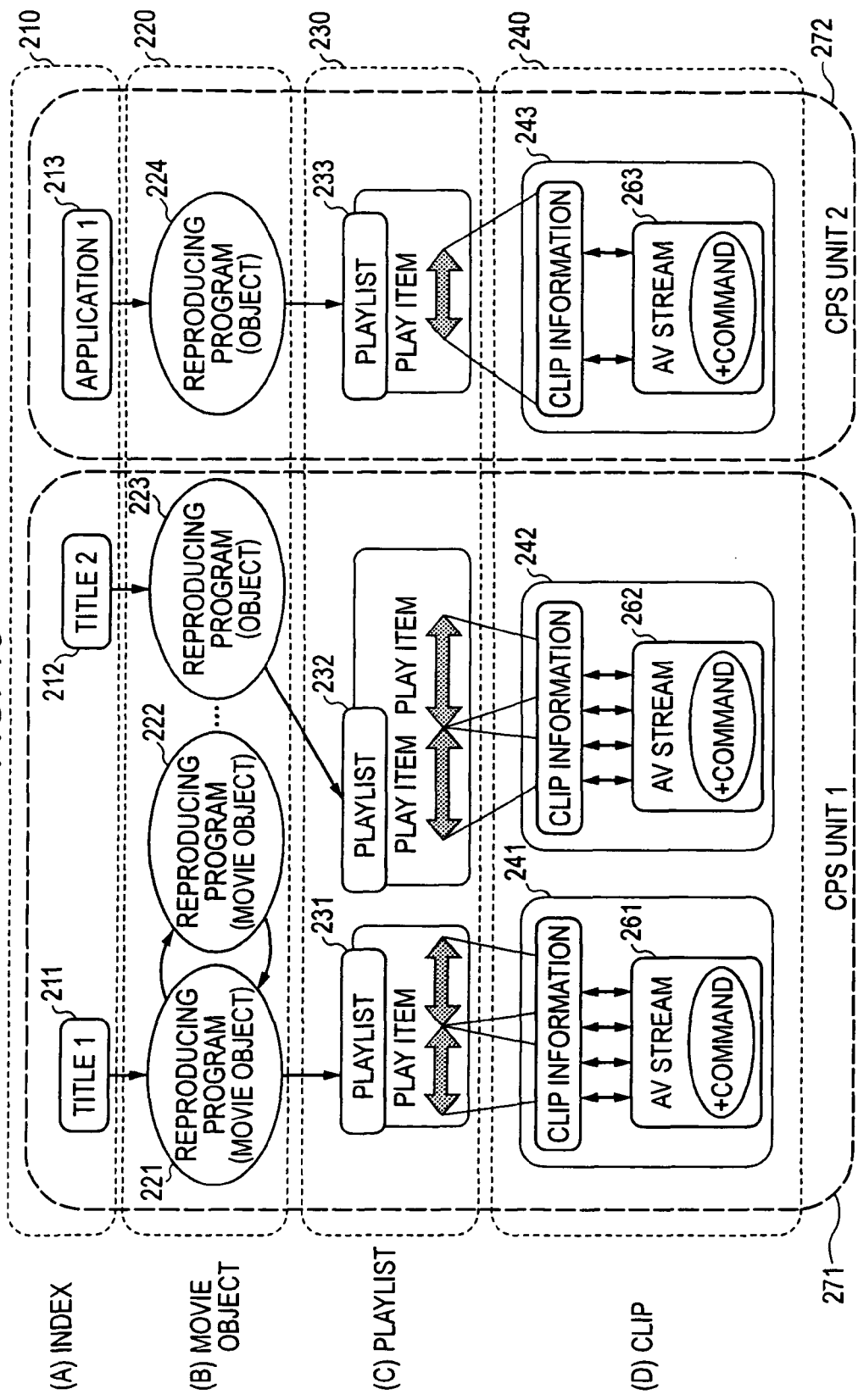
FIG. 16 is a diagram describing a setting example of a content management unit for setting the stored content of an information recording medium.

As shown FIG. 16, the content has a hierarchical configuration of (A) index 210, (B) movie object 220, (C) playlist 230, and (D) clip 240. Specifying an index such as a title to be accessed by the reproducing application specifies a reproduction program correlated with the title, for example, the reproducing program associated with the title is specified, and the play list stipulating the order of reproducing the content is selected according to the program information of the reproduction program that has been specified.

Play items are included in the playlist as information of the data to be reproduced. An AV stream which is actual data of the content, or commands, are selectively read out by clip information for reproduction sections stipulated by play items included in the playlist, and reproduction of the AV stream and execution processing of the commands are performed. Note that a great number of playlists and play items exist, and each has a corresponding playlist ID and play item ID, as identification information.

FIG. 16 illustrates two CPS units. These make up a part of the content stored in the information recording medium. Each of the CPS unit 1 271, and the CPS unit 2 272 are CPS units which have been set as units including a title serving as an index, a movie object which is a reproduction program file, a playlist, and a clip including an AV stream file which is the actual contents data.

A content managing unit (CPS unit) 1 271 includes a title 1 211 and title 2 212, reproduction programs 221 and 222, playlists 231 and 232, a clip 241 and a clip 242, and AV stream data files 261 and 262 which are the actual data of the content contained in the two clips 241 and 242 are at least the object data of encryption, and accordingly is set as data encrypted applying a title key (Kt1) which is an encryption key set corresponding to the content managing unit (CPS unit) 1 271 as a rule (also called a CPS unit key).

A content managing unit (CPS unit) 2 272 includes an application 1 213 as an index, a reproduction program 224, playlist 233, and a clip 243, and an AV stream data file 263 which is the actual data of the content contained in the clip 243 is encrypted applying a title key (Kt2) which is an encryption key, set corresponding to the content managing unit (CPS unit) 2 272.

For example, in order for the user to execute an application file or content reproducing processing corresponding to the content managing unit 1 271, a title key: Kt1 serving as an encryption key which is set so as to be correlated with the content managing unit (CPS unit) 1 271, needs to be obtained and subjected to decryption processing. In order for the user to execute an application file or content reproducing processing corresponding to the content managing unit 2 272, a title key: Kt2 as an encryption key which is set so as to be correlated with the content managing unit (CPS unit) 2 272, needs to be obtained and subjected to decryption processing.

Figure 17:
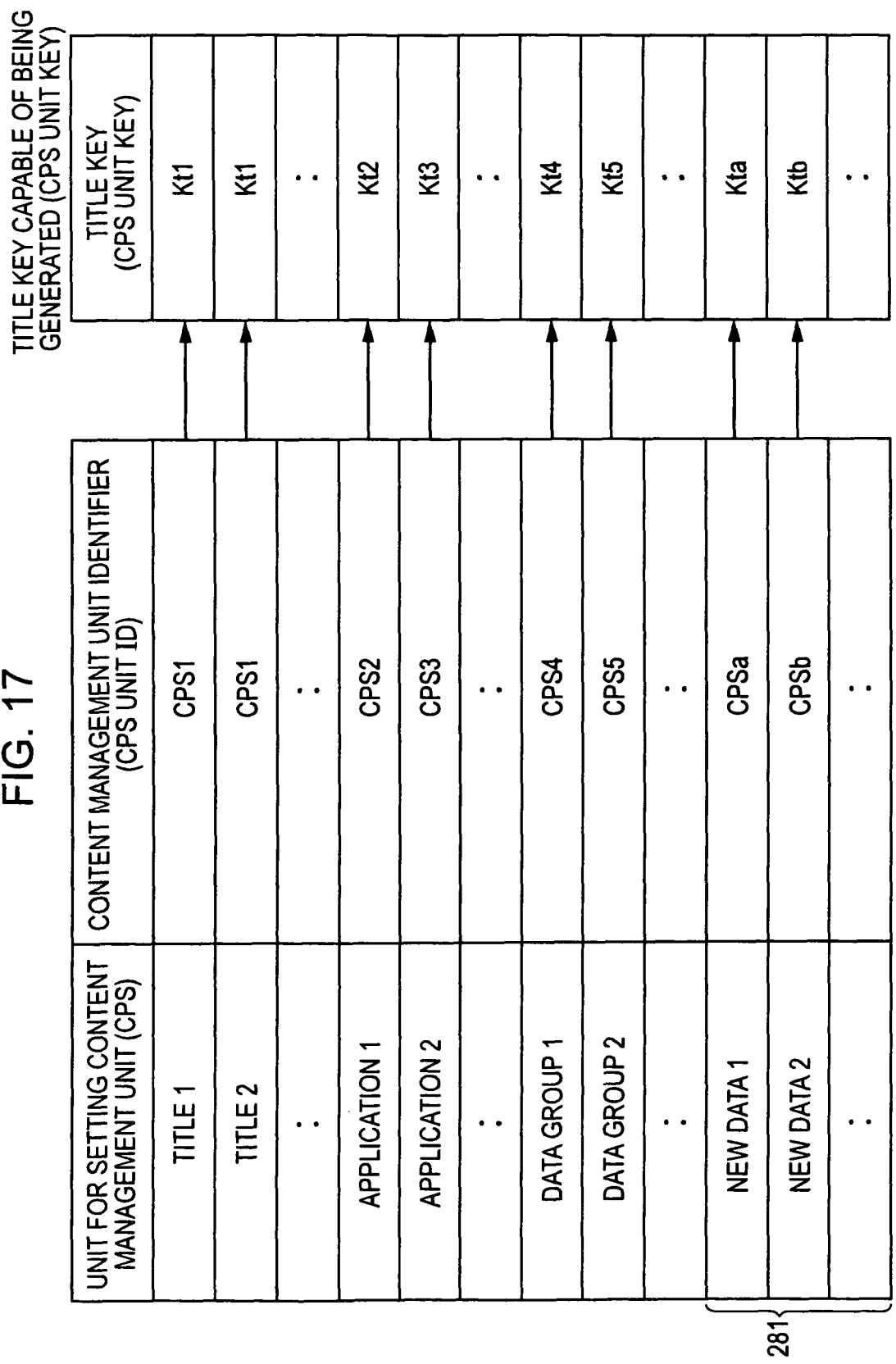
FIG. 17 is a diagram describing correlation between the content management unit for setting the stored content of an information recording medium and a unit key.

FIG. 17 shows the CPS unit setting configuration, and example of corresponding title keys. FIG. 17 shows correlation between CPS unit setting units which are units for managing usage of the encrypted content stored in the information recording media, and title keys (the CPS unit keys) applicable to each CPS unit. Note that a CPS unit and title key for data to come later may be stored and set beforehand. For example, the data portion 281 is entries for data to come later.

CPS unit setting units come in a wide variety, such as content titles, applications, data groups, and so forth, and each CPS unit managing table has set therein CPS unit IDs serving as identifiers corresponding to each of the CPS units.

In FIG. 17, title 1 for example is the CPS unit 1, and at the time of decrypting encrypted content belonging to the CPS unit 1, generating the title key Kt1 and performing decryption processing based on the generated title key Kt1 is necessary.

In this way, the content stored in the information recording medium 100 is stored in a manner having been subjected to encryption processing a with different encryption keys appropriated to each of the units, in order to realize usage control different for each of the units. UR (usage rules) for each of the content managing unit (CPS unit) are set for individual usage management with regard to each of the content managing units (CPS units). Usage rules are information including, e.g., copy/reproduction control information (CCI) of content, as described above, and is copy restriction information or reproduction restriction information of the encrypted content contained in each of the content managing units (CPS units).

Data processing applying various types of information stored in the information recording medium is necessary for generating a title key. Specific examples of such processing will be described later in detail.

5. Content Reproducing Processing

Hereinafter, description will be made regarding multiple processing examples in the case in which mutual authentication processing is executed between the drive and host, on condition of establishment of authentication, the content stored in an information recording medium mounted on the drive is transferred from the drive to the host, thereby executing content reproducing processing.

(5.1) Content Reproducing Processing Example 1

Figure 18:
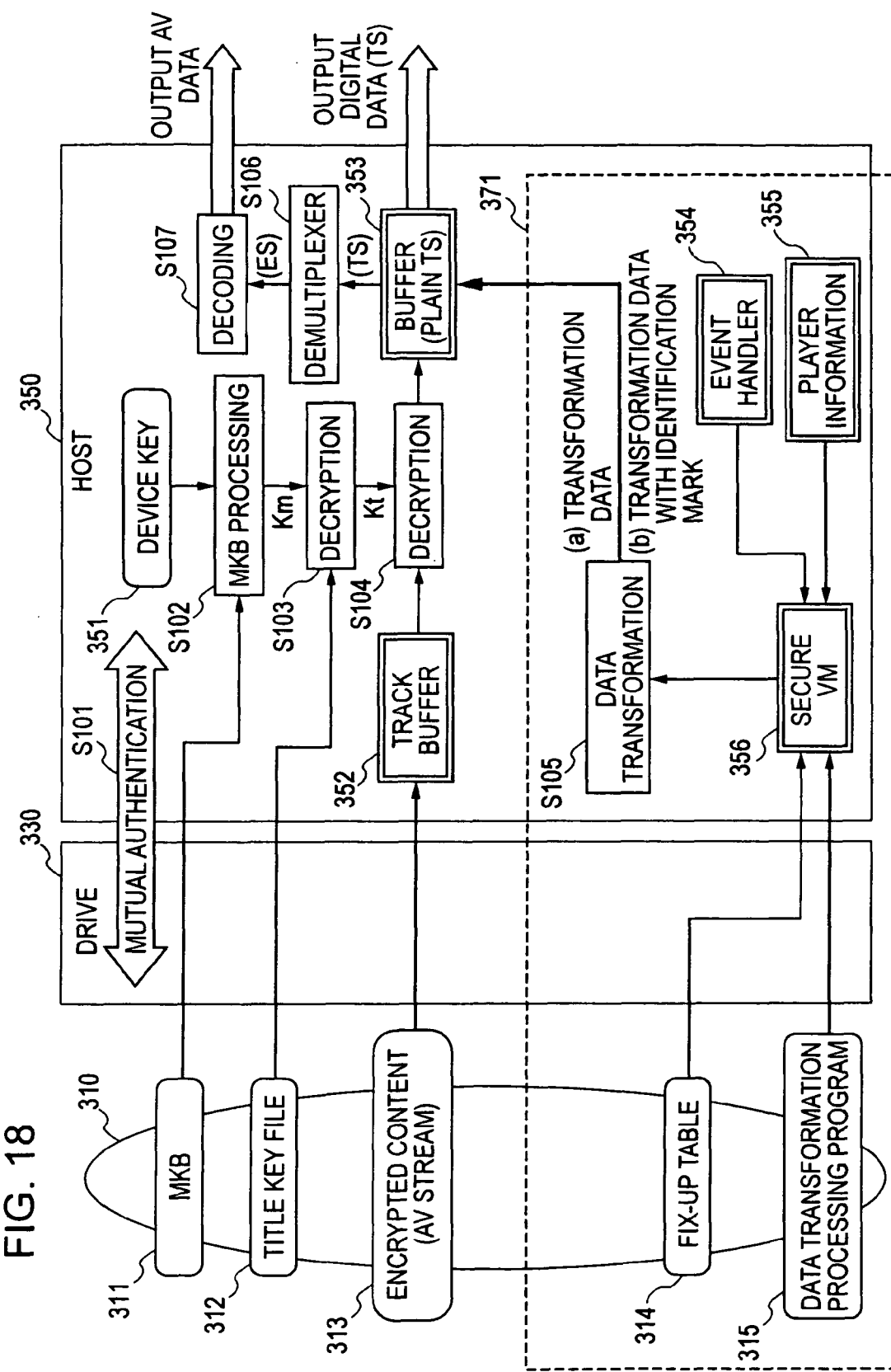
FIG. 18 is a diagram illustrating a processing example 1 of content reproducing processing.

First, description will be made regarding the content reproducing processing example 1 with reference to FIG. 18. FIG. 18 illustrates, from the left, an information recording medium 310 storing encrypted contents, a drive 330 into which the information recording medium 310 is set so as to execute data reading, and a host 350 which is connected with the drive so as to be capable of data communication, and which obtains the content stored in the information recording medium 310 by the drive 330 and executes a reproducing application which executes reproducing processing thereof. The host 350 is executed, for example, at an information processing device such as a PC or the like.

The information recording medium 310 stores an MKB (Media Key Block) 311, a title key file 312, an encrypted content 313, a fix-up table 314, and a data transformation processing program 315. The host 350 holds a device key 351 to be applied to the MKB processing.

The processing sequence wherein the host 350 shown in FIG. 18 obtains and reproduces the stored content within the information recording medium 310 via the drive 330 will be described. First, before reading out the stored content in the information recording medium 310, the host 350 and drive 330 execute mutual authentication in step S101. This mutual authentication is processing for confirming whether the host and drive are each authorized devices or application software. Various types of processing can be applied to this mutual authentication processing sequence. One example thereof will be described with reference to FIG. 19.

Figure 19:
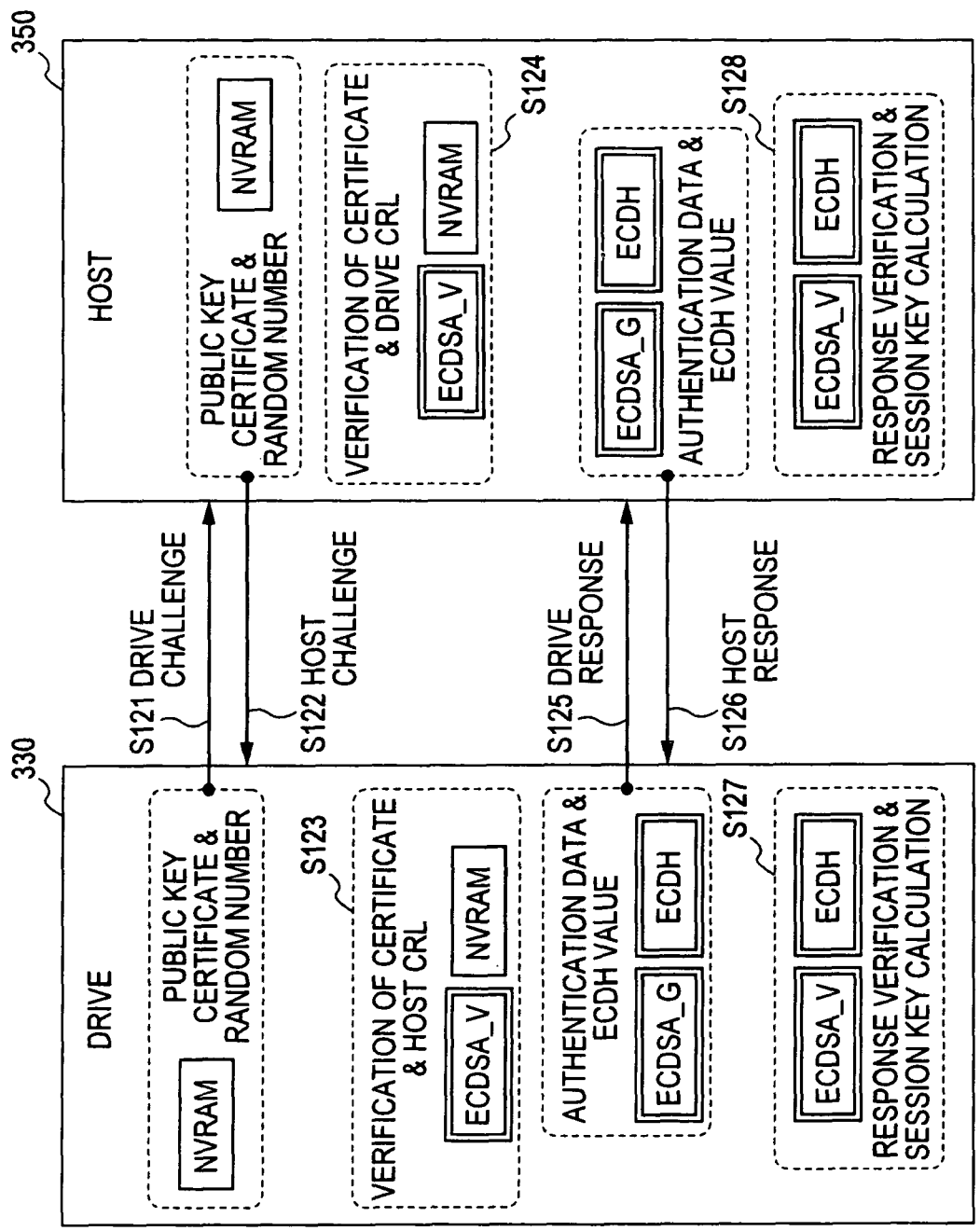
FIG. 19 is a diagram describing the mutual authentication processing sequence between a drive and a host.

FIG. 19 is one example of the mutual authentication sequence in accordance with the public key encryption method. First, in step S121, the drive 330 transmits the drive public key certificate stored in the self-memory (NVRAM) and a random number arbitrarily generated to the host. In step S122, the host 350 also transmits the host public key certificate stored in the self-memory (NVRAM) and a random number arbitrarily generated to the drive.

In step S123, the drive 330 verifies validity of the host public key certificate received from the host, and the revoked status of the host based on a host certificate revocation list (host CRL: Certificate Revocation List). In step S123, the drive 330 first executes the signature verification set in the host public key certificate. ECDSA_V shown in FIG. 19 illustrates execution of signature verification based on elliptic curve encryption. This signature verification is executed by applying the public key corresponding to the secret key of a key management entity. The drive retains the public key of the key management entity for signature verification in the memory (NVRAM), and executes signature verification applying this. According to this signature verification, confirmation is made that the host public key certificate has not been tampered. According to this signature verification, in the event that confirmation is made that the host public key certificate has been tampered, the drive 330 suspends the processing.

Further, the drive 330, based on the host public key certificate of which no tampering has been cleared, confirms that this certificate has not been revoked (invalidated) with reference to the host CRL. The host CRL is invalidated certificate IDs listed regarding the public key certificate issued to the host. The drive 330 obtains the host CRL from the memory within the drive or the information recording medium.

The drive 330 obtains the ID from the host public key certificate of which no tampering has been cleared, and determines regarding whether or not this ID coincides with the ID registered in the host CRL. In the event that the coincided ID exists in the host CRL, the drive 330 determines that the host thereof is the host revoked (invalidated), and suspends the subsequent processing. In the event that the ID obtained from the host public key certificate is not recorded in the host CRL, the drive 330 determines that the host thereof is an authorized, not revoked host, and continues the processing.

On the other hand, the host 350 also executes, in step S124, based on the drive public key certificate received from the drive 330, confirmation of validity of the drive public key certificate (tampering verification), and determination regarding whether or not the drive has been revoked using the drive CRL. Only in the event that confirmation is made that the drive public key certificate is authorized, and has not been revoked, the host 350 continues the processing. The host 350 obtains the drive CRL from the memory within the host or the information recording medium.

Next, the drive 330 and the host 350 inform their respective authentication results as drive response (S125) and host response (S126). When informing this authentication result, both sides generate the value of ECDH (Elliptic Curve Diffie Hellman) serving as the value to which elliptic curve encryption is applied, and inform each other of this.

Upon the drive 330 receiving the drive authentication result and the value of ECDH from the host 350, the drive 330 verifies the response of the host in step S127, confirms establishment of the drive authentication, and generates a session key serving as a shared key applying the received value of ECDH. Similarly, upon the host 350 receiving the host authentication result and the value of ECDH from the drive 330, the host 350 verifies the drive response in step S128, confirms establishment of the host authentication, and generates a session key serving as a shared key based on the received value of ECDH.

As a result of such mutual authentication processing, the drive 330 and host 350 share a session key (Ks) serving as a shared key.

Returning to FIG. 18, description will be continued regarding the sequence of the content usage processing. In step S101, following mutual authentication being executed between the host and drive, and the session key (Ks) being shared, the host 350 obtains the MKB 311 recorded in the information recording medium 310 by the drive in step S102, executes the processing of the MKB 311 applying the device key 351 stored in the memory, and obtains the media key (Km) from the MKB.

As described above, the MKB (Medium Key Block) 311 is an encryption key block generated based on a tree structure key distribution method known as a type of broadcast encryption method, and is the key information block enabling obtaining of a media key (Km) which is a key necessary for content decryption, only by processing (decryption) based on the device key (Kd) stored in a device which has a valid license.

Next, in step S103, the media key (Km) obtained by the MKB processing in step S102 is applied to execute decryption of the title key file read from the information recording medium 310, thereby obtaining the title key (Kt). The title key file stored in the information recording medium 310 is a file including data encrypted by the media key, and the title key (Kt) used for content decryption can be obtained by processing applying the media key. Note that the decryption processing in step S103 applies an AES encryption algorithm, for example.

Next, the host 350 reads out the encrypted content 313 stored in the information recording medium 310 via the drive 330, stores the read out content in a track buffer 352, executes decryption processing applying the title key (Kt) in step S104 for the contents stored in the buffer, and obtains the decrypted content.

The decrypted content is stored in a plaintext TS buffer 353. (Plain TS) means a decrypted plaintext transport stream. Now, the decrypted content stored in the plaintext TS buffer 353 is content containing the above-described modified data, which cannot be reproduced as it is, and there is the need to perform predetermined data transformation (data replacement by overwriting).

This data transformation processing is illustrated in the block 371 in FIG. 18. The block 371 in FIG. 18 is equivalent to the processing of a data transformation processing unit 154 of the host 150 shown in FIG. 15. The overview of this data transformation processing will be described with reference to FIG. 20.

The encrypted content 313 shown in FIG. 18 is an encrypted content stored in the information recording medium, and this encrypted content is temporally stored in the track buffer 352 on the host side. This is the track buffer stored data 401 shown in FIG. 20 (1).

Decryption of the encrypted content which is the track buffer stored data 401 is executed by the host-side decryption processing, and the decryption result data is stored in the plaintext TS buffer 353. This is the decryption result data 402 shown in FIG. 20 (2).

The decryption result data 402 includes broken data 403 which is not the proper content configuration data. The data transformation processing unit of the host executes processing for replacing this modified data 403 with the transformation data 404 which is the correct content configuration data obtained from the fix-up table 314 recorded in the information recording medium 310 shown in FIG. 18. This replacing processing is executed as re-writing (overwriting) of a part of data, regarding data written to the plaintext TS buffer 353, for example.

Figure 20:
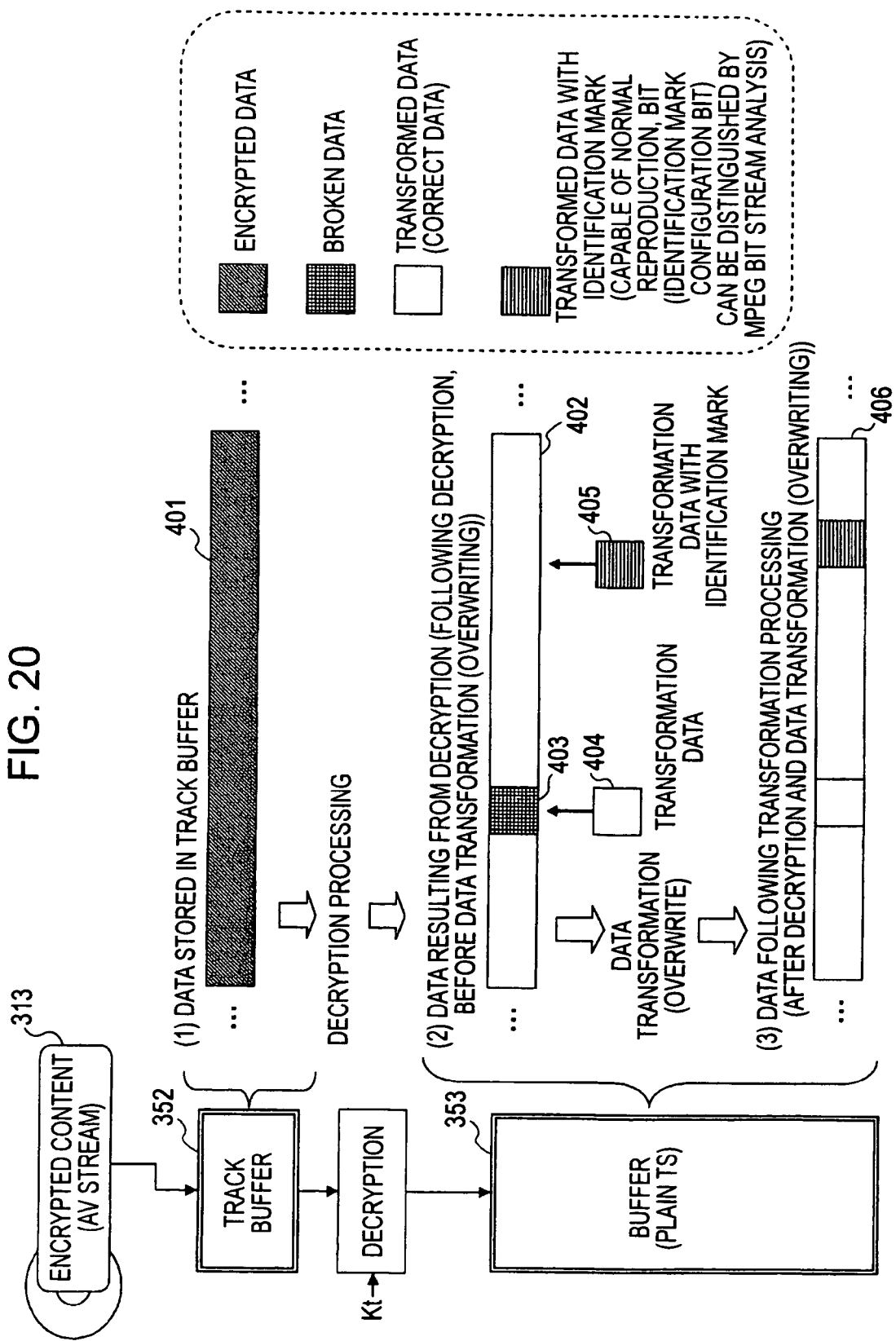
FIG. 20 is a diagram describing transformation data adaptation processing to be executed at the time of content reproduction.

Further, the data transformation processing which the host executes is not only processing for replacing the modified data with transformation data which is the normal content data, but also processing is executed for replacing a part of the configuration data in the decryption result data 402 with identifier-set transformation data 405, as shown in FIG. 20.

An identifier is data which enables configuration bits of identification information making a content reproducing device or content reproducing application identifiable, as described above. In specific example is the configuration data of identification information (player ID) of an information processing device serving as a player for executing a host application, or an identification mark generated based on the player ID. The identifier-set transformation data is data wherein the bit values of the proper content data have been slightly changed, at the level which does not affect the reproduction of content as described above.

A great number of identifier-set transformation data 405 are set within the content, and collecting and analyzing the multiple sets of identifier-set transformation data 405 determines the player ID, for example. The identifier-set transformation data 405 is data where in the configuration bits of the normal content data have been changed within a level wherein normal reproduction can be made as content, and this data wherein bit (identification mark configuration bit) determining is enabled by MPEG bit stream analysis.

A great number of the transformation data 404 and identifier-set transformation data 405 shown in FIG. 20 are registered in the fix-up table stored in the information recording medium, and further, registration is made regarding the writing position information of these. Executing data transformation processing based on the fix-up tables stored information replaces the data stored in the plaintext TS buffer 353 with the transformed data 406 shown in FIG. 20 (3).

Returning to FIG. 18, description will be made regarding the processing within a dotted line block 371, i.e., the data transformation processing on the host side. The data transformation processing is executed by the secure VM 356 which is set as a virtual machine within the host, for example. The virtual machine (VM) is a virtual computer which directly interprets and executes an intermediate language, and interprets and executes command code information in the intermediate language which does not depend on any particular platform.

The secure VM 356 reads out the data transformation processing program 315 including command code information from the information recording medium 310, and executes the processing. The secure VM 356 performs processing under control of an event handler 354, also inputs the ID information or the like of a player (information processing device) executing the host application as player information 355, and executes the data transformation processing program 315 obtained from the information recording medium 310. The event handler 354 executes monitoring of the processing. The host performs emulator check whether or not the processing executed by the secure VM 356 is correctly performed, monitors the processing and status of other host applications, or a player (information processing device) serving as a host application executing device, and in the event of detecting a processing error, unauthorized processing, or the like suspends the data transformation processing by the secure VM 356.

The secure VM 356 applies the fix-up table read out from the information recording medium 310, and executes transformation processing of the data stored in the plaintext TS buffer 353. That is to say, this is the data transformation processing in step S105 shown in FIG. 18, the secure VM 356 replaces the modified data 403 within the decryption result data 402 shown in FIG. 20 with transformation data 404 which is proper content configuration data, and further, executes data overwriting processing in which the identifier-set transformation data 405 is replaced with a part of data of the content according to the bit of the player ID shown in the FM ID bit position in FIG. 8, thereby changing the stored data in the plaintext TS buffer 353 to transformed data 406.

Subsequently, the transformed TS (Transport stream) is externally output via a network or the like, and is reproduced at an external reproducing apparatus. Or, transformation from a transport stream (TS) to an elementary stream (ES) is executed in step S106 by processing by a demultiplexer, and further, following decoding processing (step S107), this is reproduced via a display speaker.

The secure VM 356 executes data transformation using the fix-up table previously described with reference to FIG. 5, i.e., "transformation overwriting data" as entity data of (a) transformation data for replacing broken data with an authorized content, and (b) identifier-set transformation data replaced with identifier-set modified data according to the player ID, and the fix-up table in which information specifying the writing positions of these data is recorded, and generates a reproduced content 20 from the recorded content 11 including modified data, which is described with reference to FIG. 1, thereby executing reproducing processing.

In other words, the secure VM 356 of the host 350, in accordance with the fix-up table 314 recorded in the information recording medium 310, executes processing for writing (a) transformation data, and (b) identifier-set transformation data in the stream of the specified positions of the fix-up table. Data writing is executed as overwriting processing of transformation data as to the data stored in the plaintext TS buffer 253, or identifier-set transformation data, and as a result of this processing, the data stored in the plaintext TS buffer 253 is replaced with the data in FIG. 20 (3) previously described.

External output of a content from a player (information processing device such as a PC) mounting the host, or content reproduction is executed as processing based on the transformed data shown in this FIG. 20 (3).

Transformation data is proper content configuration data, and also identifier-set transformation data is data to be applied to reproduction of a proper content, and accordingly, decoding reproduction based on these data enables proper content reproduction. For example, in a case of this content being copied in an unauthorized manner, and a lot of unauthorized copied content leaking out, analyzing the identifier-set transformation data enables the player ID to be obtained, and enables the source of leakage of the unauthorized content data to be pinpointed.

(5.2) Content Reproducing Processing Example 2

Figure 21:
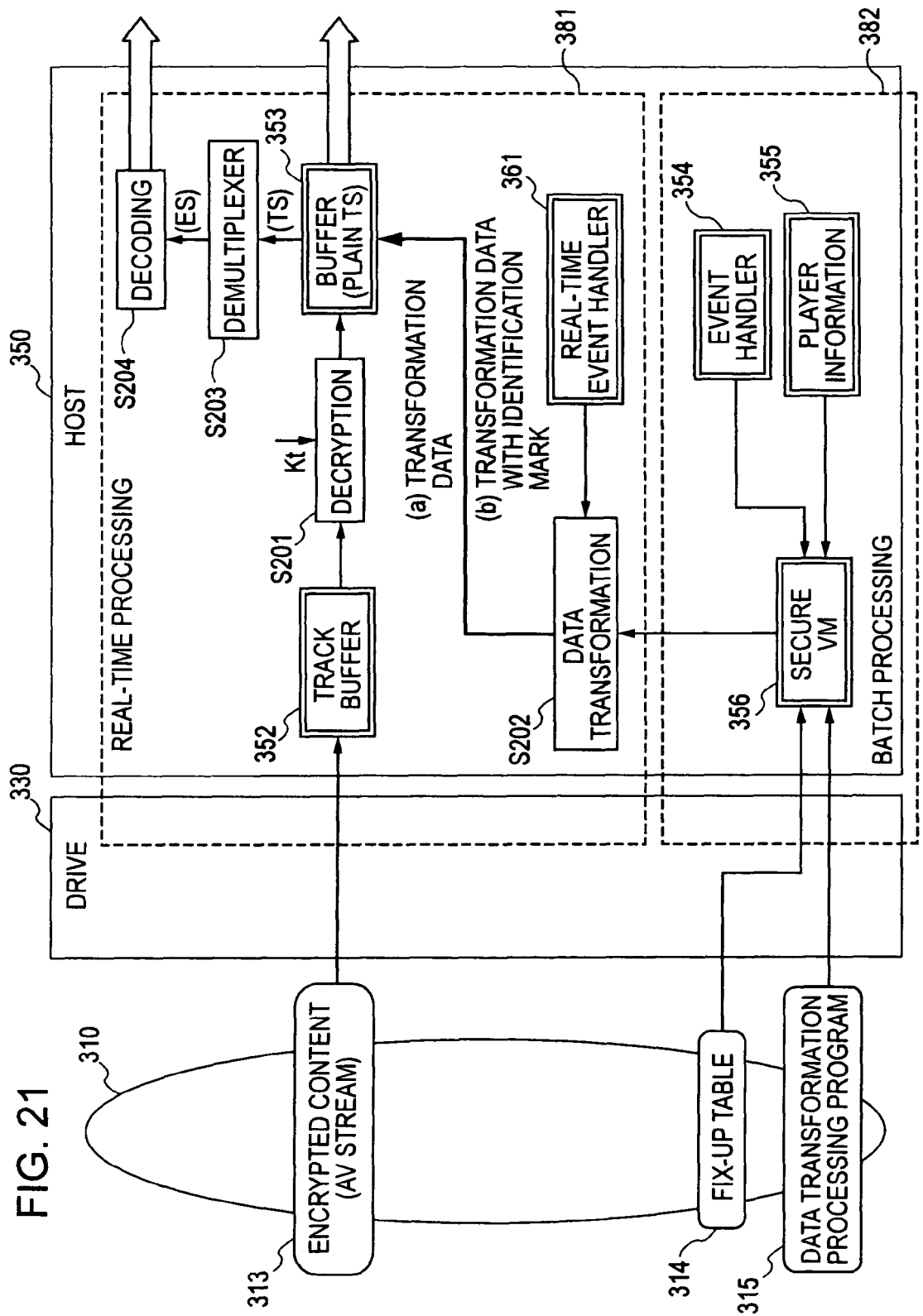
FIG. 21 is a diagram illustrating a processing example 2 of content reproducing processing.

Next, description will be made regarding the content reproducing processing example 2 with reference to FIG. 21. FIG. 21 illustrates, from the left, an information recording medium 310 storing encrypted contents, a drive 330 into which the information recording medium 310 is set so as to execute data reading, and a host 350 which is connected with the drive so as to be capable of data communication, and which obtains the content stored in the information recording medium 310 by the drive 330 and executes a reproducing application which executes reproducing processing thereof. The host 350 is executed, for example, at an information processing device such as a PC or the like.

In FIG. 21, an MKB (Media Key Block) and a title key file recorded in the information recording medium 310 are omitted. The host 350 retains a device key applying to the processing of the MKB, applies the MKB (Media Key Block) and the title key file recorded in the information recording medium 310, and executes completely the same processing as described with reference to FIG. 18 to calculate a title key (Kt). Even these processing are also omitted in FIG. 21. The information recording medium stores an encrypted content 313, a fix-up table 314, and a data transformation processing program 315.

With the content reproducing processing example 2 shown in FIG. 21, the characteristic point thereof is in that the processing of a block 381 shown in a dotted line frame is executed as real time processing, and the processing of a block 382 is executed as batch processing prior to content reproduction or output. That is to say, the secure VM 356 reads out the data transformation processing program 315 including command code information from the information recording medium 310 prior to starting of content reproduction or content external output or the like, and executes decryption processing of the fix-up table 314 read out from the information recording medium 310, or the like based on control of the event handler 354, and input of the player information 355.

The fix-up table 314 recorded in the information recording medium 310 has been subjected to obfuscation processing using the AES encryption, or computation such as exclusive-OR computation or the like, and the secure VM 356 executes decryption processing, or predetermined computation processing in accordance with the data transformation processing program 315 to obtain the fix-up table serving as plaintext data. The processing so far is executed in a batch manner prior to starting of content reproduction or content external output, or the like.

The subsequent processing is executed as real time processing, which is executed in parallel with content reproduction or content external output processing. That is to say, the content decryption processing in step S201, the data transformation processing in step S202, i.e., the transformation data registered in the fix-up table 314 recorded in the information recording medium 310, i.e., the data transformation processing in which (a) transformation data, (b) identifier-set transformation data are written in the specified positions recorded in the fix-up table 314, and further, external output processing of the transformed TS (Transport Stream), or demultiplexing processing in step S203, i.e., transformation processing from a transport stream (TS) to an elementary stream (ES), decoding processing in step S204, and these processing is executed as real time processing in parallel with content reproduction or external output.

Employing such a processing sequence, even in the event of taking time for the processing of the fix-up table 314 by the secure VM 356, realizes real time processing, which gives no influence upon the content reproduction, and external output processing.

(5.3) Content Reproducing Processing Example 3

Figure 22:
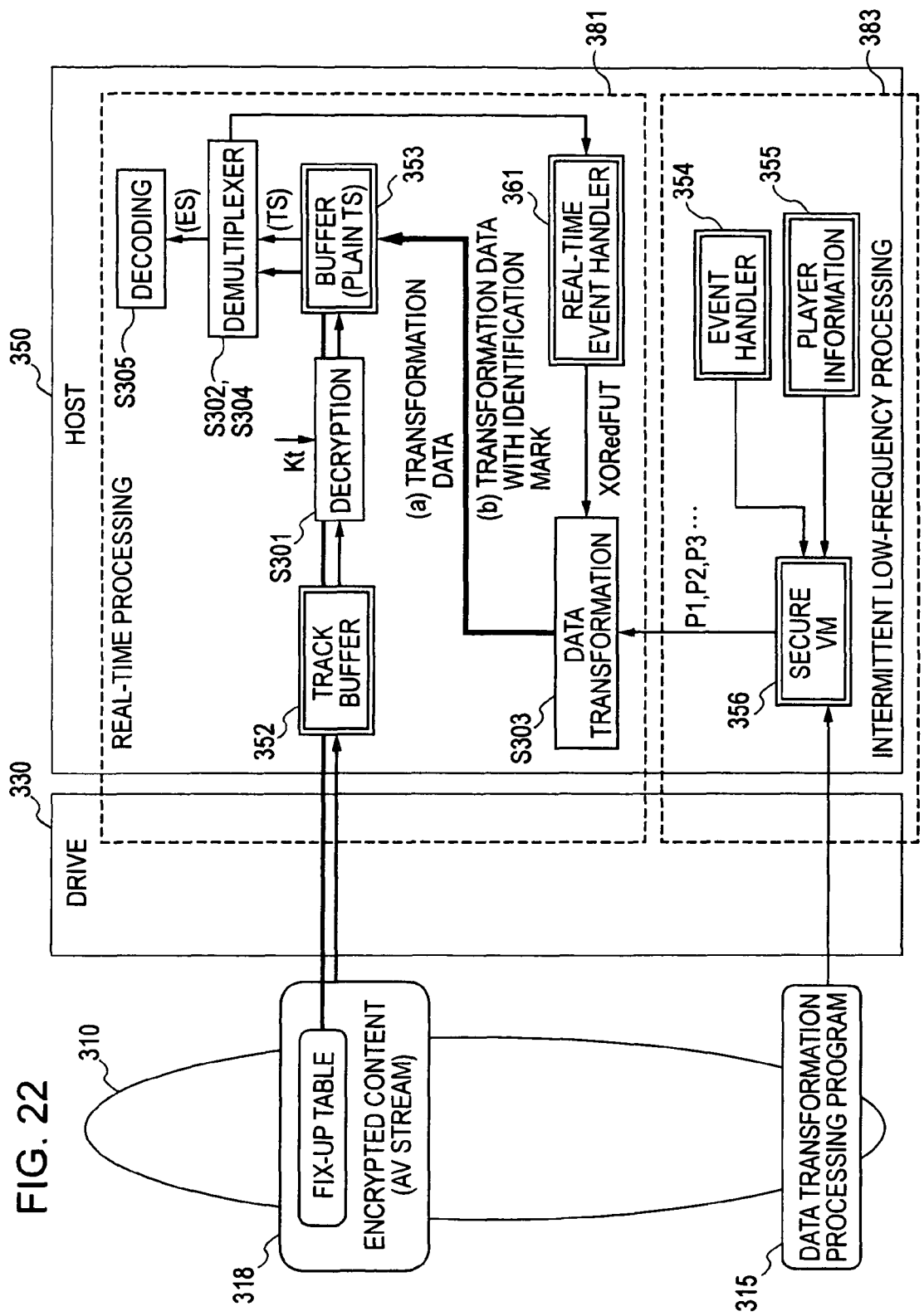
FIG. 22 is a diagram illustrating a processing example 3 of content reproducing processing.

Next, description will be made regarding the content reproducing processing example 3 with reference to FIG. 22. FIG. 22 illustrates, from the left, an information recording medium 310 storing an encrypted content, an drive 330, and a host 350. An MKB (Media Key Block), a tile key file, and the processing applying these are the same as the processing example 1 previously described with reference to FIG. 18, so the descriptions thereof are omitted. With the present processing example, as shown in FIG. 22, the information recording medium 310 stores an encrypted content 318 including the fix-up table, and a data transformation processing program 315. The processing of the block 381 shown in a dotted line frame is executed as real time processing, and the processing of the block 385 shown in a dotted line frame is executed as intermittent processing.

Figure 23:
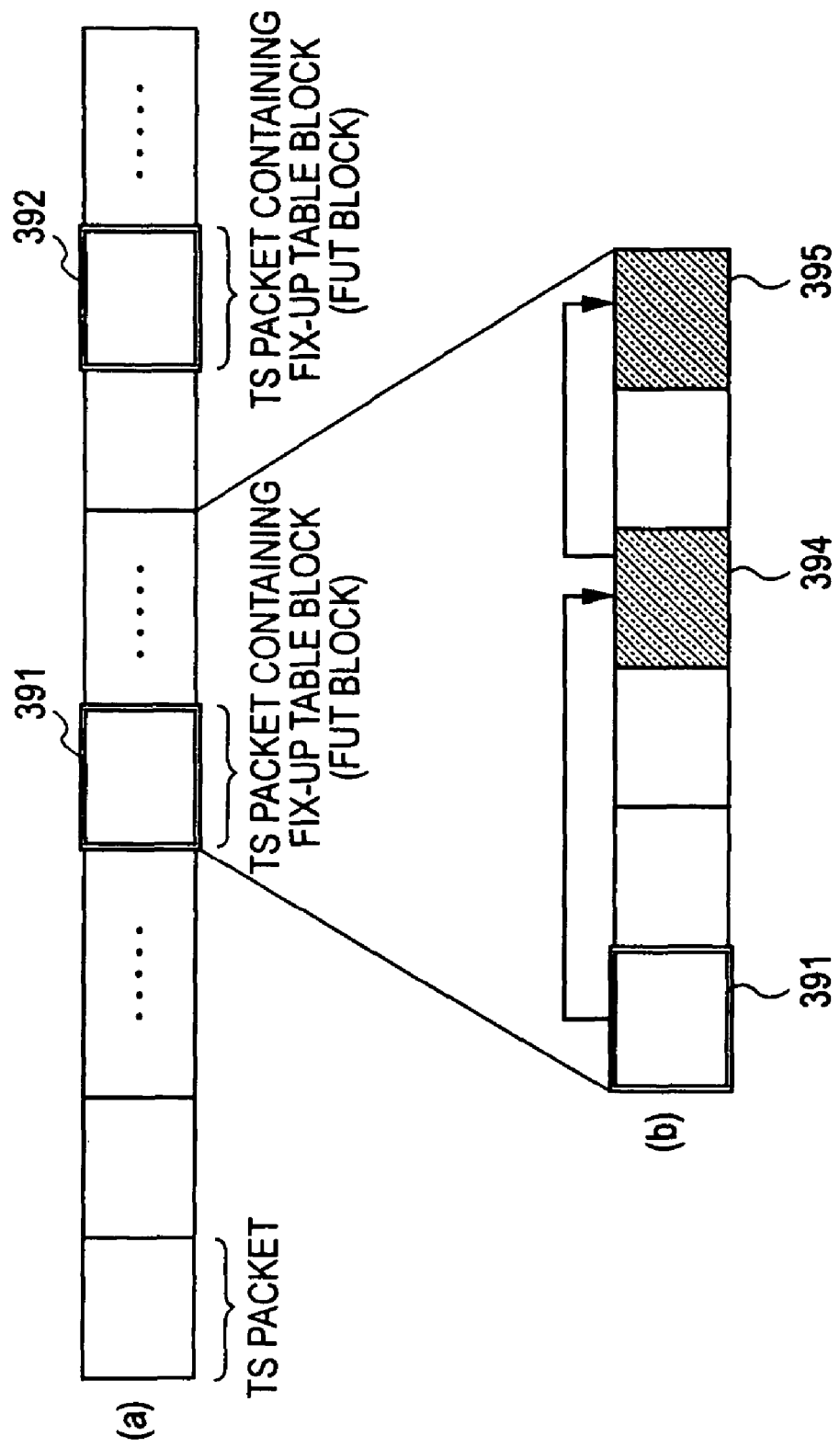
FIG. 23 is a diagram describing data configuration in a case wherein a fix-up table is stored within transport stream packets including a content.

That is to say, with the present processing example, the fix-up table is recorded in a scattered manner throughout certain packets within the configuration data of the encrypted content. For example, the fix-up table is stored within the transport stream packets including the content with the settings such as shown in FIG. 23. FIG. 23A illustrates the configuration of the content data. This content configuration illustrates content data made up of decrypted transport stream (TS) packets. The transport stream is made up of TS (transport stream) packets of a predetermined number of bytes. The fix-up table is divided and recorded in the multiple packets which are a part of these TS packets. For example, the fix-up table is recorded in TS packets 391, 392, and so on shown in the drawing. Examples of TS packets used for storing a fix-up table include TS packets including a PMT (programmable map table) set in a scattered manner within a content.

Recorded in the divided fix-up table is, as with the fix-up table previously described with reference to FIGS. 5 through 8 for example, transformation data (or identifier-set transformation data) for performing a replacement processing with regard to the decrypted content, and the recorded position of the transformation data. However, while FIGS. 5 through 8 represent the modified packet positions of the modified packet 394 and modified packet 395 have been represented with the packet number from the start position of the AV stream file, the modified packet position of the second packet is, such as shown in the arrow in FIG. 22, preferably recorded with the position data indicating the relative packet position from the first modified packet 394 to the latter modified packet 395. Such a case provides an advantage wherein a mistake hardly occurs in the actual authoring process, and mounting is readily carried out, even if a restriction such as "source packet number of modified packet 394>source packet number of modified packet 395" is not provided.

The transformation data recorded in each of the fix-up tables, has the recorded position set nearby the TS packets including each of the fix-up tables, such as shown in FIG. 23B, for example. For example, with the example shown in FIG. 23B, the packets 394 and 395 having transformation data recording regions are set nearby the packet 391 including the fix-up table. Setting thus enables data replacement processing using transformation data as continuous processing following decryption in the case of decrypting and reproducing a content in real-time, and detection and analysis processing of TS packets recording the fix-up table allows processing for obtaining the transformation data and writing (overwriting) the transformation data to the position recorded in the table to be carried out effectively.

With the content reproducing processing example 3 shown in FIG. 22, the processing of a block 381 shown in a dotted line frame is executed as real time processing, and the processing of a block 383 is executed as intermittent low-frequency processing which is intermittently executed prior to or during content reproduction or output processing.

The secure VM 356 reads out the data transformation processing program 315 including command code information from the information recording medium 310, and intermittently generates and outputs secret parameters (P1, P2, P3, and so on) necessary for transforming the fix-up table recorded in the information recording medium 310 along with the content into a plaintext fix-up table prior to or during content reproduction or output processing based on control of the event handler 354, and input of the player information 355. This processing is intermittently performed.

The parameters (P1, P2, P3, and so on) are computation or encryption processing parameters applying to fix-up tables divided corresponding to predetermined content data units, e.g., divided fix-up tables 1, 2, 3, and so on which are recorded in a content in a scattered manner. Each of the divided fix-up tables 1, 2, 3, and so on is subjected to computation or encryption processing applying each different parameter (P1, P2, P3, and so on), and recorded in the information recording medium.

For example, a specific example is an exclusive-OR (XOR) computation parameter applying to the divided fix-up tables 1, 2, 3, and so on. The secure VM 356 executes processing for intermittently generating and outputting parameters (P1, P2, P3, and so on) necessary for transforming the fix-up table 314 into a plaintext fix-up table in accordance with the data transformation processing program 315.

With the real time processing block 381, in step S301, decryption of an encrypted content 318 including fix-up tables is executed, each of the fix-up tables is separated by the demulitplexing processing in step S302, the table restoration and data transformation processing in step S303 are executed under control of a real-time event handler 361. Under control of the real-time event handler 361, a plaintext fix-up table is obtained by executing decryption or computation of the fix-up table by applying the parameters (P1, P2, P3, and so on) intermittently output from the secure VM 356, and data transformation processing for writing the transformation data registered in the obtained partial fix-up table, i.e., (a) transformation data, and (b) identifier-set transformation data in the specified positions recorded in the fix-up table is executed as real time processing in parallel with content reproducing processing or external output processing.

For example, in the event that the parameters (P1, P2, P3, and so on) are exclusive-OR (XOR) computation parameters as to the transformation data corresponding to predetermined content partial data units, as for the table restoration processing in step S303,

[fix-up table 1] (XOR) [P1],
[fix-up table 2] (XOR) [P2],
[fix-up table 3] (XOR) [P3], and so on these exclusive-OR computation processing are executed to obtain each of plaintext fix-up table data. Note that with the above expressions, let us say that [A] (XOR) [B] means exclusive-OR computation between A and B.

Thus, the fix-up table included in the content 318 recorded in the information recording medium is divided into the fix-up tables in which the transformation data corresponding to each content portion and transformation data positional information are recorded, and these have been subjected to exclusive-OR computation with the parameters (P1, P2, P3, and so on) serving as unique secret parameters respectively, and stored. The secure VM 356 obtains and outputs this parameter successively.

The processing following the table restoration and data transformation processing in step S303 is the same as the processing previously described with reference to FIG. 18 and others, and is performed as real time processing executed in parallel with the content reproduction and content external output processing. That is to say, the demultiplexing processing in step S304, the decoding processing in step S305, these processing are executed as real time processing in parallel with content reproduction and external output.

With the present processing example, an arrangement is made wherein the configuration data of the fix-up table corresponding to the entire content is divided, a different parameter is correlated with each divided fix-up table, and these parameters are intermittently output by the secure VM 356, so even if a part of the parameter is leaked out for example, it is impossible to restore the entire content, thereby realizing more secure content usage management. Also, even with the present processing example, as with the above other processing examples, real time processing which gives no influence upon the content reproduction and external output processing can be realized. Also, for example, in the event of unauthorized processing being detected during content reproduction, canceling the processing of the secure VM 356 based on unauthorized processing detection information of the event handler 354 enables generation of the transformation data to be canceled, and enables unauthorized content reproduction and external output to be terminated partway through.

6. Generating and Reproducing Processing Example 1 of a Content Including Modified Data Corresponding to Special Reproduction Next, description will be made regarding generating and reproducing processing of content including modification data corresponding to special reproduction. As can be clearly understood from the above description regarding the processing examples shown in "5. Content reproducing processing", reproduction of a content needs to perform data transformation to which the fix-up table is applied. With normal content reproducing processing, data transformation processing can be executed without being too slow for the content reproduction rate, but in the event of executing special reproducing processing such as high-speed reproduction like fast-forwarding or rewinding, a case sometimes occurs wherein the processing of the data transformation processing cannot keep up with the high-speed reproduction rate of the content.

Particularly, as described with the above (5.3) Content reproducing processing example 3, in the event that processing for executing computation to which a different parameter is applied to each of the divided and recorded fix-up tables is necessary, further processing time becomes necessary for the data transformation, and consequently, a case of being able to keep up with the high-speed rate sometimes occurs. Hereinafter, with such content special reproduction, description will be made regarding the generating and reproducing processing of content in which processing errors along with data transformation are prevented from occurring.

As described above, more effective data destruction can be realized by subjecting the I picture of each GOP to modified data such as modified data or the like. If all of the I pictures included in all the GOPs making up an MPEG content are set as modified data, when performing special reproduction such as high-speed reproduction, calculation of the parameters, acquisition of the fix-up table, and data replacement with the transformation data registered in the fix-up table need to be executed for each GOP, and consequently, the processing is sometimes too slow for the reproduction rate.

Normally, the picture data which is applied to special reproduction such as high-speed reproduction to which an MPEG content is applied is only I pictures. In other words, special reproduction such as high-speed reproduction is performed by selecting and reproducing only I pictures for each predetermined interval.

Employing an arrangement wherein the I pictures included in all the GOPs making up an MPEG content are not set as modified data, i.e., the I pictures included in the GOP to be applied to special reproduction such as high-speed reproduction are not set as modified data allows the reproducing device to execute special reproduction such as high-speed reproduction without performing calculation of the parameters, acquisition of the fix-up table, and data replacement with the transformation data registered in the fix-up table.

Figure 24:
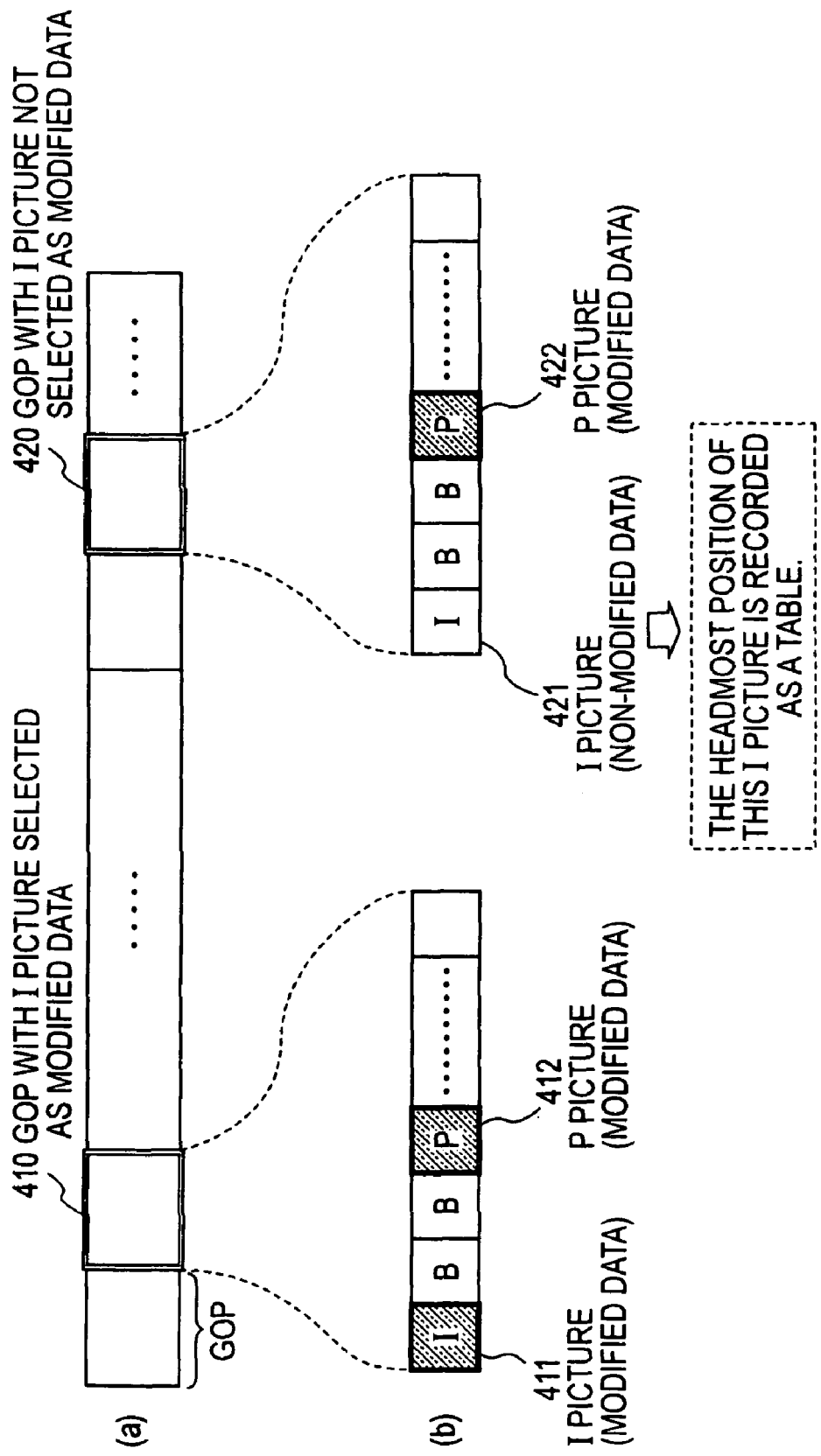
FIG. 24 is a diagram describing a content configuration example employing an arrangement wherein the I pictures included in the GOP to be applied to special reproduction are not set as modified data.

Description will be made regarding a content configuration example employing an arrangement wherein the I pictures included in the GOP to be applied to special reproduction such as high-speed reproduction are not set as modified data with reference to FIG. 24. FIG. 24A illustrates a content (MPEG content) to be stored in the information recording medium. The content is recorded in increments of GOP made up of the I, P, and B pictures.

The GOP 410 shown in FIG. 24A is a GOP in which the I pictures are set as modified data. As shown in FIG. 24B, the I picture 411 and P picture 412 which are set as modified data are included. On the other hand, the GOP 420 shown in FIG. 24A is a GOP in which the I pictures are not set as modified data. As shown in FIG. 24B, the I picture 421 which is not set as modified data and the P picture 422 which is set as modified data are included.

A table (special reproduction management information table) or EP map in which the headmost position of the I pictures which are not set as modified data is recorded is generated, and recorded in the information recording medium. A specific example of the special reproduction management information table or EP map will be described later.

The reproducing device for executing special reproduction such as high-speed reproduction reads out the special reproduction management information table or EP map, obtains the headmost position information of the I pictures which are not set as modified data, selects only the I pictures made up of such non-modified data, and subjects these to high-speed reproduction, thereby executing special reproduction such as high-speed reproduction without performing calculation of the parameters, acquisition of the fix-up table, and data replacement with the transformation data registered in the fix-up table.

Further, description will be made regarding a content configuration example enabling special reproduction such as high-speed reproduction to be executed without performing data replacement using modified data with reference to FIG. 25. The example described with reference to FIG. 24 is an example wherein only the I pictures within the GOP to be used at the time of special reproduction such as high-speed reproduction, of certain GOPs are not set as modified data. However, reproduction is sometimes performed using not only I pictures but also P and B pictures at the time of special reproduction such as high-speed reproduction depending on the specifications of the reproducing device.

Figure 25:
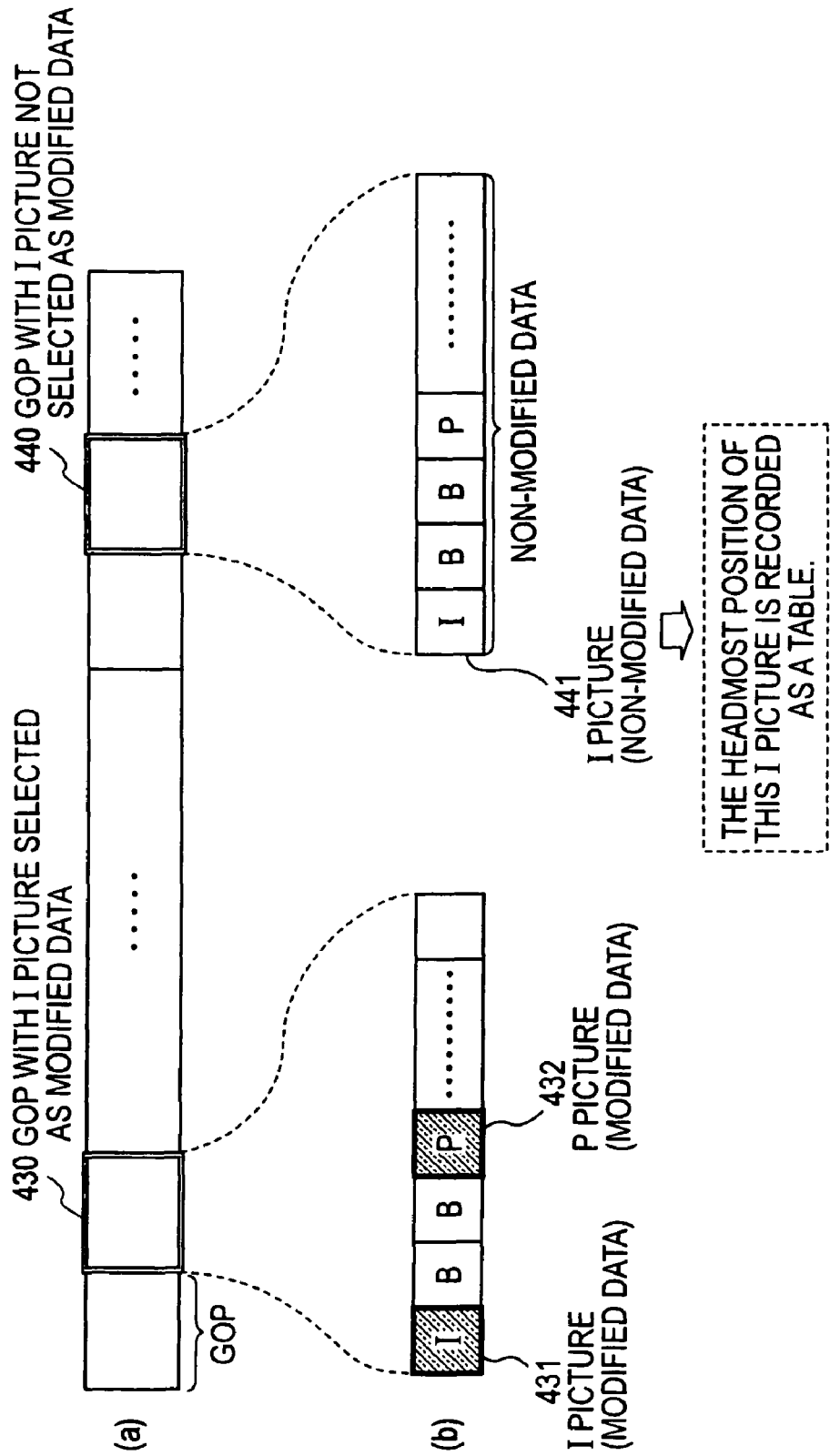
FIG. 25 is a diagram describing a content configuration example enabling special reproduction such as high-speed reproduction to be executed without performing data replacement using modified data.

In FIG. 25, in order to be applicable to such reproducing processing, not only the I pictures within the GOP to be used at the time of special reproduction such as high-speed reproduction but also all the I, P, and B pictures included in a certain GOP are set as non-modified data. In other words, the processing is determined in increments of GOP to set the GOPs made up of only non-modified data.

FIG. 25A illustrates a content (MPEG content) to be stored in the information recording medium. The content is recorded in increments of GOP made up of the I, P, and B pictures. The GOP 430 shown in FIG. 25A includes the I picture 431 and P picture 432 which are set as modified data, as shown in FIG. 25B. On the other hand, the GOP 440 shown in FIG. 25A includes the I picture 441 made up of non-modified data as shown in FIG. 25B, and further the I, P, and B pictures included in the GOP are all set as non-modified data.

A table (special reproduction management information table) or EP map in which the headmost position of the I pictures of such GOP including no modified data is recorded is generated, and recorded in the information recording medium. The reproducing device for executing special reproduction such as high-speed reproduction reads out the special reproduction management information table or EP map, obtains the headmost position information of the I pictures which are not set as modified data, selects only the I pictures made up of such non-modified data, and subjects these to high-speed reproduction, thereby executing special reproduction such as high-speed reproduction without performing calculation of the parameters, acquisition of the fix-up table, and data replacement with the transformation data registered in the fix-up table.

Figure 26:
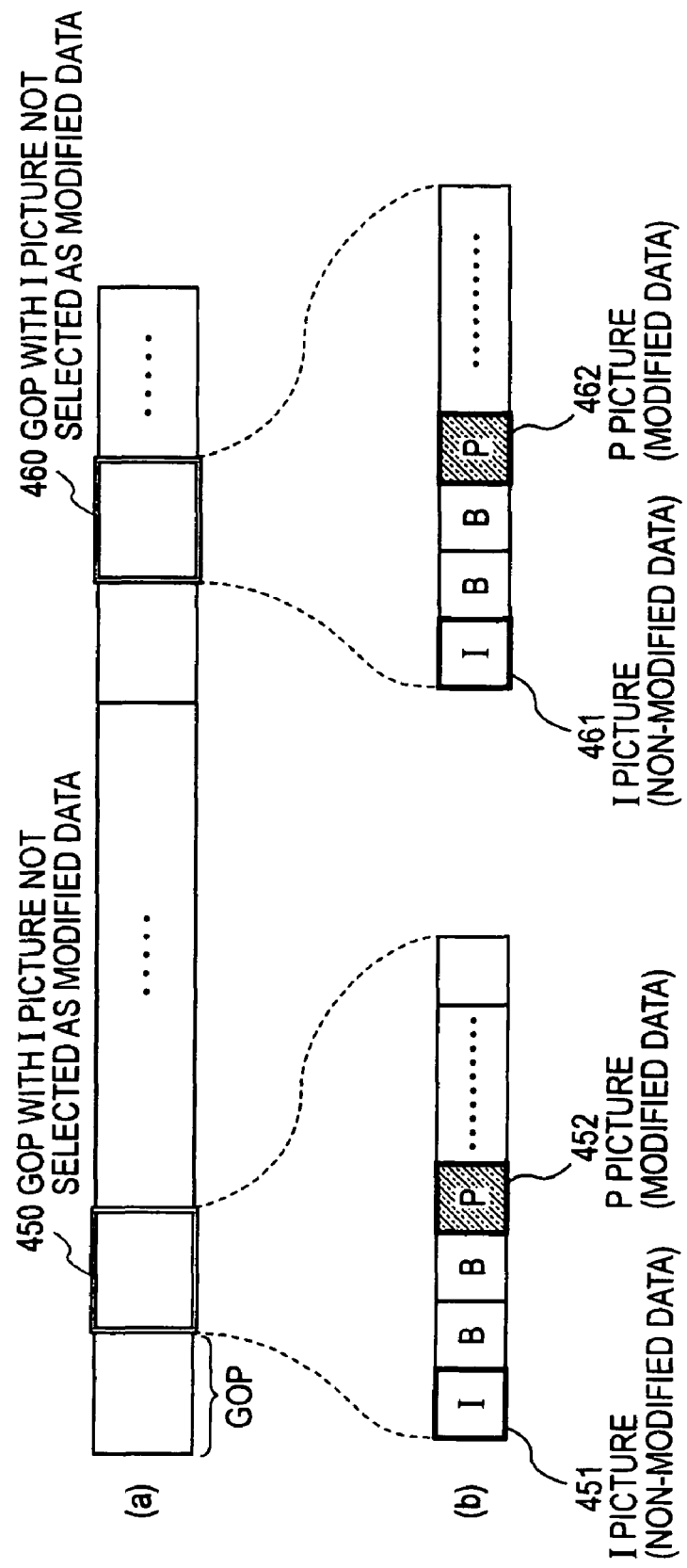
FIG. 26 is a diagram describing a content configuration example enabling special reproduction such as high-speed reproduction to be executed without performing data replacement using modified data.

Also, as shown in FIG. 26, all of the I pictures within all of the GOPs may be set as non-modified data. The GOP 450 shown in FIG. 26A includes the I picture 451 which is set as non-modified data and the P picture 452 which is set as modified data, as shown in FIG. 26B. Also, the GOP 460 shown in FIG. 26A includes the I picture 461 made up of non-modified data and the P picture 452 which is set as modified data, as shown in FIG. 26B. Thus, the I pictures included in all of the GOPs are all set as non-modified data.

Performing such settings allows the reproducing device for selecting at least I pictures alone and executing special reproduction such as high-speed reproduction to execute special reproduction such as high-speed reproduction without performing calculation of the parameters, acquisition of the fix-up table, and data replacement with the transformation data registered in the fix-up table. In this case, the headmost position information of the I pictures which are not set as modified data need not to be obtained, so there is no need to read out a special reproduction management information table or EP map to obtain the positional information of a certain I picture. However, setting the I pictures as non-modified is not desirable from the perspective of image destruction, and therefore setting all I pictures as non-modified is especially effective in the event of, for example, including identifier-set modified data and identifier-set transformation data and not including broken data.

With the configurations described with reference to FIGS. 24 and 25, the table (special reproduction management information table) or EP map in which the positions of the I pictures which are not set as modified data are recorded becomes necessary. Description will be made regarding the configurations of these table and EP map with reference to FIG. 27.

FIG. 27 illustrates two examples of the special reproduction management table in which the positions of the I pictures which are not set as modified data are recorded. FIG. 27A is a table in which information of Number of I pictures without data modification [MT: Media Transform], and Packet number of the headmost I picture without data modification (MT)

is recorded. Note that SPN is Source Packet Number, and is information indicating a packet number.

The reproducing device obtains this special reproduction management information table from the information recording medium, and obtains the positions of the I pictures including no data modification, thereby executing special reproduction such as high-speed reproduction without data transformation by performing reproducing processing made up of those I pictures alone.

FIG. 27B is a table in which information of

Number of I pictures without data modification [MT: Media Transform],

Packet number of the headmost I picture without data modification (MT), and

PTS of the I picture without data modification (MT) is recorded. Note that PTS is a timestamp (presentation timestamp) indicating reproduction time information corresponding to a source packet.

The reproducing device obtains this special reproduction management information table from the information recording medium, and obtains the positions of the I pictures including no data modification, thereby executing special reproduction such as high-speed reproduction without data transformation by performing reproducing processing made up of those I pictures alone. With the table shown in FIG. 27B, the timestamp indicating the reproduction time information corresponding to the I picture packet without data modification (MT) can be obtained from the table, thereby facilitating that a certain I picture alone according to special reproduction rate is selected from the I pictures without data modification (MT) and reproduced.

The special reproduction management information table shown in FIG. 28 illustrates a table example in which information of Number of I pictures without data modification [MT: Media Transform], and EP map designation information corresponding to the headmost packet of I pictures without data modification (MT) is recorded.

The reproducing device for executing special reproduction such as high-speed reproduction obtains EP map designation information (EP map ID) corresponding to the headmost packet of the I pictures without data modification (MT) from the special reproduction management information table shown in FIG. 28, following which obtains an EP map based on the EP map designation information, and obtains the position of the I picture without data modification (MT) from the EP map.

Figure 29:
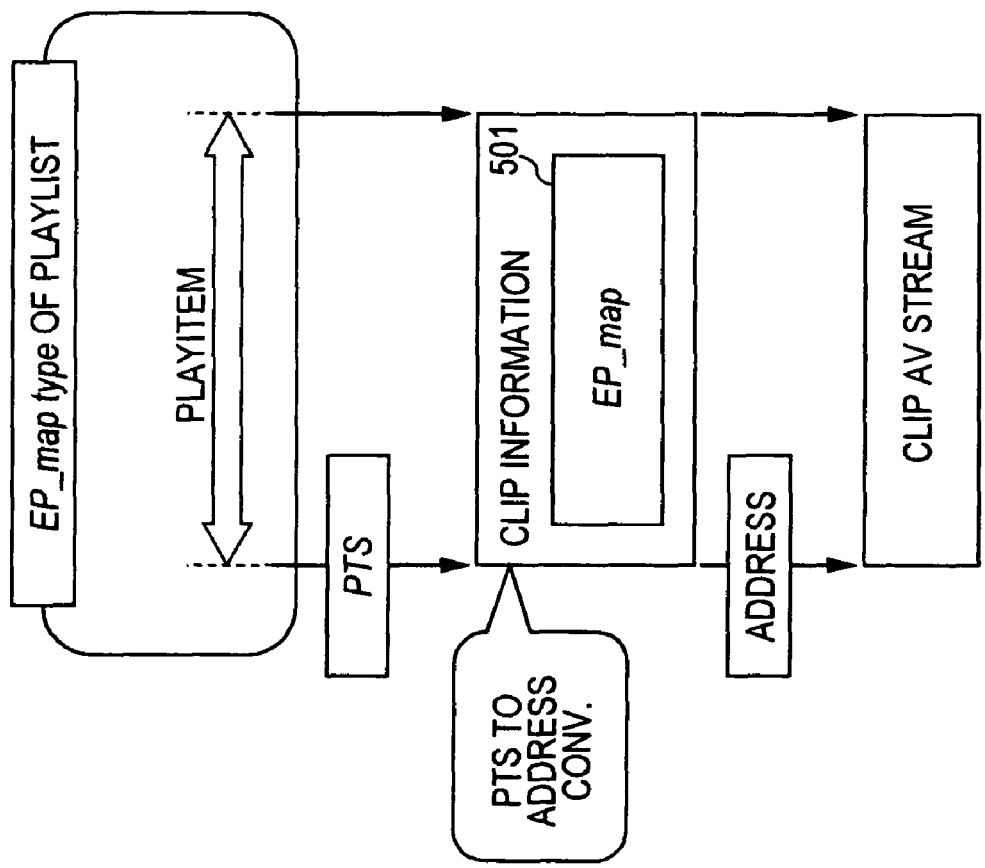
FIG. 29 is a diagram describing an EP map.
Figure 30:
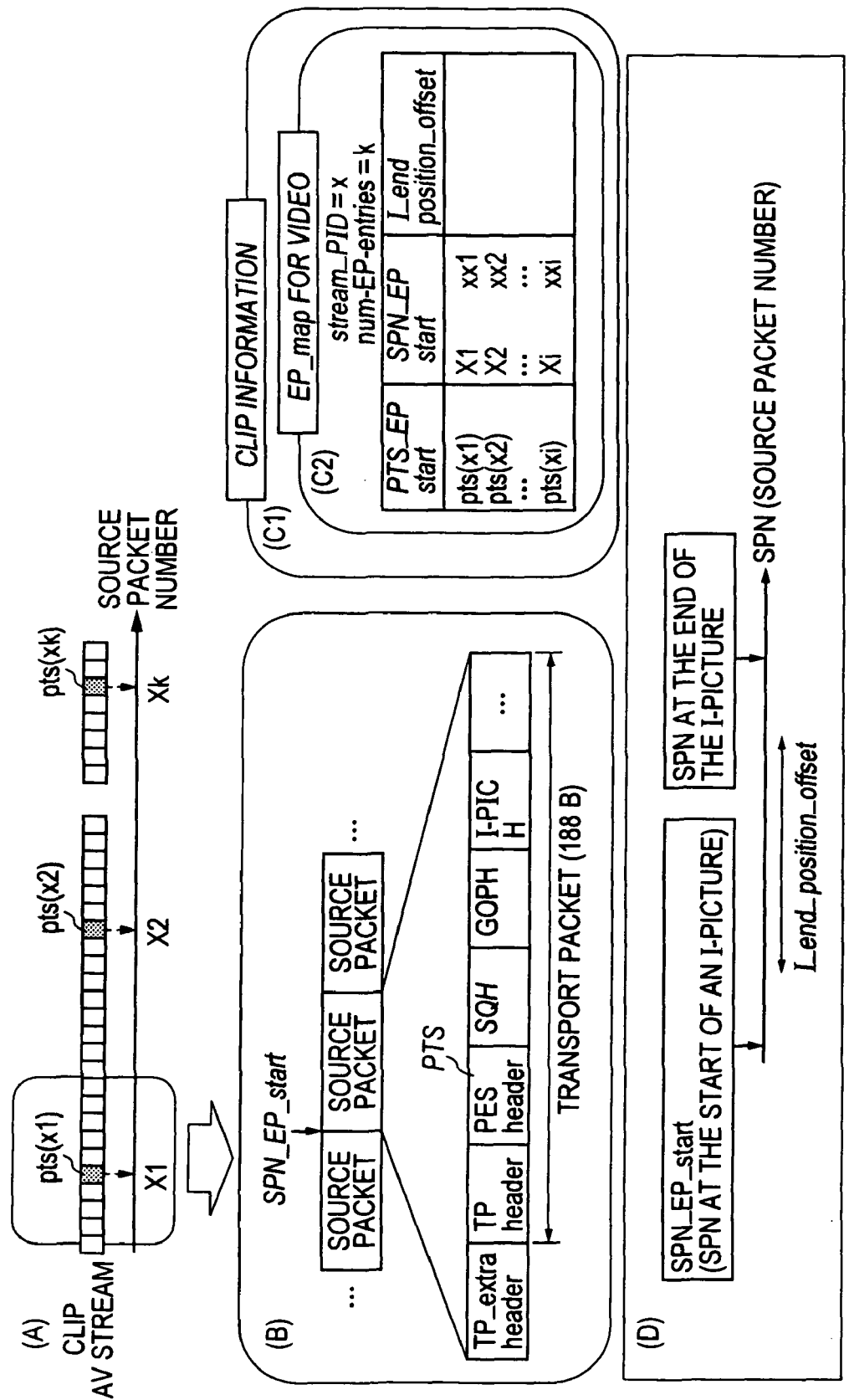
FIG. 30 is a diagram describing an EP map.

Description will be made regarding an EP map with reference to FIGS. 29 and 30. As shown in FIG. 29, an EP map (EP_map) 501 is data included in a clip information file (clip information). Description will be made regarding detection of an I picture position based on the EP map with reference to FIG. 30. FIG. 30A illustrates a clip AV stream, wherein each rectangle illustrates a 192-bit source packet. A timestamp is set to each source packet wherein reproducing processing time is stipulated.

FIG. 30B illustrates the detailed configuration of the source packet No. (X1). One source packet includes a TP_extra header, and a transport packet, and the transport packet includes various types of header information, and data of I-PICH and so on serving as MPEG2 entity data.

The clip information shown in FIG. 30C includes an EP map as described above. The EP map, as shown in the drawing, includes each data of [PTS_EP start], [SPN_EP start], and [I_end_position_offset]. The meaning of each data is as follows:

PTS_EP_start: timestamp (presentation timestamp) corresponding to a source packet including a sequence header SPN_EP_start: the headmost address of the source packet including a sequence header I_end_position_offset: The offset between the source packet including a sequence header and the source packet including the end of the I picture FIG. 30D illustrates these data relationships.

That is to say, as shown in FIG. 30B, the configuration of data included in a source packet is stipulated, obtaining each data of the [PTS_EP start], [SPN_EP start], and [I_end_position_offset] shown in FIG. 30C enables the I picture position within the source packet to be obtained based on these data.

The reproducing device for executing special reproduction such as high-speed reproduction obtains EP map designation information (EP map ID) corresponding to the headmost packet of the I pictures without data modification (MT) from the special reproduction management information table shown in FIG. 28, following which obtains an EP map based on the EP map designation information, and obtains the positions of the I pictures without data modification (MT) based on the EP map to execute reproduction, thereby enabling special reproduction such as high-speed reproduction made up of only the I pictures without data modification, and special reproduction without data transformation to be executed.

Further, FIG. 31 illustrates an EP map configuration for enabling special reproduction such as high-speed reproduction made up of only the I pictures without data modification by applying modification to the EP map itself, and referring to the EP map alone without applying the special reproduction management information table described with reference to FIGS. 27 and 28. In the EP map shown in FIG. 31, the following data:

Number of EP maps,

Headmost packet number of I pictures (SPN: Source Packet Number),

PTS (presentation timestamp) of the I picture, and

Flag indicating the presence of data modification (MT) are recorded.

Of these data,

Number of EP maps,

Headmost packet number of I pictures (SPN: Source Packet Number), and

PTS (presentation timestamp) of the I picture are data included in the EP map as it has been up to now, and the characteristic point is in that Flag indicating the presence of data modification (MT) is additionally set.

Flag indicating the presence of data modification (MT) is a flag for enabling determination regarding whether or not at least the I pictures included in the GOP designated with the EP map are set as modified data. For example, the value of this flag indicates that flag value (0)=without modification, and flag value (1)=with modification.

The reproducing device for executing special reproduction such as high-speed reproduction refers to the flag of the EP map shown in FIG. 31, determines regarding whether or not the I pictures included in the GOP designated with the EP map are modified data, selects the GOP in which the flag indicating non-modified data is set, and obtains the positions of the I pictures without data modification (MT) based on the EP map to execute reproduction, thereby enabling special reproduction such as high-speed reproduction made up of only the I pictures without data modification, and enabling special reproduction without data transformation to be executed.

Thus, applying the special reproduction management table described with reference to FIGS. 27 and 28, or the EP map described with reference to FIG. 31 allows the information processing device for executing content special reproduction such as high-speed reproduction to readily select and obtain picture data such as I pictures which are non-modified, i.e., not set as modified data, to perform special reproduction such as high-speed reproduction made up of only pictures without data modification, and to execute special reproduction without data transformation.

Figure 32:
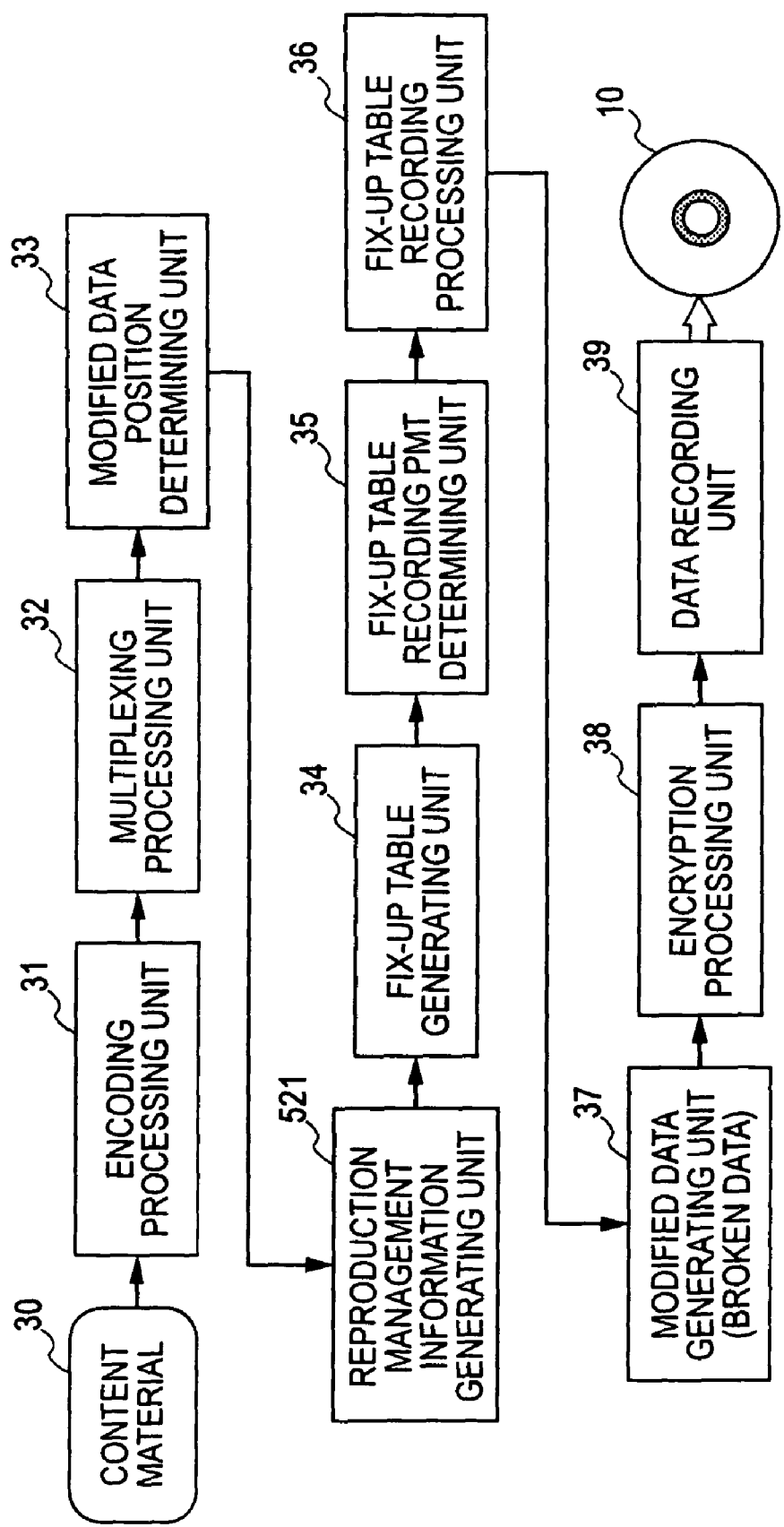
FIG. 32 is a diagram describing a device configuration for executing creating and recording processing of content including modified data, and manufacturing processing of an information recording medium storing a content.

Note that the special reproduction management table described with reference to FIGS. 27 and 28, or the EP map described with reference to FIG. 31 is recorded in the information recording medium along with the content. FIG. 32 illustrates the configuration of a device for manufacturing an information recording medium. The device configuration shown in FIG. 32 is a configuration wherein a reproduction management information generating unit 521 for executing processing for generating a table or EP map enabling the positional information of non-modified I pictures to be obtained, is added to the device described with reference to FIG. 3, and the other configurations are almost the same as the configurations described with reference to FIG. 3.

The reproduction management information generating unit 521 generates the special reproduction management table described with reference to FIGS. 27 and 28, or the EP map described with reference to FIG. 31. A data recording unit 39 executes processing for recording the table or EP map enabling the positional information of non-modified I pictures generated by the reproduction management information generating unit 521 to be acquired in an information recording medium.

Note that the modified data position determining unit 33 determines a modified data position serving as modified data setting position using, for example, processing for selecting certain I pictures alone, processing for selecting no I pictures as modified data, or the like in accordance with each processing mode described with reference to FIGS. 24 through 26.

The modified data generating unit 37 selects I pictures serving as modified data and I pictures serving as non-modified data from multiple I pictures included in MPEG encoded data respectively according to the information to be set in the special reproduction management table described with reference to FIGS. 27 and 28, or the EP map described with reference to FIG. 31, and subjects only the I pictures selected as modified data to data modification processing to generate modified data.

The modified data generating unit 37 sets, of the multiple I pictures included in the MPEG encoded data, the I pictures serving as non-modified data for each predetermined cycle (N) to execute processing for generating modified data. Note that as for a configuration example for setting non-modified pictures for each predetermined cycle, description will be made in detail with later-described [7. Generating and reproducing processing example 2 of a content including modified data corresponding to special reproduction].

Figure 33:
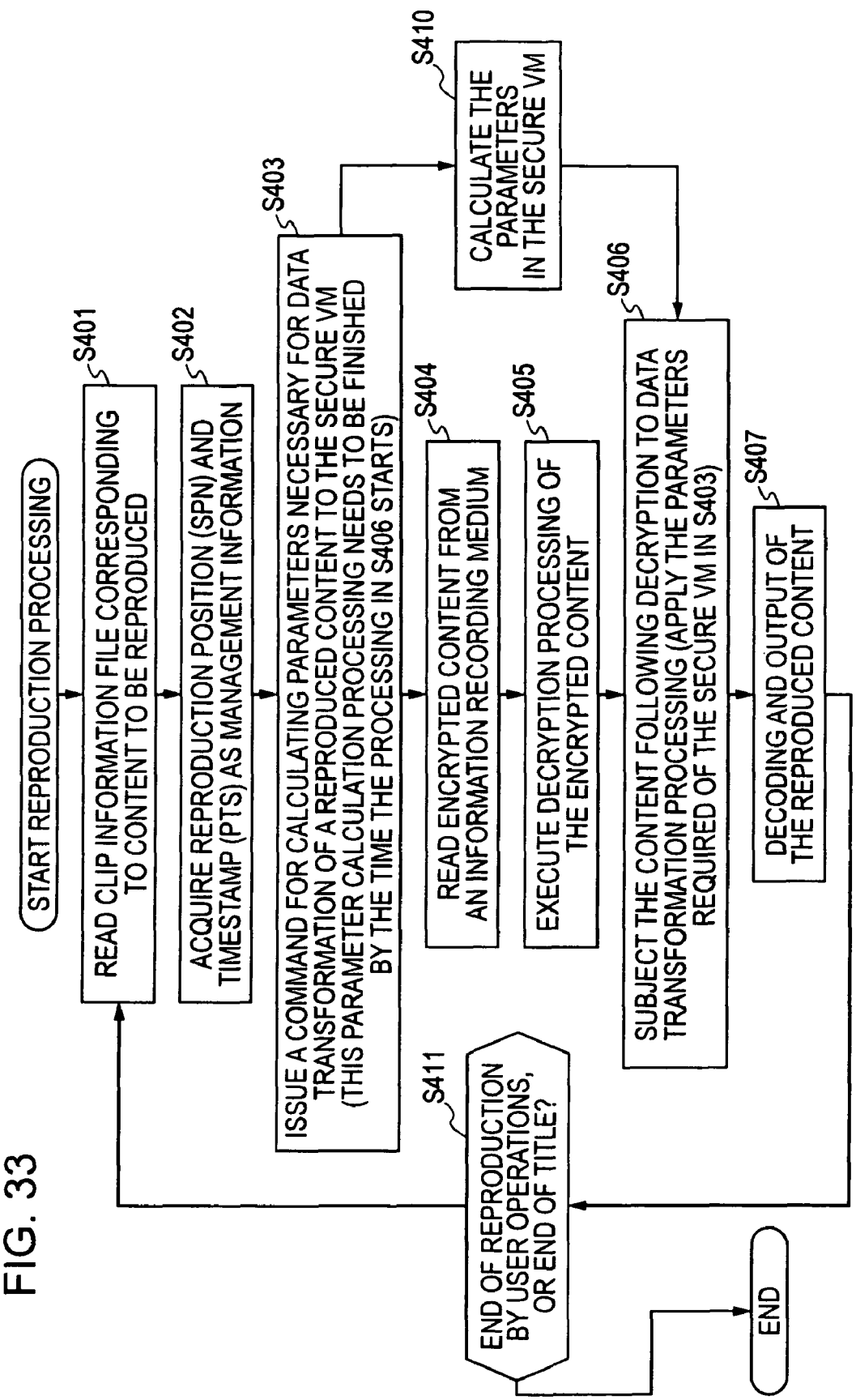
FIG. 33 is a diagram illustrating a flowchart describing the normal reproducing processing sequence accompanied with data transformation.
Figure 34:
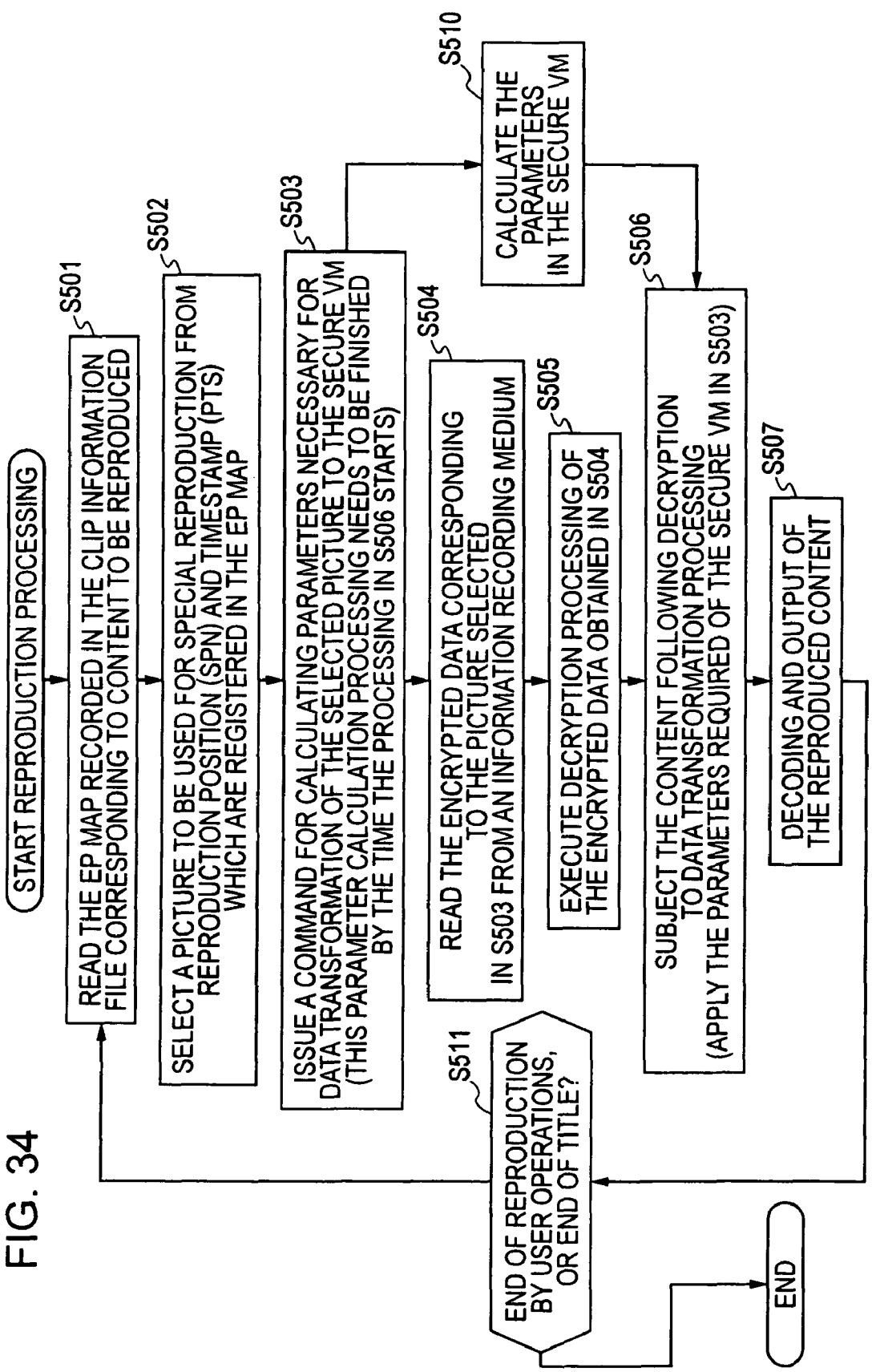
FIG. 34 is a diagram illustrating a flowchart describing the special (high-speed) reproducing processing sequence accompanied with data transformation.
Figure 35:
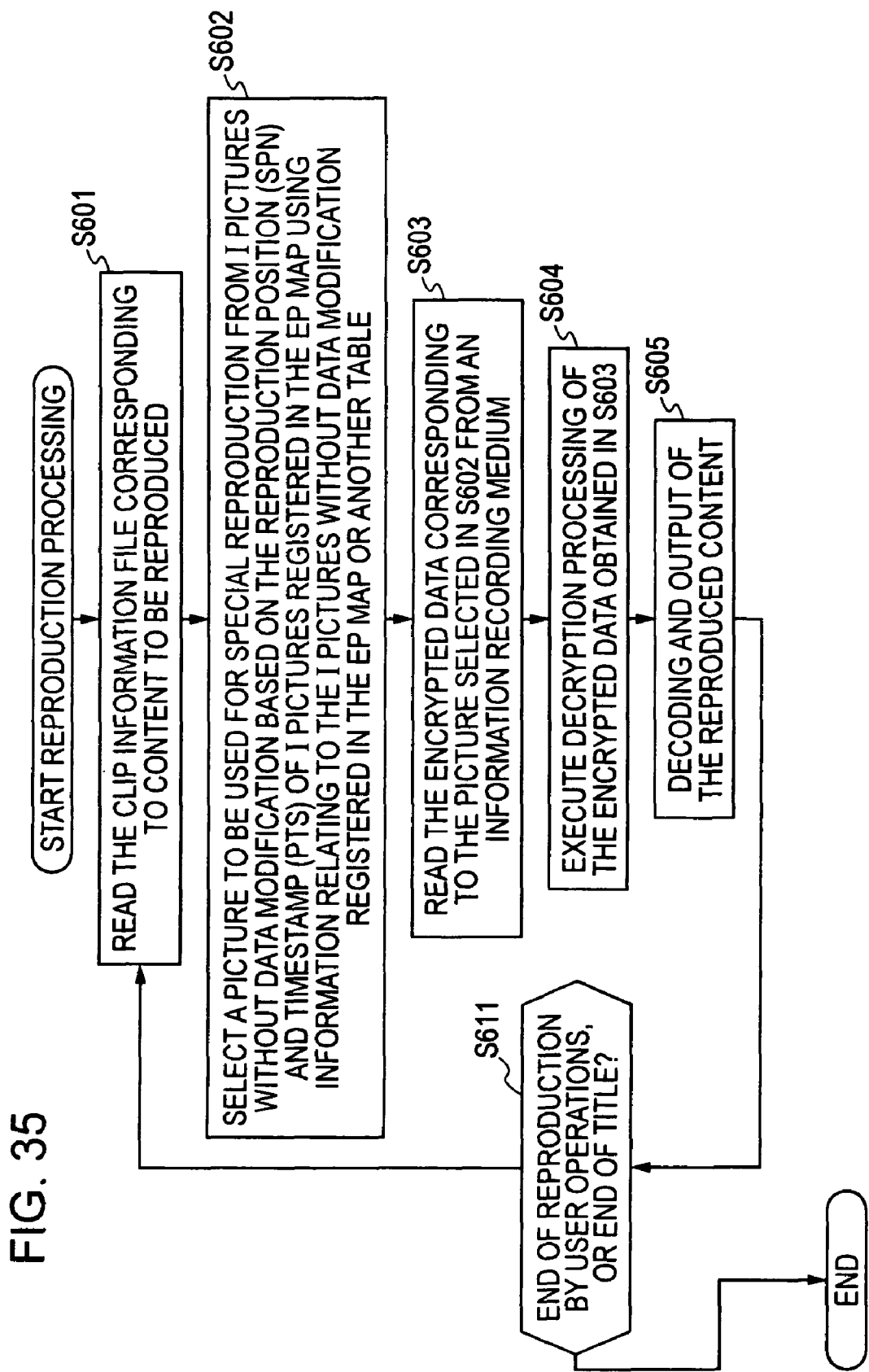
FIG. 35 is a diagram illustrating a flowchart describing the special (high-speed) reproducing processing sequence not accompanied with data transformation by applying a special reproduction management information table or an EP map.

Next, description will be made regarding reproducing sequences in the case that the information processing device performs content reproducing processing with reference to FIG. 33 through 35. Specifically, these three types of content reproducing sequence will be described:

FIG. 33: normal reproducing processing which is accompanied by data transformation, FIG. 34: special (high-speed) reproducing processing which is accompanied by data transformation, and FIG. 35: special (high-speed) reproducing processing not accompanied with data transformation by applying the above special reproduction management information table or EP map.

First, description will be made regarding normal content reproducing sequence accompanied with data transformation with reference to FIG. 33. The processing flow in FIG. 33 corresponds to the content reproducing processing previously described with reference to FIG. 22, the processing in the block 381 shown with the dotted line frame in FIG. 22, i.e., the processing of the content reproducing processing unit of the host for executing real time processing is executed as the processing in steps S401 through S407 in the flow shown in FIG. 33, and the processing of the secure VM 356 for executing the processing in the block 385 shown with the dotted line frame in FIG. 22 is equivalent to the processing in step S410 of the flow shown in FIG. 33.

First, in step S401, the information processing device for executing content reproduction selects a content to be reproduced from the contents recorded in the information recording medium, and reads the clip information file corresponding to the selected content to be reproduced. As previously described with reference to FIG. 29, the clip information file stores an EP map, and the I picture positions within source packets making up an AV stream serving as content to be reproduced, and [SPN] and [PTS] serving as reproducing time information are recorded in the EP map.

In step S402, the information processing device for executing content reproduction obtains the I picture positions within source packets making up an AV stream serving as content to be reproduced, and [SPN] and [PTS] serving as reproducing time information from the EP map included in the clip information file. Next, in step S403, the information processing device issues to the secure VM a calculation request of parameters which are necessary for data replacement processing using the transformation data to which the fix-up table is applied. Note that the present processing example is a processing example corresponding to the content reproducing processing example described with reference to FIG. 22, restoration of the fix-up table is executed by sequentially applying the parameters (P1, P2, P3, and so on) serving as the secret parameters supplied from the secure VM 356 as shown in FIG. 22 at the time of replacement of the content to which the fix-up table is applied, and transformation data and identifier-set transformation data are obtained from the restored fix-up table.

The processing in step S403 is processing for requesting the secure VM to perform this parameter calculation, the secure VM calculates parameters in accordance with the request in step S410, and sequentially supplies these to the reproducing processing unit of the host for executing content reproduction. With this parameter calculation and supplying processing at the secure VM, it is necessary for the reproducing processing unit to receive the parameters within time enough for reproduction time of a content, i.e., enabling data replacement. In other words, the supplying of the parameter from the secure VM needs to be received by the time of the execution time of the data transformation processing in step S406 in the flow shown in FIG. 33.

In step S403, following issuing the parameter calculation command to the secure VM, the content reproducing processing unit of the host reads a content to be reproduced (e.g., AV stream data) from the information recording medium in step S404, and executes decryption processing of the readout content in step S405. This decryption processing is the decryption processing previously described with reference to FIGS. 18 through 22.

Following this decryption processing, the content reproducing processing unit subjects the decrypted content to data transformation processing in step S406. At the time of this data transformation processing, as previously described with reference to FIG. 22, the content reproducing processing unit sequentially applies the parameters (P1, P2, P3, and so on) supplied from the secure VM 356 to execute restoration of the fix-up table (e.g., exclusive-OR computation by applying the parameters), obtains transformation data and identifier-set transformation data from the restored fix-up table, and executes content replacement processing.

Next, the content reproducing processing unit executes decoding processing and content output in step S407. The decoding processing is, for example, MPEG decoding processing. The content reproducing processing unit repeatedly executes these processing (steps S401 through S407) until reproduction of the configuration data of the content ends (end of title) or the user inputs suspension of the content reproduction (Yes in step S411). In step S411, in the event of detecting end of title or suspension input of the content reproduction by the user, the processing ends. The above is the normal content reproducing sequence accompanied with data transformation.

Next, description will be made regarding the execution sequence of special (high-speed) reproducing processing which is accompanied by data transformation with reference to FIG. 34. The processing flow in FIG. 34 also corresponds to the content reproducing processing previously described with reference to FIG. 22, the processing in the block 381 shown with the dotted line frame in FIG. 22, i.e., the processing of the content reproducing processing unit of the host for executing real time processing is executed as the processing in steps S501 through S507 in the flow shown in FIG. 34, and the processing of the secure VM 356 for executing the processing in the block 385 shown with the dotted line frame in FIG. 22 is equivalent to the processing in step S510 of the flow shown in FIG. 34.

First, in step S501, the information processing device for executing content reproduction selects a content to be reproduced from the contents recorded in the information recording medium, reads the EP map corresponding to the selected content to be reproduced, and in step S502, obtains the I picture positions within source packets making up an AV stream serving as content to be reproduced, and [SPN] and [PTS] serving as reproducing time information from the EP map, and selects pictures to be applied to special (high-speed) reproduction.

Next, in step S503, the information processing device issues to the secure VM a calculation request of parameters which are necessary for data transformation processing to which the fix-up table is applied regarding pictures to be reproduced which are applied to high-speed reproduction.

The secure VM calculates parameters in accordance with the request in step S510, and sequentially supplies these to the reproducing processing unit of the host for executing content reproduction. With this parameter calculation and supplying processing at the secure VM, it is necessary for the reproducing processing unit to receive the parameters within time enough for reproduction time of a content, in the present example, within time enough for reproduction processing of high-speed reproduction enabling data replacement, and this requires processing in shorter time than the processing previously described with reference to FIG. 33. In other words, supply of the parameter from the secure VM needs to be received by the execution time of the data transformation processing in step S506 in the flow shown in FIG. 34, and this allowed time is reduced depending on high-speed reproduction rate.

In step S503, following issuing the parameter calculation command to the secure VM, the content reproducing processing unit of the host reads the encrypted data corresponding to the selected pictures (pictures selected in step S503) making up content to be reproduced (e.g., AV stream data) from the information recording medium in step S504, and executes decryption processing of the readout data in step S505. This decryption processing is the decryption processing previously described with reference to FIGS. 18 through 22.

Following this decryption processing, the content reproducing processing unit subjects the decrypted content to data transformation processing in step S506. At the time of this data transformation processing, as previously described with reference to FIG. 22, the content reproducing processing unit sequentially applies the parameters (P1, P2, P3, and so on) supplied from the secure VM to execute restoration of the fix-up table (e.g., exclusive-OR computation by applying the parameters), obtains transformation data and identifier-set transformation data from the restored fix-up table, and executes content replacement processing.

Next, the content reproducing processing unit executes decoding processing and content output in step S507. The decoding processing is, for example, MPEG decoding processing. The content reproducing processing unit repeatedly executes these processing (steps S501 through S507) until reproduction of the configuration data of the content ends (end of title) or the user inputs suspension of the content reproduction (Yes in step S511). In step S511, in the event of detecting end of title or suspension input of the content reproduction by the user, the processing ends. The above is the special (high-speed) reproducing sequence of a content accompanied with data transformation.

Thus, in the event of executing special (high-speed) reproduction of a content accompanied with data transformation, calculation of the parameters, restoration of the fix-up table to which the parameters are applied, and replacement processing of the transformation data registered in the restored fix-up table, these processing needs to be executed so as to be in reproduction time, and if the reproduction rate increases, these processing cannot keep up with the reproduction time, and consequently, a situation where content reproduction halts may occur.

In order to prevent such a situation, as previously described with reference to FIGS. 24 through 31, an arrangement becomes effective wherein certain I pictures or the like are set as normal content which requires no transformation, i.e., non-modified data, the information regarding these non-modified pictures is registered in the special reproduction management information table or EP map, and at the time of execution of reproducing processing, special (high-speed) reproducing processing which is accompanied by no data transformation is executed by applying the special reproduction management information table or EP map.

Description will be made regarding a sequence for executing special (high-speed) reproducing processing not accompanied with data transformation by applying the special reproduction management information table or EP map with reference to FIG. 35. The processing flow in FIG. 35 also corresponds to the content reproducing processing previously described with reference to FIG. 22, the processing in the block 381 shown with the dotted line frame in FIG. 22, i.e., the processing of the content reproducing processing unit of the host for executing real time processing is executed as the processing in steps S601 through S605 of the flow shown in FIG. 35. The present processing example is special (high-speed) reproducing processing not accompanied with data transformation, so parameter calculation by the secure VM 356 becomes unnecessary.

First, in step S601, the information processing device for executing content reproduction selects a content to be reproduced from the contents recorded in the information recording medium, and reads the clip information file corresponding to the selected content to be reproduced. Next, in step S602, based on the EP map within the clip information file, or the special reproduction management information table previously described with reference to FIGS. 27 and 28, the information processing device obtains information regarding the I pictures without data modification, i.e., the positions of the I pictures without data modification and [SPN] and [PTS] serving as reproduction time information, and selects the pictures to be applied to special (high-speed) reproduction from only non-modified pictures.

In step S603, the information processing device reads the encrypted data corresponding to the selected pictures (pictures selected in step S602) making up content to be reproduced (e.g., AV stream data) from the information recording medium, and executes decryption processing of the readout data in step S604. This decryption processing is the decryption processing previously described with reference to FIGS. 18 through 22.

Next, following this decryption processing, the information processing device executes decoding processing and content output in step S605. The decoding processing is, for example, MPEG decoding processing. The information processing device repeatedly executes these processing (steps S601 through S605) until reproduction of the configuration data of the content ends (end of title) or the user inputs suspension of the content reproduction (Yes in step S611). In step S611, in the event of detecting end of title or suspension input of the content reproduction by the user, the processing ends. The above is the special (high-speed) reproducing sequence of a content not accompanied with data transformation.

Thus, the processing of calculation of the parameters, restoration of the fix-up table to which the parameters are applied, and replacement processing of the transformation data registered in the restored fix-up table, do not need not be executed by applying the special reproduction management information table or EP map to execute special (high-speed) reproducing processing not accompanied with data transformation, and even if the reproduction rate increases, content reproduction which does not halt can be realized.

7. Generating and Reproducing Processing Example 2 of a Content Including Modified Data Corresponding to Special Reproduction Next, as generating and reproducing processing example 2 of a content including modified data corresponding to special reproduction, description will be made regarding a configuration example wherein setting pictures having a certain interval (N) which is stipulated beforehand as non-modified data enables non-modified pictures to be selected effectively, thereby executing special (high-speed) reproducing processing not accompanied with data transformation. That is to say, as previously described with reference to FIGS. 6 through 8, fix-up table blocks are obfuscated so as not to be readily decrypted, and with high-speed reproduction such as 2×, decryption of obfuscation thereof can be realized even having a relative low-capability CPU of the device, but at the time of very high-speed reproduction such as 100× or the like, decryption of obfuscation thereof is sometimes too slow for the reproduction rate. To this end, as described below, the present processing example enables special (high-speed) reproducing processing not accompanied with data transformation without applying the above special reproduction management information table.

The information processing device for executing content reproduction is configured such that a reproduction program of the host obtains the interval information of the I pictures set as non-modified data as cycle information (N) at the time of executing initializing processing in increments of title corresponding to a medium (information recording medium) or content. Alternatively, an arrangement may be made wherein the value of the cycle information (N) is recorded in a database file (e.g., clip information file) of an information recording medium, and the N can be obtained prior to reproduction. Employing such settings allows the reproducing processing unit for executing a content reproduction to obtain the interval of the I pictures set as non-modified data based on the cycle information (N), and performing reproducing processing by selecting the I pictures corresponding to this interval (N) enables special (high-speed) reproduction which requires no data transformation to be executed.

Note that at the time of realizing the present processing example, it is necessary to determine a rule so as to pinpoint the I pictures subjected to no data transformation beforehand from the value of the interval (N) between the I pictures set as non-modified data. For example, a rule such as the following is set.

The headmost I picture of the content is to be non-modified data.

I pictures are to be set as non-modified data in a cycle of N pieces.

Information indicating the I pictures in which the I pictures of the GOP are set as non-modified data is to be recorded in the EP map.

Assuming that the I pictures of a part of the GOPs are set as non-modified data based on a predetermined rule, and special reproduction is to be performed using an EP_MAP in which information indicating non-modified data is not recorded.

Note that an arrangement may be made wherein the interval (N) of the I pictures set as non-modified data is set with a different value for each content, or an arrangement may be made wherein the interval (N) is determined uniformly as a standard common to all the contents. For example, $N=10$ Thus, if the interval of the non-modified I pictures which is common to all of the contents is determined, the reproducing device can perform special reproduction which requires no data transformation processing by executing I picture selection using the interval N=10 in special reproduction of all of the contents store in the information recording medium.

If the reproducing device for executing content reproducing processing knows the interval (N) of the I pictures set as non-modified data, the reproducing device can easily obtain the positions (SPN) and timestamp (PTS) of the non-modified I pictures based on the EP map, and can perform special reproduction collecting these I pictures alone. Note that the I pictures to be selected in special reproduction can be selected with not only an interval of 10, but also 20, 30, through 100, or the like various intervals, thereby handling various reproduction rates.

Figure 36:
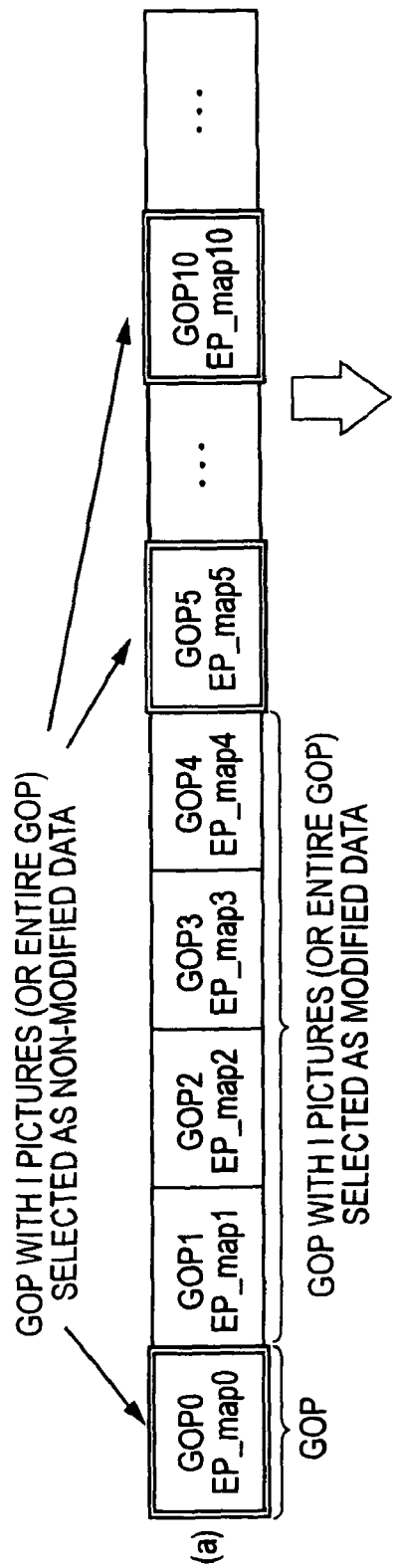
FIG. 36 is a diagram describing a data example of a content in which GOP or picture data serving as non-modified data is set in a predetermined cycle, and an EP map.

Description will be made regarding a specific content setting example and a reproducing processing example with reference to FIG. 36 and the subsequent drawings. FIG. 36A illustrates a content subjected to MPEG encoding, and is a recorded content recorded in the information recording medium. One block corresponds to one GOP.

Each GOP includes, as described above, I pictures, B pictures, and P pictures, and special reproduction such as high-speed reproduction can be performed by reproduction in which I pictures are selected from the GOP for each predetermined interval, for example. The example shown in FIG. 36A is an example wherein the I pictures included in GOPs 0, 5, 10, and so on, or the entire pictures included these respective GOPs are set as non-modified data. With the example shown in FIG. 36A, the interval (n) of the I pictures set as non-modified data, i.e., the cycle information N is $N=5.$ With the EP map, as for information regarding the I pictures included in each GOP as described above, Headmost packet number of I pictures (SPN: Source Packet Number), and PTS (presentation timestamp) of the I picture, these information is recorded, and the information processing device for executing content special reproduction obtains the I picture information registered in the EP map in a predetermined interval based on the cycle (N), and executes reproduction by selecting I pictures, thereby selecting only the I pictures set as non-modified data, and enabling reproduction without performing data transformation.

FIG. 36B illustrates the registration information of the EP map. FIG. 36B illustrates correlation between a table number (I) within the EP map, the headmost packet number of I pictures (SPN), and the PTS (presentation timestamp) of the I picture. These information are stored in the EP map. The table number (I) within the EP map, with this example, coincides with a GOP number. The present example illustrates an example wherein the I picture information of all of the GOPs are stored in the EP map. Note that the I picture information of all GOPs is not always stored in the EP map. Such an example will be described later with reference to FIG. 37.

With the example shown in FIG. 36B, the I picture information of all GOPs is stored in the EP map, the table number [I] within the EP map coincides with a GOP number, which is equivalent to the GOP number within the content shown in (a). One I picture is stored in each GOP, so the GOP number is equivalent to the sequence number from the headmost I picture within the content.

That is to say, 0, 5, and 10 of the table number I registered in the EP map are information relating to non-modified I pictures, and specifically, Headmost packet number of I pictures (SPN: Source Packet Number), and PTS (presentation timestamp) of the I picture, these information are recorded, and the information processing device for executing content special reproduction obtains the I picture information registered in the EP map in a cycle (N=5) interval, i.e., and selects information for each five entries (5 GOP) of the EP map table, thereby enabling the non-modified I pictures to be selected and reproduced, and enabling special reproduction such as high-speed reproduction of only the I pictures set as non-modified data to be performed.

That is to say, if reproduction from a medium in which non-modified I pictures are recorded in a cycle interval is performed using the EP map prepared for special reproduction or the like, special reproduction can be realized without providing a flag or the like in the EP map. Also, for example, if the display period of one GOP is set to 0.5 sec, performing reproduction for each five GOPs enables I picture images for each 2.5 sec to be displayed one after another, thereby realizing high-speed reproduction. Also, not only in the case of high-speed reproduction wherein the reproducing device obtains all of the non-modified I pictures with the present example, but also in the case of non-modified I pictures exist in a cycle of N=5, if we say that pictures to be reproduced are selected and displayed in a cycle of N=10, displaying pictures for each 10 GOPs enables images for each 10 sec to be displayed, thereby performing further high-speed reproduction depending on a display period of one picture.

Figure 37:
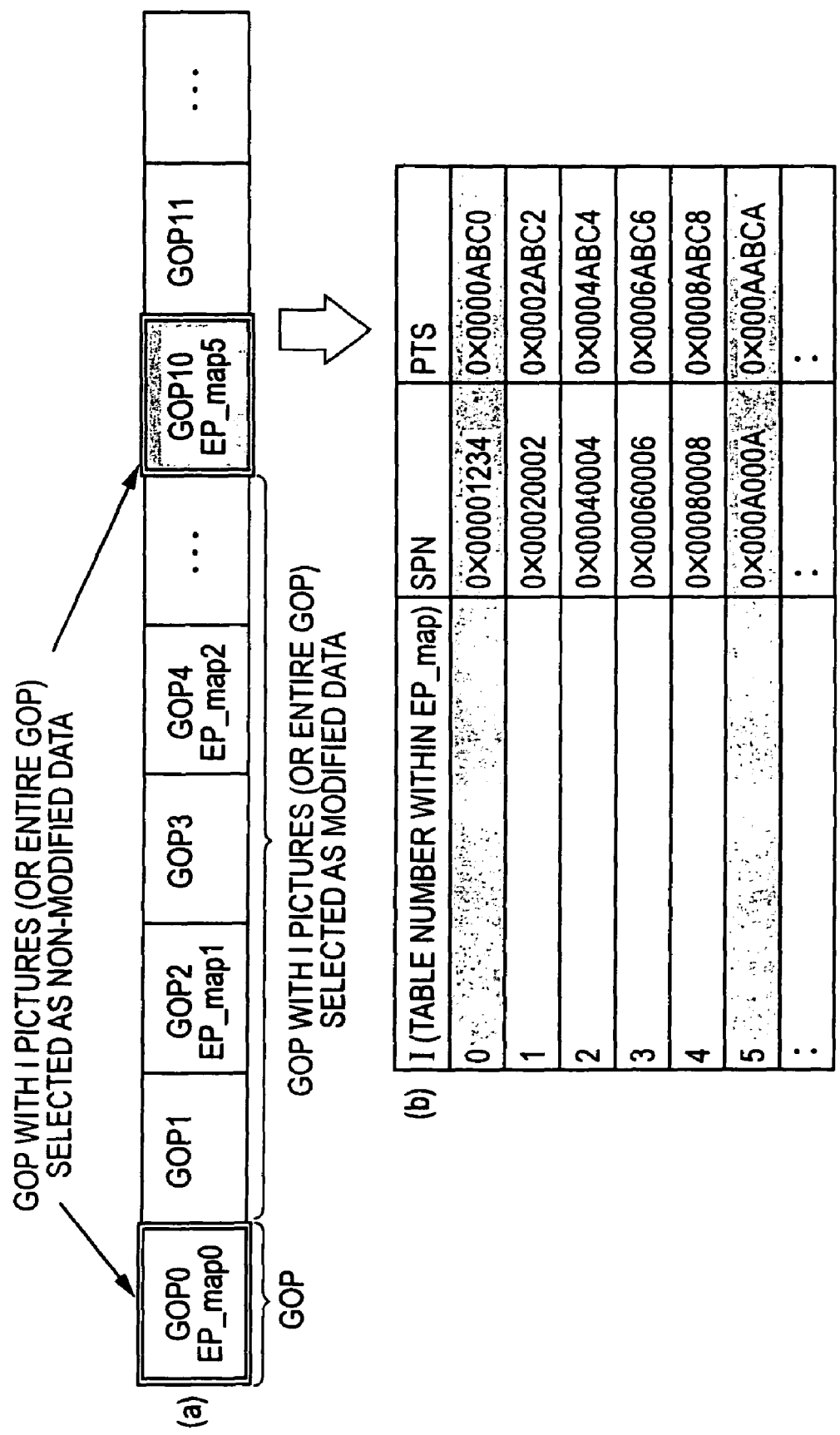
FIG. 37 is a diagram describing a data example of a content in which GOP or picture data serving as non-modified data is set in a predetermined cycle, and an EP map.

Next, description will be made regarding an example in the case of storing no I picture information corresponding to all of the GOPs in the EP map with reference to FIG. 37. As described above, the I picture information of all GOPs is not always stored in the EP map. FIG. 37 illustrates a registration information example of such an EP map, for example.

FIG. 37A is a diagram illustrating correlation between the GOPs in the recorded content of the information recording medium and the table number registered in the EP map. The headmost GOP 0 is registered in the EP map, and the registration information thereof is stored in the table number [I=0] of the EP map. However, the next GOP 1 has no registration information in the EP map. The next GOP 2 is registered in the EP map, and the registration information thereof is stored in the table number [I=1] of the EP map. Thus, with the present example, the EP map is configured wherein of the GOPs making up the content, registration information regarding every other one GOP is recorded.

With the recorded content example in FIG. 37A, the GOP 0 (EP map 0) and GOP 10 (EP map 5) are GOPs in which I pictures (or the entire GOP) are set as non-modified data.

FIG. 37B illustrates the registration information of the EP map. In the event of selecting non-modified pictures from the registration information of this EP map, as with the case described with reference to FIG. 36, the cycle information (N) is obtained, and information is selected from the EP map in accordance with a cycle of N=5. That is to say, the table numbers 0, 5, and so on are selected to obtain I picture information, and reproduction is performed. This example is configured wherein of the actual content (content shown in FIG. 37A), one non-modified I picture is selected for each 10 GOPs. That is to say, the information processing device for executing content reproduction base on the EP map obtains the cycle information relating to the non-modified picture corresponding to the registration table number of the EP map, and executes reproduction.

Selecting information for each 5 entries (5 GOPs) of the EP map table enables selection and reproduction of non-modified I pictures to be executed, thereby performing special reproduction such as high-speed reproduction of only I pictures set as non-modified data.

Figure 38:
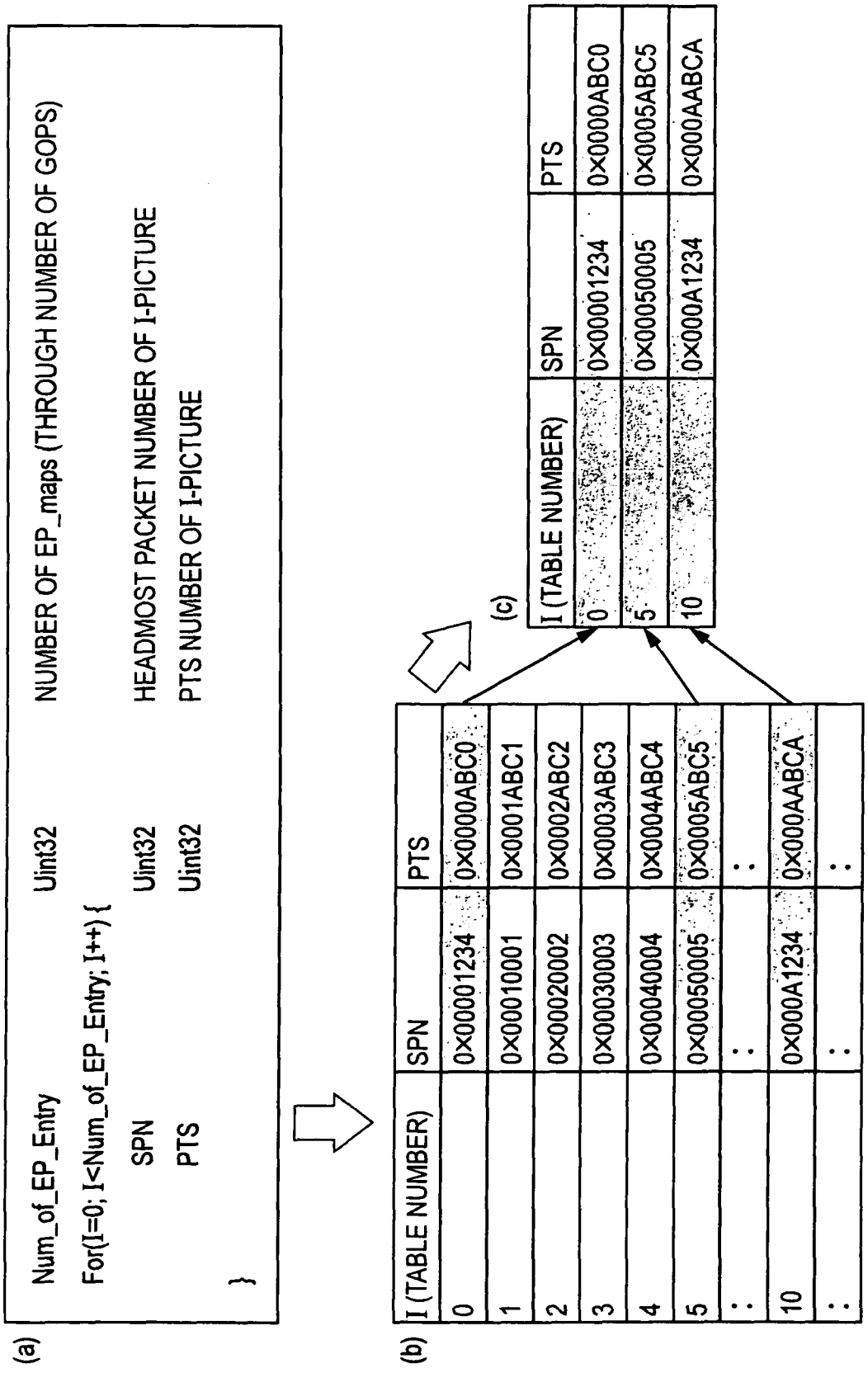
FIG. 38 is a diagram describing a reproducing processing example applying an EP map to a content in which GOP or picture data serving as non-modified data is set in a predetermined cycle.

Description will be made with reference to FIG. 38 regarding a processing example of the information processing device for executing special reproduction such as high-speed reproduction by obtaining non-modified I picture information with reference to the EP map from a content in which non-modified I pictures are set in a steady cycle. The information processing device for executing special reproduction such as high-speed reproduction first obtains the EP map shown in FIG. 38A. As previously described with reference to FIG. 29 and others, the EP map (EP_map) is data included in the clip information file (clip information), and the information processing device for executing reproducing processing obtains the EP map from the clip information file corresponding to an AV data stream to be reproduced.

The EP map, as shown in FIG. 38A includes the following information:
Number of tables in the EP map,
Headmost packet number of I pictures (SPN: Source Packet Number), and
PTS (presentation timestamp) of the I picture.

The number of EP map tables is the number of the table number [I] of the EP map described with reference to FIGS. 36 and 37, and becomes a number equal to or smaller than a GOP number.

The diagram specifically illustrating the registration information of the EP map of FIG. 38*a* is data shown in FIG. 38B, which illustrates correlation between a table number (I) within the EP map, the headmost packet number of I pictures (SPN), and the PTS (presentation timestamp) of the I picture. Let us say that of these, the information relating to the I pictures set as non-modified data is table number (I)=0, 5, 10, and so on.

The reproducing device for executing special reproduction such as high-speed reproduction obtains cycle information (N=5) using one of the selection modes such as whether to obtain from the secure VM, whether to obtain from the content attribute information recorded in the information recording medium, or whether to use a predetermined fixed value, selects the I picture information of the table number (I)=0, 5, 10, and so on in accordance with the obtained cycle (N=5), creates a virtual EP map made up of the selected I picture information shown in FIG. 38C for example, and executes reproducing processing made up of only the selected I pictures based on this EP map. According to this processing, reproducing processing can be executed without performing data transformation.

FIG. 39 illustrates an example in the case that all of the I picture information registered in the EP map are the information relating to the I pictures corresponding to non-modified data. The EP map in FIG. 39A, as with FIG. 38A, includes the following information:
Number of EP map tables,
Headmost packet number of I pictures (SPN: Source Packet Number), and
PTS (presentation timestamp) of the I picture.

The drawing specifically illustrating the registration information of the EP map of FIG. 39A is data shown in FIG. 39B, which illustrates correlation between a table number (I) within the EP map, the headmost packet number of I pictures (SPN), and the PTS (presentation timestamp) of the I picture. Let us say that of these, the information relating to the I pictures set as non-modified data is all of the table number (I)=0, 1, 2, and so on.

The reproducing device for executing special reproduction such as high-speed reproduction obtains cycle information (N=1) using one of the selection modes such as whether to obtain from the secure VM, whether to obtain from the content attribute information recorded in the information recording medium, or whether to use a predetermined fixed value, selects the I picture information of the table number (I)=0, 1, 2, and so on in accordance with the obtained cycle (N=1), creates a virtual EP map made up of the selected I picture information shown in FIG. 39C for example, and executes reproducing processing made up of only the selected I pictures based on this EP map. According to this processing, reproducing processing can be executed without performing data transformation.

Note that with the present example, the cycle is N=1, so reproduction may be performed based on the original EP map information shown in FIG. 39B without creating a virtual EP map made up of the selected I picture information shown in FIG. 39C. Even in this case, special reproduction can be executed without data transformation, and without creating a virtual EP map. Further, from the perspective of image destruction, setting the I pictures as modified is desirable, but from the perspective of high-speed reproduction, with a device which selects only I pictures and displays the I pictures in order, the processing functionality burden increases. Thus, both image destruction and specialized reproduction can be achieved by modification processing being performed with regard to I pictures not registered to the EP map, and not performing modification processing on the I pictures registered on the EP map.

Next, description will be made with reference to the flows shown in FIGS. 40 through 43 regarding a processing sequence for executing special (high-speed) reproducing processing not accompanied with data transformation by applying non-modified picture data set for each predetermined cycle (N). Note that as described above, if special (high-speed) reproducing processing is high-speed reproduction of relatively low-speed (e.g., 2×) which has a margin for decryption of obfuscation, there is no need to select non-modified I pictures such as shown in the following flow, control may be made so as to select even modified I pictures in a range in which processing time manages.

Figure 40:
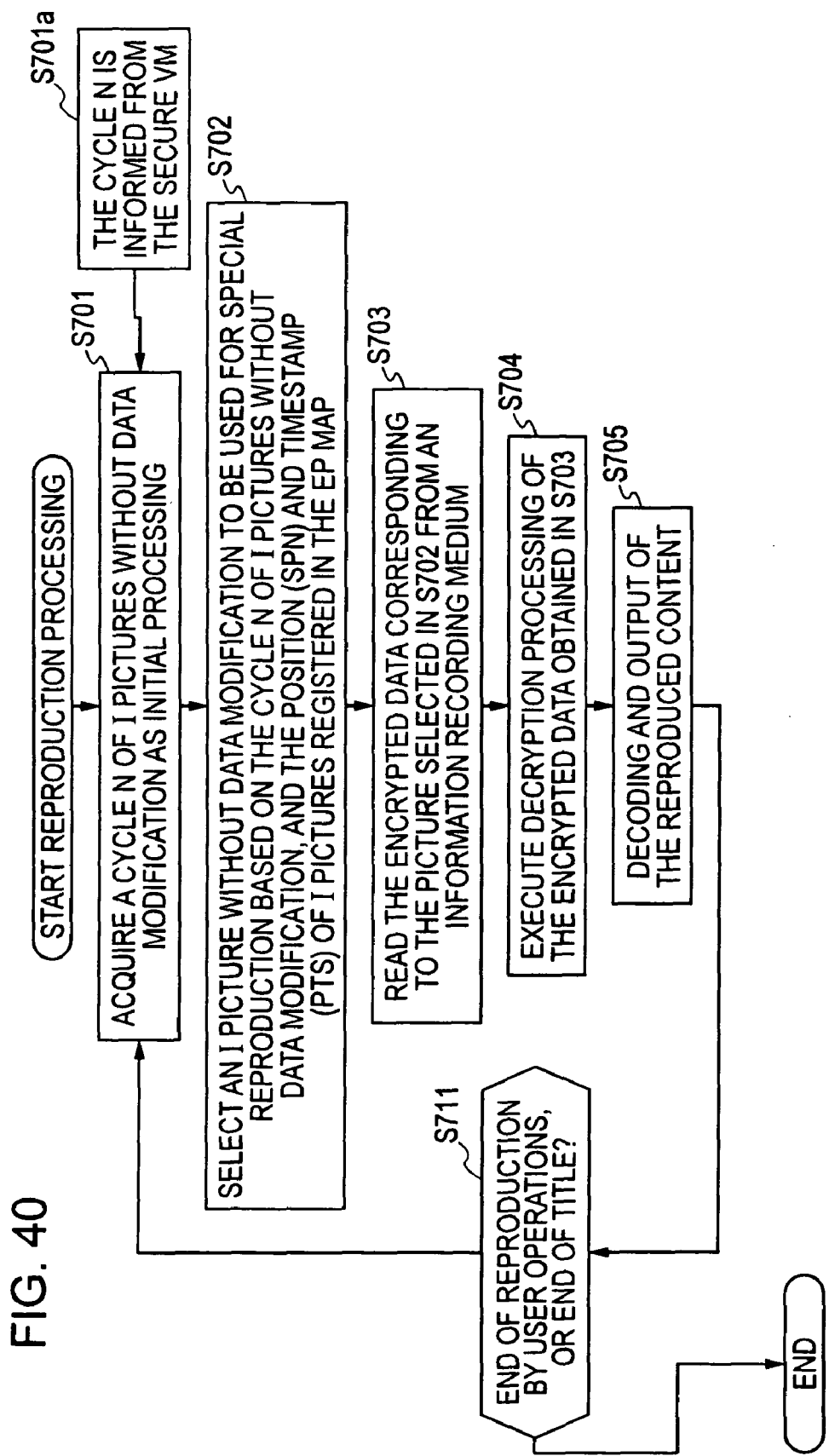
FIG. 40 is a diagram illustrating a flowchart describing the processing sequence for executing special (high-speed) reproducing processing not accompanied with data transformation based on cycle information (N)

The processing flow shown in FIG. 40 is a processing example in the case in which the reproducing processing unit (reproducing processing application (program)) of the host of the information processing device for executing content reproduction obtains the cycle information (N) equivalent to the interval of I pictures set as non-modified data from the secure VM at the time of executing initializing processing in increments of title corresponding to a medium (information recording medium) or content. First, in step S701, the reproducing processing unit (reproducing processing application (program)) of the host obtains the cycle information (N) equivalent to the interval of I pictures set as non-modified data from the secure VM. Step S701a shows the processing of the secure VM, in which the secure VM obtains the cycle information (N) from the secure information set corresponding to the recorded content of the information recording medium, and provides this to the reproducing processing unit (reproducing processing application (program)).

In step S702, the reproducing processing device, which obtained the cycle information (N), based on the EP map within the clip information file, obtains information regarding the I pictures without data modification, i.e., the positions of the I pictures without data modification and [SPN] and [PTS] serving as reproduction time information, and selects the pictures to be applied to special (high-speed) reproduction from only the non-modified pictures.

Next, in step S703, the reproducing processing device reads the encrypted data corresponding to the selected pictures (pictures selected in step S702) making up content to be reproduced (e.g., AV stream data) from the information recording medium, and executes decryption processing of the readout data in step S704. This decryption processing is the decryption processing previously described with reference to FIGS. 18 through 22.

Following this decryption processing, the reproducing processing device executes decoding processing and content output in step S705. The decoding processing is, for example, MPEG decoding processing. The reproducing processing device repeatedly executes these processing. (steps S701 through S705) until reproduction of the configuration data of the content ends (end of title) or the user inputs suspension of the content reproduction (Yes in step S711). In step S711, in the event of detecting end of title or suspension input of the content reproduction by the user, the processing ends. The above is the special (high-speed) reproducing sequence of a content not accompanied with data transformation.

Thus, special (high-speed) reproducing processing not accompanied with data transformation can be executed without using the special reproduction management information table by applying the cycle information corresponding to the I picture information set as non-modified data.

Figure 41:
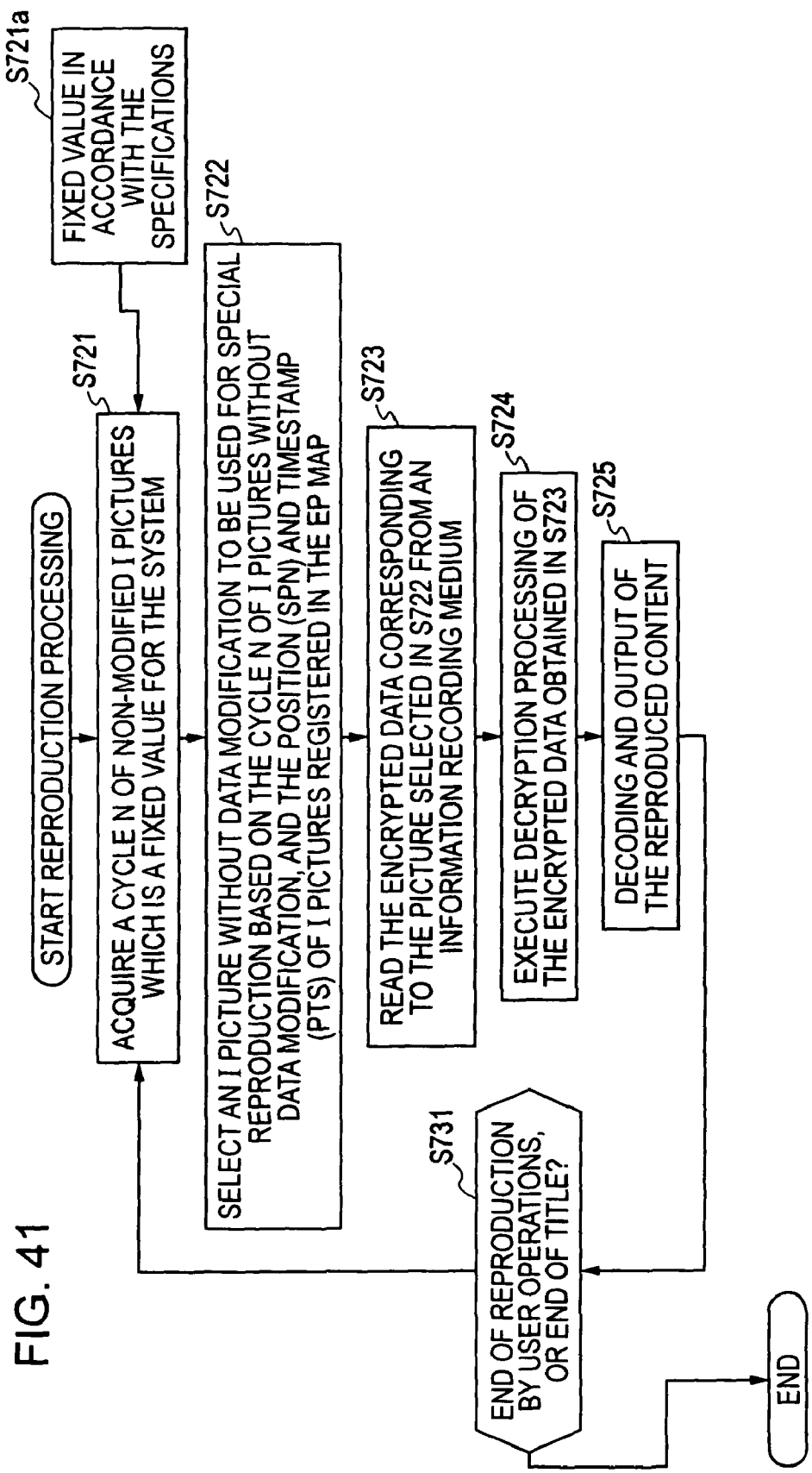
FIG. 41 is a diagram illustrating a flowchart describing the processing sequence for executing special (high-speed) reproducing processing not accompanied with data transformation based on cycle information (N)

The processing flow shown in FIG. 41 illustrates the processing sequence in the case in which the interval of I pictures set as non-modified data is set as the fixed value on the system, and modification is performed not for each content but in a steady cycle (N).

First, in step S721, the reproducing processing unit (reproducing processing application (program)) of the host obtains the cycle information (N) equivalent to the interval of I pictures, which is set as the system fixed value. This cycle information can be obtained with various types of technique such as obtaining the fixed value serving as the set value which is set in the reproducing processing application (program), obtaining of the fixed value information recorded in the information recording medium, obtaining the fixed value set in the memory of the information processing device, or the like, for example. S721a indicates the cycle information (N) data which can be obtained with these processing.

In step S722, based on the EP map within the clip information file, the reproducing processing device, which obtained the cycle information (N), obtains information regarding the I pictures without data modification, i.e., the positions of the I pictures without data modification and [SPN] and [PTS] serving as reproduction time information, and selects the pictures to be applied to special (high-speed) reproduction from only the non-modified pictures. The processing in the following steps S723 through S731 is the same as the processing previously described with reference to FIG. 40, and accordingly, description thereof will be omitted.

Figure 42:
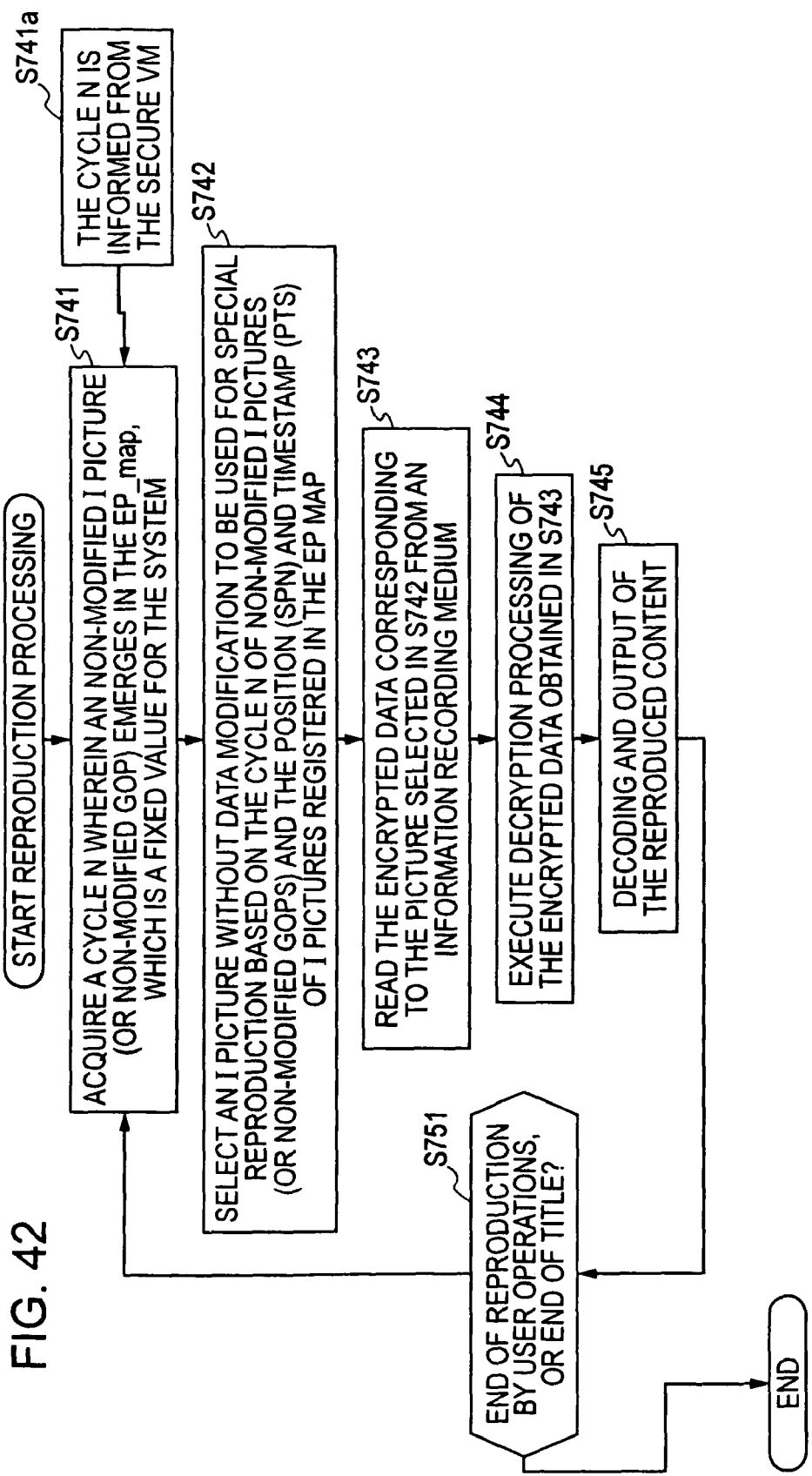
FIG. 42 is a diagram illustrating a flowchart describing the processing sequence for executing special (high-speed) reproducing processing not accompanied with data transformation based on cycle information (N)

The processing flow shown in FIG. 42 illustrates an example wherein the interval of I pictures set as non-modified data is set to be changeable for each content. First, in step S741, the reproducing processing unit (reproducing processing application (program)) of the host obtains the cycle information (N) equivalent to the interval of I pictures set as non-modified data in the registration table of the EP map from the secure VM.

This cycle information is equivalent to the cycle information of the registration table of the EP map. For example, in the EP map previously described with reference to FIG. 38, the cycle information becomes (N=5), and in the EP map previously described with reference to FIG. 39, the cycle information becomes (N=1). Step S741a shows the processing of the secure VM, in which the secure VM obtains the cycle information (N), which is equivalent to the interval information of non-modified picture information within I picture information recorded in the registration table of the EP map, from the secure information set corresponding to the recorded content of the information recording medium, and provides this to the reproducing processing unit (reproducing processing application (program)).

In step S742, based on the EP map within the clip information file, the reproducing processing device, which obtained the cycle information (N), obtains information regarding the GOPs or I pictures without data modification, i.e., the positions of the GOP information or I pictures without data modification and [SPN] and [PTS] serving as reproduction time information, and selects the pictures to be applied to special (high-speed) reproduction from only the non-modified pictures. The processing in the following steps S743 through S751 is the same as the processing previously described with reference to FIG. 40, and accordingly, description thereof will be omitted.

Figure 43:
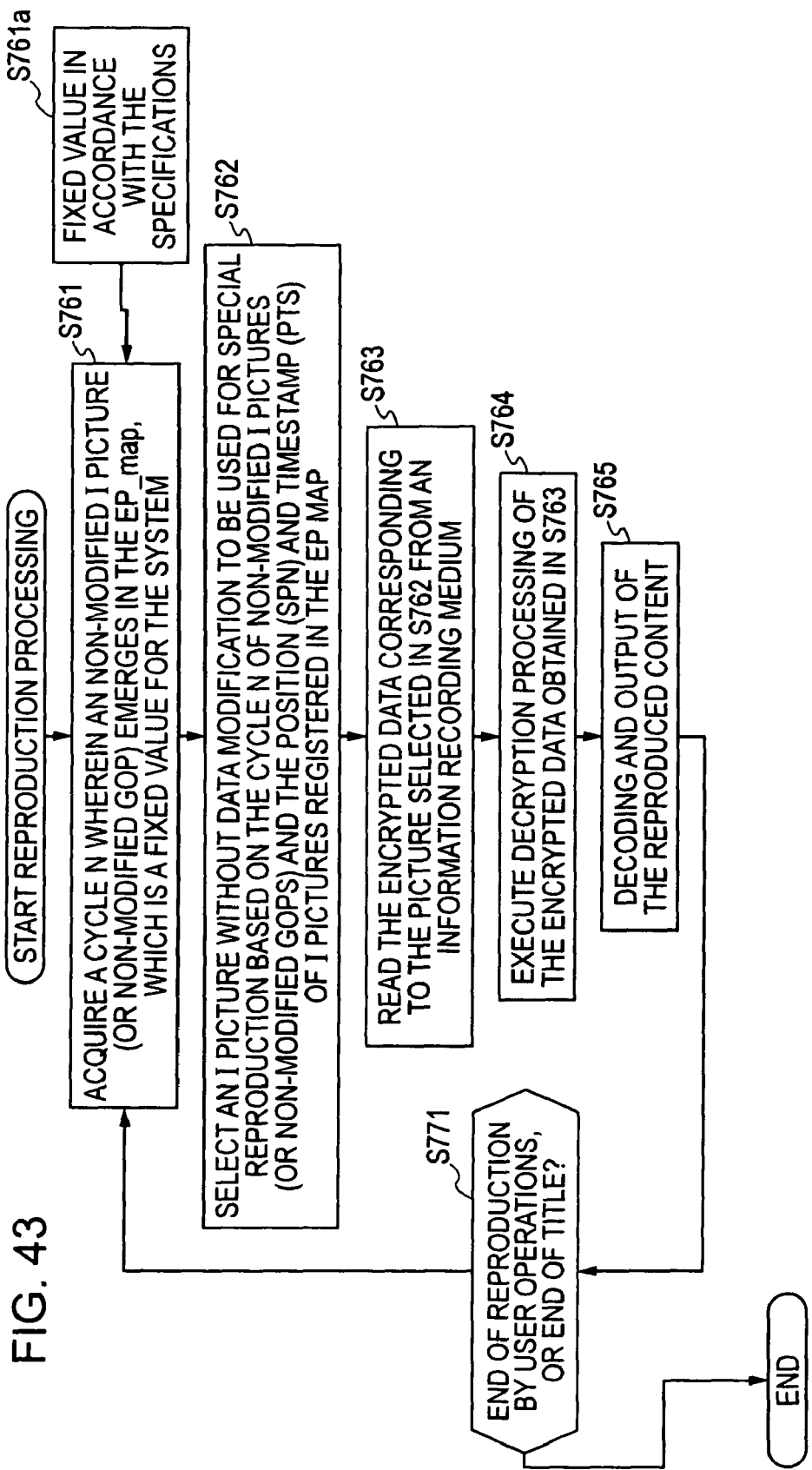
FIG. 43 is a diagram illustrating a flowchart describing the processing sequence for executing special (high-speed) reproducing processing not accompanied with data transformation based on cycle information (N)

The processing flow shown in FIG. 43 illustrates the processing sequence in the case in which the interval of I pictures set as non-modified data is set as the fixed value on the system, and modification is performed not for each content but in a steady cycle (N).

First, in step S761, the reproducing processing unit (reproducing processing application (program)) of the host obtains the cycle information (N) set as the fixed value for the system, i.e., the cycle information (N) equivalent to the interval of I pictures set as non-modified data in the registration table of the EP map.

In order to obtain this cycle information (N), various types of technique are applicable, such as obtaining the fixed value serving as the set value which is set in the reproducing processing application (program), obtaining of the fixed value information recorded in the information recording medium, obtaining the fixed value set in the memory of the information processing device, or the like, for example, S761a indicates the cycle information (N) which can be obtained with these processing.

The cycle information is equivalent to the cycle information of the registration table of the EP map. For example, in the EP map previously described with reference to FIG. 38, the cycle information becomes (N=5), and in the EP map previously described with reference to FIG. 39, the cycle information becomes (N=1). In step S762, based on the EP map within the clip information file, the reproducing processing device, which has obtained the cycle information (N), obtains information regarding the GOPs or I pictures without data modification, i.e., the positions of the GOP information or I pictures without data modification and [SPN] and [PTS] serving as reproduction time information, and selects the pictures to be applied to special (high-speed) reproduction from only the non-modified pictures. The processing in the following steps S763 through S771 is the same as the processing previously described with reference to FIG. 40, and accordingly, description thereof will be omitted.

Figure 44:
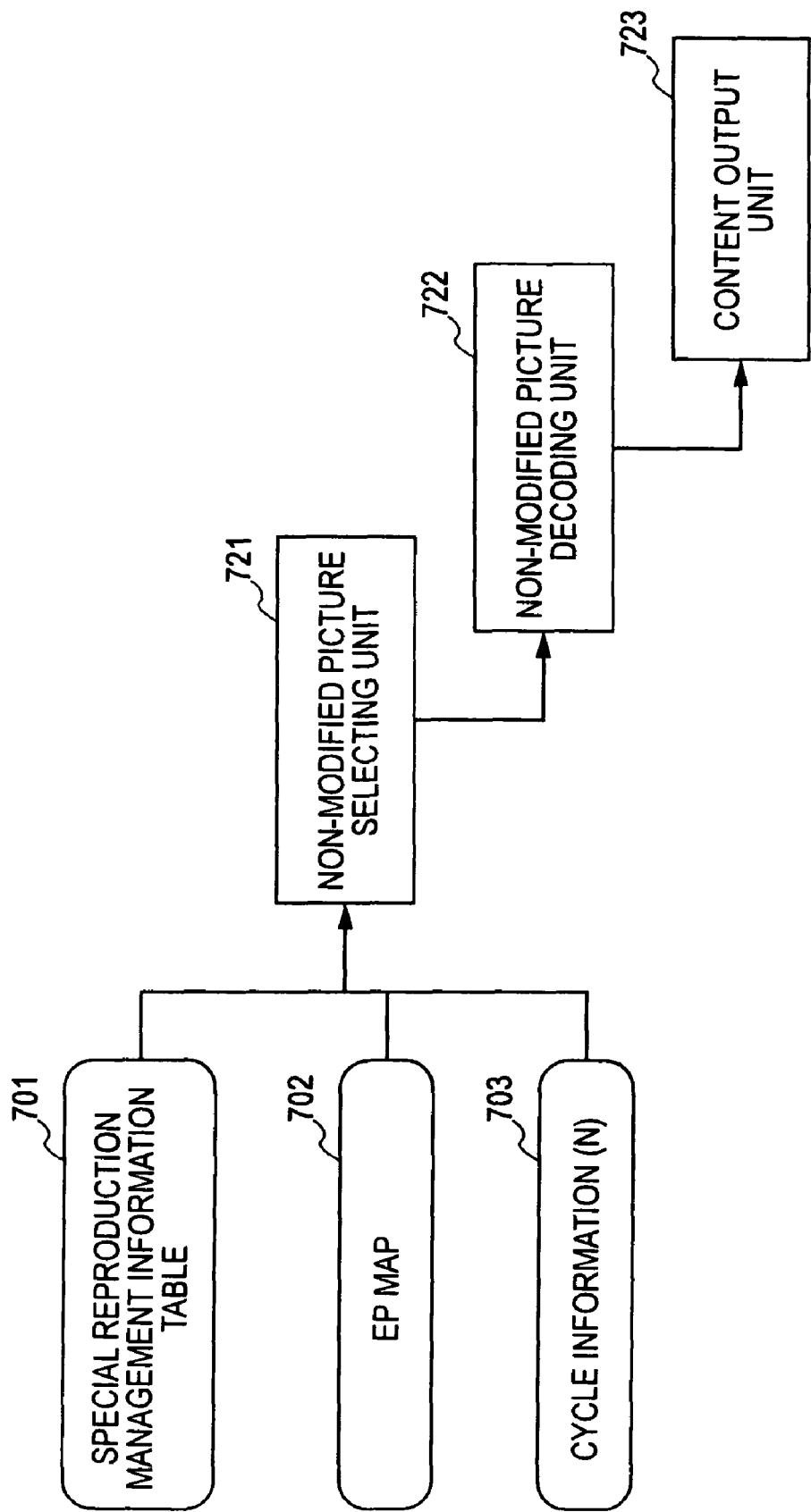
FIG. 44 is a block diagram describing the functions of an information processing device for executing special reproducing processing such as high-speed reproduction.

FIG. 44 illustrates a block diagram illustrating the functions of the information processing device (reproducing device) for obtaining the special reproduction management information table described with reference to FIGS. 27 and 28, or the EP map described with reference to FIG. 31, or the cycle information (N) described with reference to FIGS. 36 through 43, and executing special reproduction such as high-speed reproduction.

A non-modified I-picture selecting unit 721 executes processing for selecting I pictures serving as non-modified data from a content to be reproduced. This processing is executed as the processing based on a special reproduction management information table 701 corresponding to the content to be reproduced (e.g., tables shown in FIGS. 27 and 28), or an EP map 702 (e.g., EP map shown in FIG. 31), or cycle information (N) 703. Note that these information are obtained by directly reading from the information recording medium, or reading via the secure VM.

The non-modified I-picture selecting unit 721 executes processing for selecting an I picture for each predetermined cycle, and then selects I pictures serving as non-modified data. Specifically, the non-modified I-picture selecting unit 721 executes processing for obtaining the cycle information equivalent to the interval of GOPs or I pictures made up of non-modified data as the cycle information of the registration table of the EP map, and obtaining the information of the I pictures set as the non-modified data from the EP map based on the cycle information. Also, the non-modified I-picture selecting unit 721 executes processing for selecting I pictures serving as non-modified data based on the fixed cycle information unchangeable for each content, or the cycle information corresponding to a content, which is set depending on a content.

A non-modified picture decoding unit 722 executes decoding processing of the I pictures selected by the non-modified I-picture selecting unit 721, and a content output unit 723 outputs the I pictures which are the decoding result. According to this processing process, special reproduction such as high-speed reproduction without subjecting to data transformation can be realized.

8. Configuration of the Information Processing Device

Figure 45:
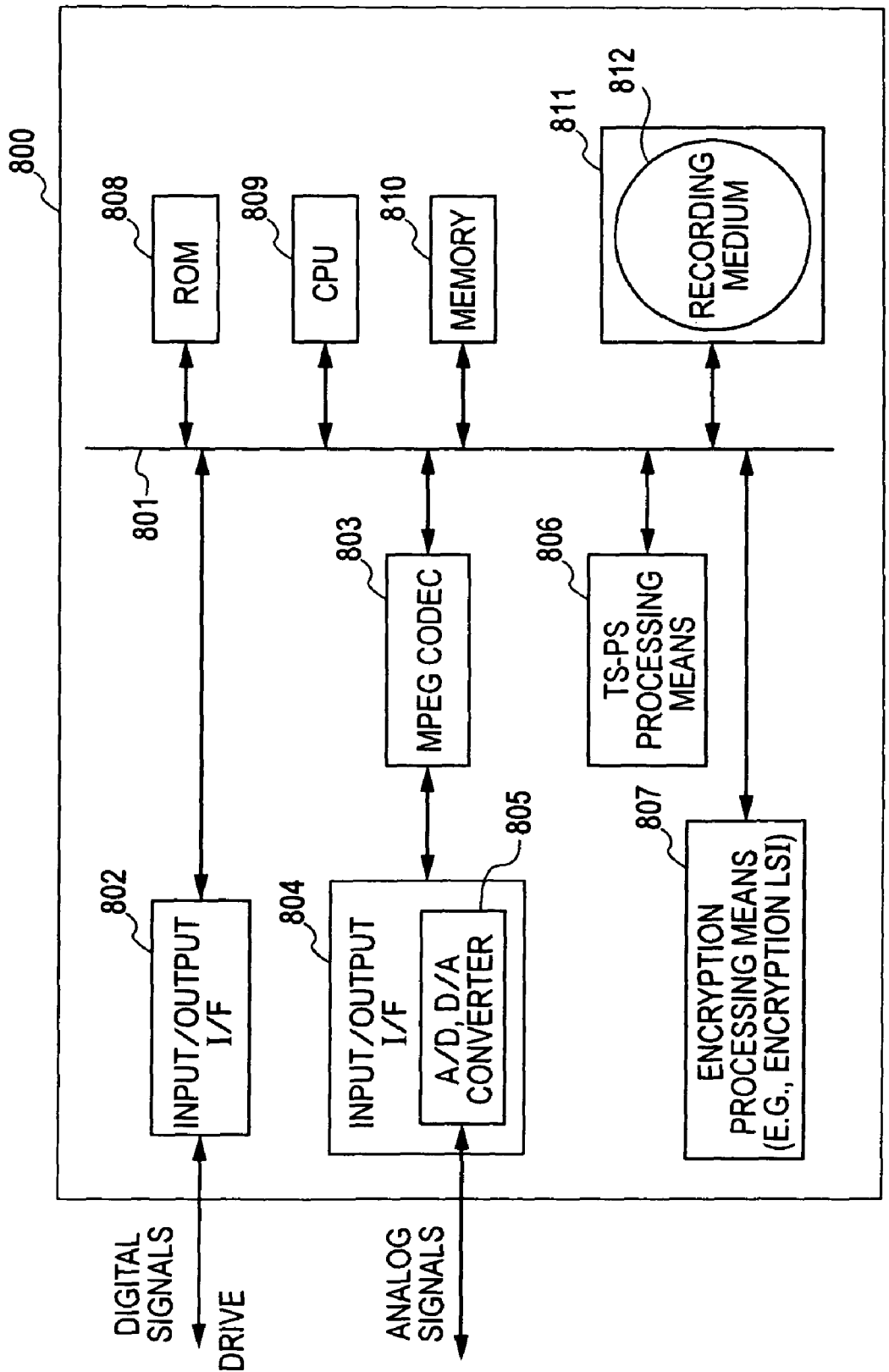
FIG. 45 is a diagram describing a hardware configuration example of an information processing device for executing an application serving as the host.

Next, description will be made regarding a hardware configuration example of the information processing device for executing an application as the host with reference to FIG. 45. An information processing device 800 has a CPU 809 which executes data processing following various types of program including OS, content reproduction and recording application programs, mutual authentication processing, various processing which is accompanied by the reproduction of contents, e.g., the above-described data transformation processing, and so forth, ROM 808 serving as a storage area for programs, parameters, etc., memory 810, and input/output I/F 802 for input/output of digital signals, an input/output I/F 804 having an A/D, D/A converter 805 for input/output of analog signals, an MPEG CODEC 803 for executing encoding and decoding processing of MPEG data, TS-PS processing means 806 for executing the TS (Transport stream)-PS (Program Stream) processing, encryption processing means 807 for executing the various types of encryption processing, such as mutual authentication, decryption processing of encrypted content, and so forth, a recording medium 812 such as a hard disk, and a drive 811 driving the recording medium 812 and performing input/output of data recording/reproducing signals, with each block being connected to a bus 801.

The information processing device (host) 800 is connected with the drive by a connection bus such as a ATAPI-BUS, for example. Fix-up tables, contents, and so forth, are input/output via the digital signal input/output I/F 802. Encryption processing and decryption processing are performed by the encryption processing means 807, applying AES algorithms, or the like, for example.

Note that programs for executing content reproduction or recording processing are kept inside the ROM 808 for example, and the memory 810 is used while executing the programs as necessary, for a storage and work area of the parameters and data.

The ROM 808 or recording medium 812 stores, for example, the public key of an Administration Center, a secret key for a host, a public key certificate for the host, and further, a drive CRL serving as a relocation list, and so forth.

At the time of reproducing or external output of a content, a data transformation processing program obtained from the information recording medium is applied to execute processing following the various processing sequences described earlier in the processing examples, such as decryption of encrypted contents, restoration of fix-up tables, writing of transformation data based on data stored in fix-up tables, and so forth.

The present invention has been described in detail so far with reference to specific embodiments. However, it is self-evident that one skilled in the art can make modifications and substitutions to the embodiments without departing from the essence of the present invention. That is to say, the present invention has been disclosed in exemplary form, and should not be interpreted restrictively. The judgment of the essence of the present invention should be made with reference to the Claims section.

Note that the series of processing described in the Specification can be carried out by hardware, software, or a combination of both. In the case of executing the processing with software, a program recording the processing sequence can either be installed in the memory within a computer that has built-in dedicated hardware and executed, or the program can be installed in the general-purpose computer capable of executing various types of processing.

For example, the program may be recorded in a hard disk or ROM (Read Only Memory) serving as recording media beforehand. Or, the program may be temporarily or permanently stored (recorded) in removable media such as a flexible disk, CD-ROM (Compact Disc Read Only Memory), MO (Magneto optical) disk, DVD (Digital Versatile Disc), magnetic disk, semiconductor memory, etc. Such removable recording media can be provided as so-called packaged software.

Note that besides installing the program from removable recording media such as described above to the computer, the program may be wirelessly transferred to the computer from the download site, or transferred to the computer over networks such as a LAN (Local Area Network) or the Internet using a cable, with a computer receiving the program transferred in such a way, and installing in a built-in recording medium such as a hard disk or the like.

Also, the various types of processing described the Specification are not restricted to execution in the time-sequence described, and maybe executed in parallel or independently, depending on the processing capabilities of the device executing the processing. Note that system as used in the present specification means a logical assembly arrangement of multiple devices, and is not restricted to an arrangement wherein all of the component devices are in the same housing.

What is claimed is:

1. A non-transitory computer readable medium having stored thereon a computer program which causes an information processing device to execute reproducing processing of content subjected to MPEG encoding processing of which part of content configuration data is set as modified data, said program comprising the steps of:
    non-modified I picture selecting step of selecting I pictures serving as non-modified data from said content wherein the non-modified I pictures correspond to predetermined cyclic entries of a plurality of entries which are registered in an EP map, wherein the predetermined cyclic entries of the plurality of entries, which are registered in the EP map, have at least one entry therebetween; and
    decoding output processing step of executing decoding processing and output processing of the non-modified I pictures selected by said non-modified I-picture selecting step.

2. An information processing device for executing reproducing processing of content subjected to MPEG encoding processing of which part of content configuration data is set as modified data, comprising:
    a non-modified I-picture selecting unit configured to select I pictures serving as non-modified data from said content wherein the non-modified I pictures correspond to predetermined cyclic entries of a plurality of entries which are registered in an EP map, wherein the predetermined cyclic entries of the plurality of entries, which are registered in the EP map, have at least one entry therebetween; and
    a decoding output processing unit configured to execute decoding processing and output processing of the non-modified I pictures selected by said non-modified I-picture selecting unit.

3. The information processing device according to claim 2, wherein said non-modified I-picture selecting unit is configured to execute processing for obtaining the position of an I picture serving as non-modified data by applying at least one of a table and the EP map which is set corresponding to a content to be reproduced.

4. The information processing device according to claim 2, wherein said non-modified I-picture selecting unit is configured to execute processing for selecting an I picture serving as non-modified data based on fixed cycle information unchangeable for each content, which is information equivalent to the interval of GOPs or I pictures made up of non-modified data.

5. The information processing device according to claim 2, wherein said non-modified I-picture selecting unit is configured to execute processing for selecting an I picture serving as non-modified data based on cycle information corresponding to a content, which is set according to a content, and is cycle information equivalent to the interval of GOPs or I pictures made up of non-modified data.

6. An information processing method for executing reproducing processing of content subjected to MPEG encoding processing of which part of content configuration data is set as modified data, comprising the steps of:
    non-modified I picture selecting step of selecting I pictures serving as non-modified data from said content wherein the non-modified I pictures correspond to predetermined cyclic entries of a plurality of entries which are registered in an EP map, wherein the predetermined cyclic entries of the plurality of entries, which are registered in the EP map, have at least one entry therebetween; and
    decoding output processing step of executing decoding processing and output processing of the non-modified I pictures selected by said non-modified I-picture selecting step.

7. The information processing method according to claim 6, wherein said non-modified I picture selecting is a step for executing processing for obtaining the position of an I picture serving as non-modified data by applying at least one of a table and the EP map which is set corresponding to a content to be reproduced.

8. The information processing method according to claim 6, wherein said non-modified I picture selecting executes processing for selecting an I picture serving as non-modified data based on fixed cycle information unchangeable for each content, which is cycle information equivalent to the interval of GOPs or I pictures made up of non-modified data.

9. The information processing method according to claim 6,
wherein said non-modified I picture selecting executes processing for selecting an I picture serving as non-modified data based on cycle information corresponding to a content, which is set according to a content, and is cycle information equivalent to the interval of GOPs or I pictures made up of non-modified data.

10. An information recording medium manufacturing device comprising:
a modified data generating unit configured to generate modified data obtained by modifying content configuration data;
a fix-up table generating unit configured to generate a fix-up table in which transformation data serving as an object to be replaced with said modified data is registered;
a reproduction management information generating unit configured to generate an EP map which stores a plurality of entries, wherein each entry includes a packet number and a presentation timestamp corresponding to the packet number; and
a data recording unit configured to record content including said modified data, and said fix-up table in an information recording medium,
wherein said modified data generating unit is configured to execute data modification processing with a plurality of picture data excepting non-modified I pictures,
wherein the non-modified I pictures correspond to predetermined cyclic entries of the plurality of entries which are registered in the EP map, and
wherein the predetermined cyclic entries of the plurality of entries, which are registered in the EP map, have at least one entry therebetween.

11. An information recording medium manufacturing method comprising the steps of:
modified data generating step of generating modified data obtained by modifying content configuration data;
fix-up table generating step of generating a fix-up table in which transformation data serving as an object to be replaced with said modified data is registered;
a reproduction management information generating step of generating an EP map which stores a plurality of entries, wherein each entry includes a packet number and a presentation timestamp corresponding to the packet number; and
data recording step of recording content including said modified data, and said fix-up table in an information recording medium,
wherein said modified data generating is a step for executing data modification processing with a plurality of picture data excepting non-modified I pictures,
wherein the non-modified I pictures correspond to predetermined cyclic entries of the plurality of entries which are registered in the EP map, and
wherein the predetermined cyclic entries of the plurality of entries, which are registered in the EP map, have at least one entry therebetween.

12. A non-transitory computer readable medium having stored thereon a computer program which causes an information processing device to execute processing for recording content in an information recording medium, comprising the steps of:
modified data generating step of generating modified data obtained by modifying content configuration data;
fix-up table generating step of generating a fix-up table in which transformation data serving as an object to be replaced with said modified data is registered;
a reproduction management information generating step of generating an EP map which stores a plurality of entries, wherein each entry includes a packet number and a presentation timestamp corresponding to the packet number; and
data recording step of recording content including said modified data, and said fix-up table in an information recording medium,
wherein said modified data generating is a step for executing data modification processing with a plurality of picture data excepting non-modified I pictures,
wherein the non-modified I pictures correspond to predetermined cyclic entries of the plurality of entries which are registered in the EP map, and
wherein the predetermined cyclic entries of the plurality of entries, which are registered in the EP map, have at least one entry therebetween.

13. An information processing device comprising:
a modified data generating processing circuit configured to generate modified data obtained by modifying content configuration data;
a fix-up table generating processing circuit configured to generate a fix-up table in which transformation data serving as an object to be replaced with said modified data is registered;
a reproduction management information generating processing circuit configured to generate an EP map which stores a plurality of entries, wherein each entry includes a packet number and a presentation timestamp corresponding to the packet number; and
a data recording processing circuit configured to record content including said modified data and said fix-up table in an information recording medium,
wherein said modified data generating processing circuit is configured to execute data modification processing with a plurality of picture data excepting non-modified I pictures,
wherein the non-modified I pictures correspond to predetermined cyclic entries of the plurality of entries which are registered in the EP map, and
wherein the predetermined cyclic entries of the plurality of entries, which are registered in the EP map, have at least one entry therebetween.

14. The information processing device according to claim 13,
wherein said modified data generating processing circuit is configured to execute data modification processing in which a slice within a DCT block included in MPEG encoded data is set as data modification processing units to generate broken data serving as broken content; and
wherein said data recording processing circuit is configured to execute processing for recording content including said broken data in an information recording medium.

15. The information processing device according to claim 13,
wherein said modified data generating processing circuit is configured to execute data modification processing in which an arithmetic code block set in a picture of MPEG encoded data is set as data modification processing units to generate broken data serving as broken content; and wherein said data recording processing circuit is configured to execute processing for recording content including said broken data in an information recording medium.

16. The information processing device according to claim 13,
wherein said modified data generating processing circuit is configured to execute data modification processing in which an I picture included in MPEG encoded data is selected as a picture to be subjected to data modification processing to generate broken data serving as broken content; and
wherein said data recording processing circuit is configured to execute processing for recording content including said broken data in an information recording medium.

17. The information processing device according to claim 13,
wherein said fix-up table generating processing circuit is configured to generate a fix-up table in which identifier-set transformation data enabling identification information of a content reproducing device or content reproducing application to be analyzed is registered.

18. The information processing device according to claim 17,
wherein said fix-up table generating processing circuit is configured to execute data modification processing in which identifier-set transformation data enabling the identification information of a content reproducing device or content reproducing application to be analyzed is set with a macro block within a DCT block included in MPEG encoded data as data modification processing units to generate said identifier-set transformation data.

19. The information processing device according to claim 13,
wherein said modified data generating processing circuit is configured to execute data modification processing in which all I pictures included in MPEG encoded data are selected as non-modified data, and only a B picture or P picture is selected as a picture to be subjected to modification processing to generate broken data.

20. A non-transitory information recording medium, in which is recorded content, storing:
a content in which partial configuration data of the content is set as modified data;
a fix-up table recording setting position information regarding transformation data serving as an object to be replaced with the modified data, and the content of the transformation data; and
an EP map which stores a plurality of entries, wherein each entry includes a packet number and a presentation timestamp corresponding to the packet number,
wherein the modified data is data generated by executing data modification processing as to one or more picture data other than specified non-modified I pictures of multiple I pictures included in MPEG encoded data,
wherein the non-modified I pictures correspond to predetermined cyclic entries of the plurality of entries which are registered in the EP map, and
wherein the predetermined cyclic entries of the plurality of entries, which are registered in the EP map, have at least one entry therebetween.

21. The non-transitory information recording medium according to claim 20,
wherein said modified data includes broken data preventing normal reproduction; and
wherein said broken data is modified data generated with the data modification processing.

22. The non-transitory information recording medium according to claim 20,
wherein said modified data includes broken data preventing normal reproduction; and
wherein said broken data is modified data generated with the data modification processing in which a slice within a DCT block included in MPEG encoded data is set as processing units.

23. The non-transitory information recording medium according to claim 20,
wherein said modified data includes broken data preventing normal reproduction; and
wherein said broken data is modified data generated with the data modification processing in which an arithmetic code block set in a picture of MPEG encoded data is set as processing units.

24. The non-transitory information recording medium according to claim 20,
wherein said modified data includes broken data preventing normal reproduction; and
wherein said broken data is modified data generated with the data modification processing in which an I picture included in MPEG encoded data is selected as a picture to be subjected to data modification processing.

25. The non-transitory information recording medium according to claim 20,
wherein said fix-up table is a fix-up table in which identifier-set transformation data enabling identification information of a content reproducing device or content reproducing application to be analyzed, is registered.

26. The non-transitory information recording medium according to claim 25,
wherein said identifier-set transformation data is data generated with the data modification processing in which a macro block within a DCT block included in MPEG encoded data is set as processing units.

27. The non-transitory information recording medium according to claim 25,
wherein said identifier-set transformation data is data generated with the data modification processing in which a B picture included in MPEG encoded data is set as processing units.

28. A non-transitory computer readable medium having stored thereon a data structure including as configuration data:
a content in which partial configuration data of a content is set as modified data;
a fix-up table recording setting position information regarding transformation data serving as an object to be replaced with modified data, and the content of the transformation data; and
an EP map which stores a plurality of entries, wherein each entry includes a packet number and a presentation timestamp corresponding to the packet number,
wherein the modified data is data generated by executing data modification processing as to one or more picture data other than specified non-modified I pictures of multiple I pictures included in MPEG encoded data,
wherein the non-modified I pictures correspond to predetermined cyclic entries of the plurality of entries which are registered in the EP map, and
wherein the predetermined cyclic entries of the plurality of entries, which are registered in the EP map, have at least one entry therebetween.

29. The non-transitory computer readable medium according to claim 28,
wherein said modified data is modified data generated with the data modification processing.

30. The non-transitory computer readable medium according to claim 28,
wherein said modified data is modified data generated with the data modification processing in which a slice within a DCT block included in MPEG encoded data is set as processing units.

31. The non-transitory computer readable medium according to claim 28,
wherein said modified data is modified data generated with the data modification processing in which an arithmetic code block set in a picture of MPEG encoded data is set as processing units.

32. The non-transitory computer readable medium according to claim 28,
wherein said modified data is modified data generated with the data modification processing in which an I picture included in MPEG encoded data is selected as a picture to be subjected to data modification processing.

33. The non-transitory computer readable medium according to claim 28,
wherein said fix-up table is a fix-up table in which identifier-set transformation data enabling identification information of a content reproducing device or content reproducing application to be analyzed, is registered.

34. The non-transitory computer readable medium according to claim 33,
wherein said identifier-set transformation data is data generated with the data modification processing in which a macro block within a DCT block included in MPEG encoded data is set as processing units.

35. The non-transitory computer readable medium according to claim 33,
wherein said identifier-set transformation data is data generated with the data modification processing in which a B picture included in MPEG encoded data is set as processing units.

36. An information processing method comprising the steps of:
modified data generating step of generating modified data obtained by modifying content configuration data;
fix-up table generating step of generating a fix-up table in which transformation data serving as an object to be replaced with said modified data is registered;
a reproduction management information generating step of generating an EP map which stores a plurality of entries, wherein each entry includes a packet number and a presentation timestamp corresponding to the packet number; and
data recording step of recording content including said modified data, and said fix-up table in an information recording medium,
wherein said modified data generating executes data modification processing with a plurality of picture data excepting non-modified I pictures,
wherein the non-modified I pictures correspond to predetermined cyclic entries of the plurality of entries which are registered in the EP map, and
wherein the predetermined cyclic entries of the plurality of entries, which are registered in the EP map, have at least one entry therebetween.

37. The information processing method according to claim 36,
wherein said modified data generating is a step of executing data modification processing in which a slice within a DCT block included in MPEG encoded data is set as data modification processing units to generate broken data serving as broken content; and
wherein said data recording is a step of executing processing for recording content including said broken data in an information recording medium.

38. The information processing method according to claim 36,
wherein said modified data generating is a step of executing data modification processing in which an arithmetic code block set in a picture of MPEG encoded data is set as data modification processing units to generate broken data serving as broken content; and
wherein said data recording is a step of executing processing for recording content including said broken data in an information recording medium.

39. The information processing method according to claim 36,
wherein said modified data generating is a step of executing data modification processing in which an I picture included in MPEG encoded data is selected as a picture to be subjected to data modification processing to generate broken data serving as broken content; and
wherein said data recording is a step for executing processing of recording content including said broken data in an information recording medium.

40. The information processing method according to claim 36,
wherein said fix-up table generating is a step of generating a fix-up table in which identifier-set transformation data enabling identification information of a content reproducing device or content reproducing application to be analyzed is registered.

41. The information processing method according to claim 40,
wherein said fix-up table generating is a step of generating identifier-set transformation data enabling the identification information of a content reproducing device or content reproducing application to be analyzed is set by executing data modification processing in which a macro block within a DCT block included in MPEG encoded data is set as data modification processing units.

42. The information processing method according to claim 36,
wherein said modified data generating executes data modification processing in which all I pictures included in MPEG encoded data are selected as non-modified data, and only a B picture or P picture is selected as a picture to be subjected to modification processing to generate modified data.

* * * * *